US008685537B2

(12) United States Patent
Imai et al.

(10) Patent No.: US 8,685,537 B2
(45) Date of Patent: Apr. 1, 2014

(54) FIBER REINFORCED RESIN COMPOSITION, MOLDING MATERIAL, AND METHOD FOR PRODUCING FIBER REINFORCED RESIN COMPOSITION

(75) Inventors: Naokichi Imai, Ehime (JP); Masato Honma, Ehime (JP); Takayuki Fujiwara, Ehime (JP); Takashi Fujioka, Ehime (JP); Masaru Akita, Nagoya (JP); Makiko Saito, Nagoya (JP)

(73) Assignee: TORAY Industries, Inc., Tokyo (JP)

( * ) Notice: Subject to any disclaimer, the term of this patent is extended or adjusted under 35 U.S.C. 154(b) by 77 days.

(21) Appl. No.: 13/138,658

(22) PCT Filed: Mar. 16, 2010

(86) PCT No.: PCT/JP2010/054423
§ 371 (c)(1),
(2), (4) Date: Oct. 11, 2011

(87) PCT Pub. No.: WO2010/107022
PCT Pub. Date: Sep. 23, 2010

(65) Prior Publication Data
US 2012/0028047 A1    Feb. 2, 2012

(30) Foreign Application Priority Data

Mar. 16, 2009  (JP) .................................. 2009-062472
Mar. 16, 2009  (JP) .................................. 2009-062473

(51) Int. Cl.
*B29C 45/14*   (2006.01)
*C08L 77/06*   (2006.01)
*C08K 7/06*    (2006.01)

(52) U.S. Cl.
USPC ............................ 428/403; 524/147; 264/257

(58) Field of Classification Search
USPC ............................ 428/403; 524/147; 264/257
See application file for complete search history.

(56) References Cited

U.S. PATENT DOCUMENTS

| 3,845,163 | A | 10/1974 | Murch | 260/857 |
| 5,397,608 | A * | 3/1995 | Soens | 428/34.5 |
| 6,455,143 | B1 | 9/2002 | Ishibashi et al. | 428/294.1 |
| 2002/0156191 | A1 | 10/2002 | Bruls et al. | 525/178 |
| 2005/0008868 | A1 * | 1/2005 | Nakamura et al. | 428/414 |

(Continued)

FOREIGN PATENT DOCUMENTS

| EP | 1000972 A1 | 5/2000 |
| EP | 1275682 A1 | 1/2003 |

(Continued)

OTHER PUBLICATIONS

European Search Report dated Nov. 21, 2012, issued in European Patent Application No. 10753514.8-1217.

*Primary Examiner* — John Uselding
(74) *Attorney, Agent, or Firm* — Kubovcik & Kubovcik

(57) ABSTRACT

The invention provides a fiber reinforced resin composition comprising a melt-kneaded product (A) prepared by melt-kneading a first resin (A1) and a second resin (A2) that has a reactive functional group as well as a third resin (B) and a fibrous filler (C), wherein, with respect to the contents of the components, the first resin (A1), the second resin with a reactive functional group (A2), and the third resin (B) account for 0.1 to 75 wt %, 0.1 to 15 wt %, and 10 to 99.8 wt %, respectively, to form a resin composition while said fibrous filler (C) accounts for 0.1 to 300 parts by weight per 100 parts by weight of said resin composition, said first resin (A1) and said third resin (B) forming a matrix resin, said second resin (A2) being dispersed as particles in said matrix resin, and said particles having a number average particle diameter of 10 to 1,000 nm. The invention relates to a fiber reinforced resin composition having rigidity and impact resistance in a good balance, a molding material, and a production method thereof.

13 Claims, 4 Drawing Sheets

(56) References Cited

U.S. PATENT DOCUMENTS

| | | | |
|---|---|---|---|
| 2007/0203308 A1* | 8/2007 | Mori et al. | 525/524 |
| 2008/0188609 A1 | 8/2008 | Agarwal et al. | 524/504 |
| 2008/0249241 A1 | 10/2008 | Heiliger et al. | 525/50 |
| 2009/0098335 A1 | 4/2009 | Kousaka et al. | 428/116 |
| 2010/0273944 A1 | 10/2010 | Kobayashi et al. | 525/55 |
| 2011/0021707 A1 | 1/2011 | Kobayashi et al. | 525/190 |

FOREIGN PATENT DOCUMENTS

| | | |
|---|---|---|
| JP | 51-151797 A | 12/1976 |
| JP | 07-233321 A | 9/1995 |
| JP | 10-138379 A | 5/1998 |
| JP | 2003-502464 A | 1/2003 |
| JP | 2005-187809 A | 7/2005 |
| JP | 2006-219513 A | 8/2006 |
| JP | 2007-506830 A | 3/2007 |
| JP | 2007-297549 A | 11/2007 |
| JP | 2007-314753 A | 12/2007 |
| JP | 2008-156486 A | 7/2008 |
| JP | 2008-156604 A | 7/2008 |
| JP | 2008-169344 A | 7/2008 |
| JP | 2009-506169 A | 2/2009 |

* cited by examiner

US 8,685,537 B2

FIBER REINFORCED RESIN COMPOSITION, MOLDING MATERIAL, AND METHOD FOR PRODUCING FIBER REINFORCED RESIN COMPOSITION

This application is a 371 of international application PCT/JP2010/054423, filed Mar. 16, 2010, which claims priority based on Japanese patent application Nos. 2009-062472 and 2009-062473 both filed Mar. 16, 2009, which are incorporated herein by reference.

TECHNICAL FIELD

The present invention relates to a fiber reinforced resin composition having rigidity and impact resistance in a good balance, a molding material, and a production method thereof.

BACKGROUND ART

High in strength and rigidity, engineering plastics such as polyamide resin and polybutylene terephthalate resin have been widely used in fields such as automobile parts, electric/electronic parts, and building materials. In some uses, they are required to have high impact resistance in addition to strength and rigidity, and in recent years, efforts have been made to develop materials based on polymer alloys.

Patent documents 1 and 2 disclose a highly impact resistant thermoplastic composition comprising a polyamide and an ionomer. The material, however, does not have rigidity and impact resistance in a sufficiently good balance.

Patent document 3 discloses a resin composition comprising a thermoplastic resin and a resin with a reactive functional group and having a high rigidity, high impact resistance and good appearance maintained even after being deformed. In this resin composition, one resin forms a continuous phase while the other forms a dispersal phase, and both the continuous phase and the dispersal phase contain fine particles of 300 nm or less. The composition, however, requires a high content of a resin with a reactive functional group to develop a high impact resistance, and the balance between its rigidity and impact resistance is not sufficiently good.

Patent document 4 discloses a thermoplastic resin composition comprising a thermoplastic resin and a resin with a reactive functional group and having a high heat resistance and high impact absorbability. In this thermoplastic resin composition, one resin forms a continuous phase while the other forms a dispersal phase, and the dispersal phase has a specified three dimensional structure. According to an experimental study by the present inventors, however, the composition fails to have rigidity and impact resistance in a sufficiently good balance if the content of the resin with a reactive functional group is less than 15%.

It is known that engineering plastics can be reinforced by adding various fillers. Patent document 5, for instance, discloses a polyamide resin composition that comprises a polyamide resin, polyolefin elastomer, and a reinforcement fiber and has a high impact resistance and less deteriorated mechanical characteristics such as rigidity. The material, however, fails to have impact resistance and rigidity in a sufficiently good balance.

Patent document 6 discloses a molding material, along with a production method thereof, that is produced by impregnating a continuous reinforcement fiber bundles with a thermoplastic polymer with a relatively low molecular weight and combining it with a high-molecular weight thermoplastic resin to form a composite structure. This technique can produce a long fiber reinforced thermoplastic resin that has a largely improved moldability and productivity and also has both a high impact resistance and rigidity. Nevertheless, its impact resistance and rigidity are not sufficiently high when used to produce cases for electronic instruments, electric/electronic parts, automobile parts, building materials, and sporting goods.

Patent document 7 discloses a thermoplastic elastomer composition comprising a thermoplastic resin containing a microgel of a homopolymer or a random copolymer. In this material, however, the microgel is formed before being mixed with a thermoplastic resin, and there is no description about the reactivity of the microgel with the thermoplastic resin, and they cannot develop both impact resistance and rigidity in a sufficiently good balance.

Patent document 8 discloses an epoxy composition comprising an epoxy resin and rubber particles having a core-shell structure. In producing this material, however, the rubber particles having a core-shell structure are formed before being mixed with the epoxy resin. There are no description about the reactivity of the epoxy resin and the rubber particles having a core-shell structure, and the balance between impact resistance and rigidity is not sufficiently good.

Patent document 9 discloses a method to produce an impact resistant polymer composition, in which a matrix polymer containing a dispersed rubber composition is melted and mixed with a second matrix polymer. This material, however, has to contain both a functionalized rubber and a non-functionalized rubber for the rubber composition to have an appropriate morphology, and it has been found that a sufficiently good balance between impact resistance and rigidity cannot be achieved without using a non-functionalized rubber.

PRIOR ART DOCUMENTS

Patent Documents

[Patent document 1] U.S. Pat. No. 3,845,163
[Patent document 2] Japanese Unexamined Patent Publication (Kokai) No. SHO-51-151797
[Patent document 3] Japanese Unexamined Patent Publication (Kokai) No. 2005-187809
[Patent document 4] Japanese Unexamined Patent Publication (Kokai) No. 2008-156604
[Patent document 5] Japanese Unexamined Patent Publication (Kokai) No. HEI-7-233321
[Patent document 6] Japanese Unexamined Patent Publication (Kokai) No. HEI-10-138379
[Patent document 7] Published Japanese Translation No. 2007-506830 of the PCT Application
[Patent document 8] Published Japanese Translation No. 2009-506169 of the PCT Application
[Patent document 9] Published Japanese Translation No. 2003-502464 of the PCT Application

SUMMARY OF THE INVENTION

Problems to be Solved by the Invention

The problem of the present invention is to provide a fiber reinforced resin composition having rigidity and impact resistance in a good balance, a molding material, and a production method thereof.

Means of Solving the Problems

As a result of intensive studies aiming to solve the above problem, the inventors have achieved the present invention after finding that problem can be solved by controlling the structure of the dispersal phase with high accuracy even when the content of the resin that forms the dispersal phase is small.

Specifically, the invention provides a fiber reinforced resin composition comprising a melt-kneaded product (A) prepared by melt-kneading a first resin (A1) and a second resin that has a reactive functional group (A2) as well as a third resin (B) and a fibrous filler (C), wherein, with respect to the contents of the components, the first resin (A1), the second resin with a reactive functional group (A2), and said third resin (B) account for 0.1 to 75 wt %, 0.1 to 15 wt %, and 10 to 99.8 wt %, respectively, to form a resin composition while said fibrous filler (C) accounts for 0.1 to 300 parts by weight per 100 parts by weight of the resin composition, said first resin (A1) and said third resin (B) forming a matrix resin, said second resin (A2) being dispersed as particles in said matrix resin, and said particles having a number average particle diameter of 10 to 1,000 nm.

The invention also provides a fiber reinforced resin composition production method comprising melt-kneading a first resin (A1) and a resin with a reactive functional group (A2). to prepare a melt-kneaded product (A) and mixing a third resin (B) and a fibrous filler (C) with said melt-kneaded product (A), wherein, with respect to the contents of the components, the first resin (A1) accounts for 0.1 to 75 wt %, the second resin with a reactive functional group (A2) for 0.1 to 15 wt %, and the third resin (B) for 10 to 99.8 wt % of the resin composition while said fibrous filler (C) accounts for 0.1 to 300 parts by weight per 100 parts by weight of the resin composition.

Effect of the Invention

The invention serves to produce a fiber reinforced resin composition that has rigidity and impact resistance in a good balance. The molding material according to the invention maintains its moldability unimpaired to form moldings with both a high impact resistance and rigidity. Furthermore, the invention provides a production method for easy manufacturing of said molding material and also provides moldings produced therefrom.

DESCRIPTION OF EMBODIMENTS

Figure 1:
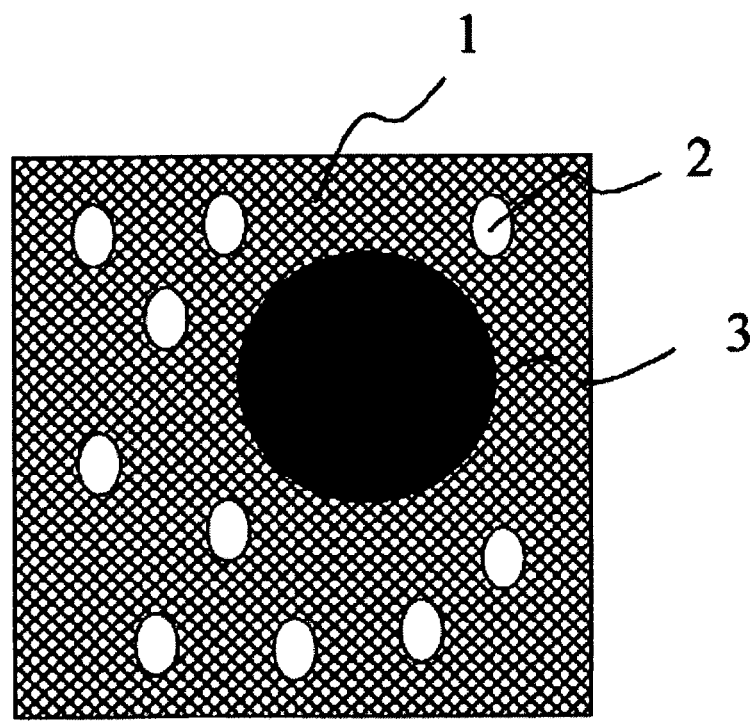
FIG. 1 is a schematic diagram of a fiber reinforced resin composition according to the invention (overall view).
Figure 2:
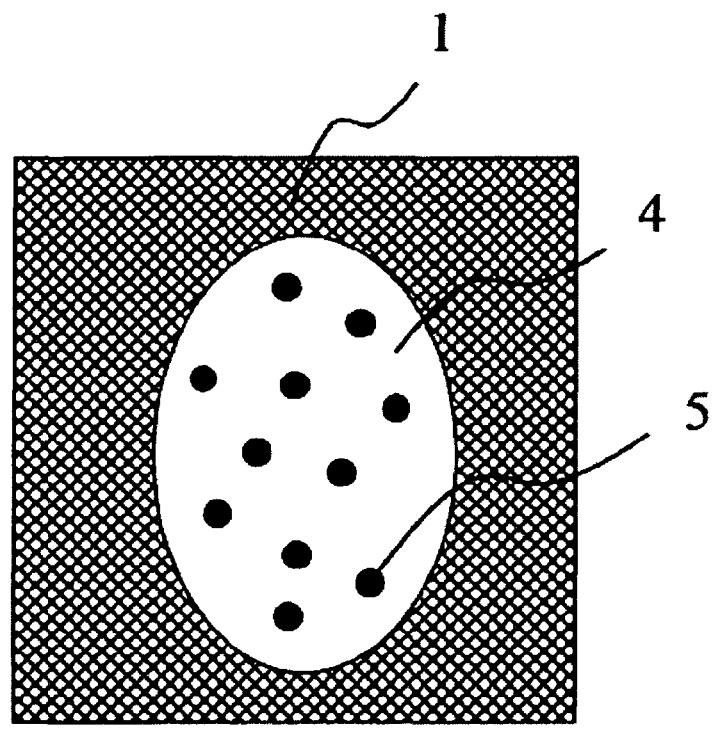
FIG. 2 is a schematic diagram of a fiber reinforced resin composition according to the invention (enlarged view of the dispersal phase).

The invention is described in more detail below.

The fiber reinforced resin composition according to the invention is a composition that comprises a first resin (A1), a second resin with a reactive functional group (A2), a third resin (B), and a fibrous filler (C).

There are no specific limitations on said first resin (A1) to be used for the invention if it is a resin that can be molded through heating and melting, and may be, for instance, at least one selected from the group of polyamide, polyester, polyphenylene sulfide, polyphenylene oxide, polycarbonate, polylactic acid, polyacetal, polysulfone, polytetrafluoroethylene, polyetherimide, polyamide-imide, polyimide, polyethersulfone, polyether ketone, polythioether ketone, polyether ether ketone, polyethylene, polypropylene, polystyrene, ABS, other styrene based resins, rubber-like polymer, and polyalkylene oxide.

In particular, it is preferable to use at least one resin selected from the group of polyamide, polyester, polyphenylene sulfide, polyacetal, styrene based resin, polyphenylene oxide, polycarbonate, polylactic acid, polypropylene, and polyethylene.

Polyamide is a resin based on a polymer with an amide bond, and it is produced from an amino acid, lactam or diamine combined with a dicarboxylic acid as the main input materials. Specifically, examples of said input materials include amino acids such as 6-aminocaproic acid, 11-aminoundecanoic acid, 12-aminododecanoic acid, and para-aminomethyl benzoic acid; lactams such as ε-caprolactam, ω-laurolactam; aliphatic, alicyclic or aromatic diamines such as tetramethylene diamine, pentamethylene diamine, hexamethylene diamine, 2-methyl pentamethylene diamine, undeca methylene diamine, dodeca methylene diamine, 2,2,4-/2,4,4-trimethyl hexamethylene diamine, 5-methyl nonamethylene diamine, meta-xylene diamine, para-xylylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl) propane, bis(aminopropyl)piperazine, and aminoethyl piperazine; and aliphatic, alicyclic or aromatic dicarboxylic acids such as adipic acid, suberic acid, azelaic acid, sebacic acid, dodecanedioic acid, terephthalic acid, isophthalic acid, 2-chloroterephthalic acid, 2-methyl terephthalic acid, 5-methyl isophthalic acid, 5-sodium sulfoisophthalic acid, hexahydroterephthalic acid, and hexahydroisophthalic acid. For the invention, polyamide homopolymers or copolymers derived from these materials may be used singly or in the form of a mixture.

For the invention, particularly useful polyamides include polycaproamide (nylon 6), polyhexamethylene adipamide (nylon 66), polypentamethylene adipamide (nylon 56), polytetramethylene adipamide (nylon 46), polyhexamethylene sebacamide (nylon 610), polypentamethylene sebacamide (nylon 510), polyhexamethylene dodecamide (nylon 612), polyundecane amide (nylon 11), polydodecane amide (nylon 12), polycaproamide/polyhexamethylene adipamide copolymer (nylon 6/66), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene isophthalamide/polycaproamide copolymer (nylon 66/6I/6), polyhexamethylene terephthalamide/polyhexamethylene isophthalamide copolymer (nylon 6T/6I), polyhexamethylene terephthalamide/polydodecane amide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyhexamethylene terephthalamide/poly-2-methyl pentamethylene terephthalamide copolymer (nylon 6T/M5T), polyhexamethylene terephthalamide/polypentamethylene terephthalamide copolymer (nylon 6T/5T), and polynonamethylene terephthalamide (nylon 9T), as well as mixtures and copolymers thereof.

Particularly preferable ones include nylon 6, nylon 66, nylon 610, nylon 11, nylon 12, nylon 6/66, nylon 66/6T, and nylon 6T/6I copolymers. It is practically preferable to use these polyamides as a mixture to meet required characteristics including moldability, heat resistance, toughness, and surface properties. Of these, nylon 6, nylon 66, nylon 610, nylon 11, and nylon 12 are the most preferable.

There are no specific limitations on the polymerization degree of these polyamides, but it is preferable to use polyamides that have a relative viscosity in the range of 1.5 to 7.0, more preferably 1.8 to 6.0, as measured at 25° C. in a 98% concentrated sulfuric acid solution with a sample concentration of 0.01 g/ml. If the relative viscosity is 1.5 or more, the fiber reinforced resin composition will serve to achieve an improved high impact resistance. If the relative viscosity is 7.0 or less, on the other hand, a high moldability will be achieved.

Polyester is a thermoplastic resin based on a polymer that has an ester bond in its backbone chain, and preferable examples include polymers and copolymers, as well as mixtures thereof, produced through condensation reaction of a dicarboxylic acid (or its ester-forming derivative) and a diol (or its ester-forming derivative) as primary components.

Specific examples of polyester particularly useful for the invention include polybutylene terephthalate, polybutylene (terephthalate/isophthalate), polybutylene (terephthalate/adipate), polybutylene (terephthalate/sebacate), polybutylene (terephthalate/decane dicarboxylate), polybutylene naphthalate, polyethylene terephthalate, polyethylene (terephthalate/isophthalate), polyethylene (terephthalate/adipate), polyethylene (terephthalate/5-sodium sulfoisophthalate), polybutylene (terephthalate/5-sodium sulfoisophthalate), polyethylene naphthalate, and polycyclohexane dimethylene terephthalate, as well as mixtures and copolymers thereof. In particular, polybutylene terephthalate and polyethylene terephthalate are used preferably to provide a polyester composition with a high moldability.

It is preferable that said polybutylene terephthalate has an intrinsic viscosity in the range of 0.35 to 2.00, more preferably 0.50 to 1.50, as measured at 25° C. in a 0.5% o-chlorophenol solution. Several polybutylene terephthalate polymers different in intrinsic viscosity may be used in combination.

It is also preferable that said polybutylene terephthalate contains COOH end groups in the range of 1 to 50 eq/ton (quantity of end groups per ton of polymer) as measured through potentiometric titration of its m-cresol solution with an alkali solution from the viewpoint of durability and anisotropy depression effect.

Specific examples of said polyphenylene oxide include poly(2,6-dimethyl-1,4-phenylene oxide), poly(2-methyl-6-ethyl-1,4-phenylene oxide), poly(2,6-diphenyl-1,4-phenylene oxide), poly(2-methyl-6-phenyl-1,4-phenylene oxide), and poly(2,6-dichloro-1,4-phenylene oxide). Also included are copolymers such as 2,6-dimethyl phenol copolymerized with another phenol (for instance, 2,3,6-trimethyl phenol). In particular, copolymers of poly(2,6-dimethyl-1,4-phenylene oxide) or 2,6-dimethyl phenol with 2,3,6-trimethyl phenol are preferable, of which those based on poly(2,6-dimethyl-1,4-phenylene oxide) are particularly preferable.

It is preferable that said polyphenylene oxide has a reduced viscosity in the range of 0.15 to 0.70 as measured at 30° C. in a 0.5 g/dl chloroform solution.

There are no specific limitations on the production method to be used for said polyphenylene oxide, and generally known methods may be used. For instance, it may be produced easily by Hay's method that performs oxidation polymerization using a complex of a cuprous salt and an amine as catalyst as described in U.S. Pat. No. 3,306,874.

Specific examples of a said polypropylene include propylene homopolymer and copolymers of propylene with at least one selected from the group of α-olefin, conjugated diene, and disconjugate diene.

Examples of said α-olefin include non-propylene α-olefin polymers with a carbon number of 2 to 12 such as, for instance, ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, and 1-dodecene. Examples of said conjugated diene or disconjugate diene include butadiene, ethylidene norbornene, dicyclopentadiene, and 1,5-hexadiene. These monomers may be used singly or as a mixture of two or more selected therefrom.

Said polypropylene copolymer may be a random copolymer or a block copolymer. Furthermore, said copolymer may contain a monomer other than those listed above.

Preferable examples of said polypropylene include, for instance, polypropylene homopolymer, ethylene/propylene copolymer, propylene/1-butene copolymer, and ethylene/propylene-1-butene copolymer.

It is practically preferable to use these polypropylene polymers as a mixture to meet required characteristics including moldability, heat resistance, toughness, and surface properties.

Said polypropylene preferably comprises a modified polypropylene polymer to provide moldings with improved mechanical characteristics. Examples of said modified polypropylene polymers include acid modified polypropylene, amine modified polypropylene, imine modified polypropylene, and phenol modified polypropylene. Said acid modified polypropylene comprises a polypropylene polymer chain containing a carboxylic acid and/or a salt thereof or an anhydride thereof as a functional group connected to the chain. Various methods are available for production of acid modified polypropylene. For instance, it may be produced through graft polymerization of a monomer that contains a group selected from the following: carboxylic acid group, carboxylate group, anhydride, and carboxylic ester group. Examples of said monomer graft-polymerized include, for instance, ethylene-based unsaturated carboxylic acids and anhydrides, metal salts, and esters thereof.

Said phenol modified polypropylene is a polypropylene polymer containing a phenol resin bonded to the polymer chain. Various methods are available for production of phenol modified polypropylene. For instance, it may be produced through graft polymerization of a phenol resin to polypropylene.

Preferable examples of said phenol resin include novolac type phenol resin, resol type phenol resins, and derivatives thereof. It is practically preferably to use them as a mixture as required to adjust the number of functional groups.

There are no specific limitations on the phenol to be used as a component of said phenol resin, and it may be at least one or a mixture of two or more selected from the group of phenol, orthocresol, meta-cresol, para-cresol, bisphenol A, bisphenol F, catechol, resorcin, hydroquinone, propyl phenol, butyl phenol, octyl phenol, and nonyl phenol.

There are no specific limitations on the aldehyde to be used as a component of said phenol resin, and it may be at least one or a mixture of two or more selected from the group of formaldehyde, para-formaldehyde, trioxane, and acetoaldehyde.

There are no specific limitations on the compound to be used to modify said phenol resin, it may be at least one or a mixture of two or more selected from the group of alkyl benzene, rosin, terpene, and boric acid.

Said polyethersulfone contains an aromatic group, sulfone group, and ether group in the polymer backbone. Said aromatic group is preferably an arylene group with a carbon number of 6 to 12, and specific examples include m-phenylene group, p-phenylene group, dimethyl-p-phenylene group, tetramethyl-p-phenylene group, naphthylene group, and biphenylylene group. Said backbone may contain a hydrocarbon group with a carbon number of 1 to 15, and preferable examples of said hydrocarbon group include aliphatic hydrocarbon group, alicyclic hydrocarbon group, and aralkylene group.

Said polyethersulfone to be used for the invention preferably has a reduced viscosity in the range of 0.2 to 0.7 as measured at 25° C. in a 1% DMF solution.

Said second resin with a reactive functional group (A2) is a resin containing a reactive functional group in its molecular chain to react mutually with the functional group existing in said first resin (A1). Said second resin (A2) can be produced by introducing a reactive functional group in to the base resin.

There are no specific limitations on the base resin to be used for said second resin (A2), but, for instance, it may be at least one resin selected from the group of polyamide, polyester, polyphenylene sulfide, polyphenylene oxide, polycarbonate, polylactic acid, polyacetal, polysulfone, polytetrafluoroethylene, polyetherimide, polyamide-imide, polyimide, polyethersulfone, polyether ketone, polythioether ketone, polyether ether ketone, polyethylene, polypropylene, polystyrene, ABS, other styrene based resins, rubber-like polymer, and polyalkylene oxide, that are different from said first resin (A1). In particular, more preferable examples of said base resin to be used for said second resin (A2) include polyethylene, polypropylene resin, styrene based resin, and rubber-like polymer from the viewpoint of easy introduction of a reactive functional group, and rubber-like polymer is particularly preferable from the viewpoint of improving the impact absorbability.

Said rubber-like polymer has a polymer structure with a low glass transition temperature in which part of the molecules are restrained by covalent bonds, ionic bonds, van der Waals force, or entanglement. Said rubber-like polymer preferably has a glass transition temperature of 25° C. or less. Preferable examples of said rubber-like polymer include, for instance, diene based rubbers such as polybutadiene, polyisoprene, styrene-butadiene random/block copolymer, hydrogenated forms of said block copolymer, acrylonitrile-butadiene copolymer, and butadiene-isoprene copolymer; ethylene-propylene random/block copolymers; ethylene-butene random/block copolymers; copolymers of ethylene and α-olefin; ethylene-unsaturated carboxylic acid copolymers such as ethylene-acrylic acid copolymer and ethylene-methacrylic acid copolymer; ethylene-unsaturated carboxylate copolymers such as ethylene-acrylate and ethylene-methacrylate; ethylene-unsaturated carboxylic acid-unsaturated metal carboxylate copolymers such as ethylene-acrylic acid-metal acrylate and ethylene-methacrylic acid-metal methacrylate that contain a metal salt as part of the unsaturated carboxylic acid; acrylic elastic polymers such as butyl acrylate-butadiene copolymers and other acrylate-butadiene copolymers; copolymers of ethylene and fatty acid vinyl such as ethylene-vinyl acetate; ethylene-propylene-unconjugated diene ternary copolymers such as ethylene-propylene-ethylidene norbornene copolymer and ethylene-propylene-hexadiene copolymer; butylene-isoprene copolymers; chlorinated polyethylene; and thermoplastic elastomers such as polyamide elastomer and polyester elastomer.

When polyamide or polypropylene is used as said first resin (A1), an ethylene-unsaturated carboxylate copolymer or an ethylene-unsaturated carboxylic acid-unsaturated metal carboxylate copolymer is preferred from the viewpoint of compatibility.

The unsaturated carboxylate in said ethylene-unsaturated carboxylate copolymer is preferably a (meth)acrylate. Specific examples of said unsaturated carboxylate include (meth) acrylates such as methyl (meth)acrylate, ethyl (meth)acrylate, 2-ethylhexyl (meth)acrylate, and stearyl (meth)acrylate. Here, "(meth)acrylic acid" refers to "acrylic acid or methacrylic acid."

There are no specific limitations on the weight ratio between the ethylene component and the unsaturated carboxylate component in a copolymer, but it is preferably in the range of 90/10 to 10/90, more preferably 85/15 to 15/85.

There are no specific limitations on the number average molecular weight of said ethylene-unsaturated carboxylate copolymer, but it is preferably in the range of 1,000 to 70,000 from the viewpoint of flowability and mechanical characteristics.

Specific examples of the unsaturated carboxylic acid as component of said ethylene-unsaturated carboxylic acid-unsaturated metal carboxylate copolymer include (meth)acrylic acid. Examples of the unsaturated metal carboxylate include metal (meth)acrylate. There are no specific limitations on the metal in said unsaturated metal carboxylate, but it is preferably an alkali metal such as sodium, an alkaline earth metal such as magnesium, or zinc.

There are no specific limitations on the weight ratio between the unsaturated carboxylic acid component and the unsaturated metal carboxylate component in said ethylene-unsaturated carboxylic acid-unsaturated metal carboxylate copolymer, but it is preferably in the range of 95/5 to 5/95, more preferably 90/10 to 10/90.

There are no specific limitations on the number average molecular weight of said ethylene-unsaturated carboxylic acid-unsaturated metal carboxylate copolymer, but it is preferably in the range of 1,000 to 70,000 from the viewpoint of flowability and mechanical characteristics.

There are no specific limitations on the reactive functional group contained in said second resin (A2) as long as it can react mutually with the functional group existing in said first resin (A1), but it is preferably at least one selected from the following: amino group, carboxyl group, metal salts of carboxyl group, hydroxyl group, epoxy group, anhydride group, isocyanate group, mercapto group, oxazoline group, and sulfonic acid group. Of these, the amino group, carboxyl group, metal salts of carboxyl group, epoxy group, acid anhydride group, and oxazoline group are preferred because they are high in reactivity and free from side reactions such as decomposition and crosslinking.

In the case of introducing an anhydride group in said rubber-like polymer, generally known techniques may be used and there are no specific limitations on the method to be used. Available methods include, for instance, copolymerization of an anhydride such as maleic anhydride, itaconic anhydride, endic anhydride, citraconic anhydride, and 1-butene-3,4-dicarboxylic anhydride with the monomer used as main component to produce the rubber-like polymer, and graft copolymerization of such an anhydride with a rubber-like polymer.

In the case of introducing an epoxy group in said rubber-like polymer, generally known techniques may be used and there are no specific limitations on the method to be used. Available methods include, for instance, copolymerization of an epoxy-containing vinyl monomer such as an $\alpha,\beta$-unsaturated acid based glycidyl ester compound such as, for instance, glycidyl acrylate, glycidyl methacrylate, glycidyl ethacrylate, and itaconate glycidyl, with the monomer used as main component of said rubber-like polymer; polymerization of a rubber-like polymer using an epoxy-containing polymerization initiator or chain transfer agent; and graft copolymerization of an epoxy compound with a rubber-like polymer.

In the case of introducing an oxazoline group in said rubber-like polymer, generally known techniques may be used and there are no specific limitations on the method to be used. Available methods include, for instance, copolymerization of an oxazoline-containing vinyl monomer such as, for instance, 2-isopropenyl-oxazoline, 2-vinyl-oxazoline, 2-acryloyl-oxazoline, and 2-styryl-oxazoline with the monomer to be used as main component of said rubber-like polymer.

There are no specific limitations on the number of functional group per molecular chain of said second resin with a reactive functional group (A2), but commonly it is preferably 1 to 10, more preferably 1 to 5 to depress side reactions such as crosslinking.

A thermoplastic resin and/or a thermosetting resin may be used said third resin (B). Said thermoplastic resin may be, for instance, at least one resin selected from the group of polyamide, polyester, polyphenylene sulfide, polyphenylene oxide, polycarbonate, polylactic acid, polyacetal, polysulfone, polytetrafluoroethylene, polyetherimide, polyamide-imide, polyimide, polyethersulfone, polyether ketone, polythioether ketone, polyether ether ketone, polyethylene, polypropylene, polystyrene, ABS, other styrene based resins, rubber-like polymer, and polyalkylene oxide resin. In particular, it is preferable to use at least one resin selected from the group of polyamide, polyester, polyphenylene sulfide, polyacetal, styrene based resin, polyphenylene oxide, polycarbonate, polylactic acid, polypropylene, and polyethylene.

Said thermosetting resin to be used as said third resin (B) may be, for instance, at least one resin selected from the group of epoxy resin, unsaturated polyester resin, phenol resin, vinyl ester resin, and benzoxazine resin. Of these, epoxy resin is preferable from the viewpoint of handleability.

Examples of said epoxy resin include, for instance, bisphenol A epoxy resin, bisphenol F epoxy resin, bisphenol S epoxy resin, epoxy resin with a biphenyl backbone, phenol novolac type epoxy resin, cresol novolac type epoxy, resin, resorcinol epoxy resin, dicyclopentadiene type epoxy resin, epoxy resin with a naphthalene backbone, diglycidyl diaminodiphenyl methane, diglycidyl aniline, and triglycidyl aminophenol.

Furthermore, said epoxy resin may contain a curing agent or a curing catalyst. There are no specific limitations on the curing agent to be used for said epoxy resin if it is a compound containing an active group that can react with the epoxy resin, but it is preferably a compound that has an amino group, anhydride group, or azido group. Examples include, for instance, dicyandiamide, alicyclic amine, aliphatic amine, aromatic amine, aminobenzoic acid esters, various anhydrides, phenol novolac resin, and cresol novolac resin. Said curing catalyst may be, for instance, an imidazole derivative, triphenyl phosphine, or Lewis acid complex such as boron trifluoride complex and boron trichloride complex.

For the fiber reinforced resin composition according to the invention, it is preferable that said first resin (A1) and said third resin (B) are the same resin from the viewpoint of developing a high impact resistance. In the case where the first resin (A1) and the third resin (B) are different resins, it is preferable that the difference in solubility parameter (SP value) between these resins is 1 or less from the viewpoint of developing a high impact resistance.

When blending the first resin (A1), second resin with a reactive functional group (A2), and third resin (B) to prepare a fiber reinforced resin composition according to the invention, the first resin (A1) should account for 0.1 to 75 wt %, the second resin (A2) for 0.1 to 15 wt %, and the third resin (B) for 10 to 99.8 wt %. Here, the total of the first resin (A1), second resin (A2) and third resin (B) accounts for 100 wt %. If the content of the second resin (A2) is less than 0.1 wt %, it will be impossible to develop a high impact resistance which is a major feature of the invention, while if it is more than 15 wt %, it will lead, unfavorably, to a decrease in the rigidity which is another major feature of the invention.

In the case where the first resin (A1) and the third resin (B) are the same resin, the component (A1) and the component (B) should together account for 85 to 99.9 wt % assuming that the total of the component (A1), component (A2), and component (B) accounts for 100 wt %. Accordingly, with respect to the resin composition in this case, the component (A1=B) accounts for 85 to 99.9 wt %, while the component (A2) accounts for 0.1 to 15 wt %.

Examples of said fibrous filler (C) include glass fiber, glass milled fiber, carbon fiber, potassium titanate whisker, zinc oxide whisker, aluminum borate whisker, aramid fiber, alumina fiber, silicon carbide fiber, ceramic fiber, asbestos fiber, gypsum fiber, and metal fiber. These may have a hollow structure. Two or more of these fibrous fillers may be used in combination. Furthermore, these fibrous fillers may be pretreated with a coupling agent etc. such as an isocyanate compound, organic silane compound, organic titanate compound, organic borane compound, and epoxy compound in order to achieve good mechanical characteristics.

Of the fibrous fillers listed above, carbon fiber and glass fiber are more preferable, and carbon fiber is the most preferable to achieve still better mechanical characteristics.

Said fibrous filler (C) preferably has a tensile modulus of 10 GPa or more, more preferably 50 GPa, and still more preferably 200 GPa from the viewpoint of providing moldings with improved dynamical characteristics. The use of a fibrous filler (C) with a tensile modulus of 10 GPa or more serves to provide a fiber reinforced resin composition with a largely improved rigidity.

To achieve better mechanical characteristics, it is preferable that one or more selected from the group of divalent or higher epoxy resin, resin with an alkoxy silyl group, polyurethane, polyamide, polyvinyl acetate, ionomer, and unsaturated polyester are carried on the surface of the fibrous fillers.

Assuming that the total of the components (A1), (A2) and (B) accounts for 100 parts by weight, the fibrous filler (C) should account for 0.1 to 300 parts by weight, preferably 0.1 to 100 parts by weight. If the content is less than 0.1 parts by weight, the fibrous filler will not have sufficient effect, and therefore it is not preferable. If the content is more than 300 parts by weight, the flowability during the molding process will be low, leading to a decreased shapability, and therefore it is not preferable.

The fiber reinforced resin composition according to the invention is produced by carrying out:
a step (1) of melt-kneading a first resin (A1) and a second resin with a reactive functional group (A2) to produce a melt-kneaded product (A), and a step (2) of combining said melt-kneaded product (A) with a third resin (B) and a fibrous filler (C) to form a composite structure.

Said step (1) provides a melt-kneaded product (A) composed of a matrix phase that comprises the component (A1) to form a continuous layer and a dispersal phase that comprises dispersed particles of the component (A2). This step serves for high level control of the particle structure of the component (A2) and contributes highly affectively to improvement in the impact resistance.

Subsequently, said step (2) acts to mix the component (A1) and the component (B) to form a matrix resin and produce a fiber reinforced resin composition consisting of particles of the component (A2) dispersed in said matrix resin. The particles of the component (A2) should have a number average particle diameter of 10 to 1,000 nm. If the number average particle diameter of said particles is less than 10 nm, it will be impossible to develop a high impact resistance which is a major feature of the invention, while if it is more than 1,000 nm, it will be lead to a decrease in the rigidity which is another major feature of the invention, suggesting that such diameters are not desirable. A small amount of particles of the component (A2), which has a highly controlled structure, acts to achieve an improved impact resistance, and this serves to provide a fiber reinforced resin composition having rigidity and impact resistance in a good balance.

It is preferable furthermore that in the fiber reinforced resin composition according to the invention, the particles of the component (A2) contain finer particles with a number average particle diameter of 1 to 100 nm of the compound resulting from the reaction of the components (A1) and (A2). In addition, it is preferable that the finer particles resulting from the reaction of the components (A1) and (A2) account for 20% or more of the particles of the component (A2) in terms of area proportion. Even if the component (A2) which forms the dispersal phase is small in amount, a fiber reinforced resin composition that has rigidity and impact resistance in a good balance can be produced by controlling the structure in the dispersal phase as described above.

Here, generally known methods may be applied to the morphology observation. In one of them, a 1 to 2 mm square is cut out from the through-thickness center portion of a specimen, and the resin with a reactive functional group (A2) is dyed with ruthenium tetroxide, followed by preparing an ultrathin section with a thickness of 0.1 µm or less (about 80 nm) with an ultramicrotome and observing the resin portion (the portion given in FIG. 1 excluding the fibrous filler) consisting of the component (A1), component (A2) and component (B) in the section by transmission electron microscopy. To determine the number average particle diameter (Xn) of the particles, 400 or more particles are extracted at random from the resulting picture, and the particle diameter distribution is analyzed with a Scion Image image analyzing program supplied by Scion Corporation, followed by calculation by the following equation.

$$\text{Number average particle diameter}(Xn) = \Sigma(Xi \times ni)/\Sigma ni$$

Xi: particle diameter
ni: number of particles corresponding to particle diameter (Xi)
(i=1, 2, 3, . . . , n)

The number average particle diameter of the particles of the component (A2) can be determined from a 10,000× enlarged picture. The number average particle diameter of the finer particles that result from the reaction of the components (A1) and (A2) and are contained in the particles of the component (A2) can be determined from a 35,000× enlarged picture.

The area proportion of said finer particles in the particles of the component (A2) is determined from a 35,000× enlarged picture taken by transmission electron microscopy. A Scion Image image analyzing program supplied by Scion Corporation is used to analyze the area of the component (A2) and the area of the finer particles in the particles of the component (A2), followed by calculation by the following equation.

$$Sn = Sp/(Sa2 + Sp)$$

Sn: area proportion (Sn) of the finer particles occupied in the particles of the component (A2)
Sat: area occupied by the component (A2)
Sp: area occupied by the finer particles in the particles of the component (A2)

To achieve rigidity and impact resistance in a good balance, it is preferable that the fiber reinforced resin composition according to the invention has an elastic modulus 0.9 times or more that of a fiber reinforced resin composition that consists only of the components (B) and (C) and simultaneously has a Charpy impact strength 1.2 times or more that of a fiber reinforced resin composition that consists only of the components (B) and (C).

There are no specific limitations on the production method for said melt-kneaded product (A) for the invention, but effective methods include, for instance, the following.

A production method for said melt-kneaded product (A) is as follows: the first resin (A1) and the second resin with a reactive functional group (A2) are fed to a twin screw extruder that has a ratio $L/D_0$ of the screw length L to the screw diameter $D_0$ of 50 or more and has two or more full flight zones and kneading zones, and melt-kneading is carried out under conditions where the maximum resin pressure, Pkmax (MPa), in the kneading zones in the screw and the minimum resin pressure, Pfmin (MPa), in the full flight zones in the screw meet the following equation:

$$Pk\text{max} \geq Pf\text{min} + 0.3$$

From the viewpoint of improving the kneadability and reactivity, the value of $L/D_0$ is more preferably in the range of 60 to 200, and still more preferably 80 to 200. When using a twin screw extruder with a $L/D_0$ ratio of less than 50, it is preferable to carry out the kneading step two or more times so that the theoretical $L/D_0$ value for the resin composition that has passed through is 50 or more. The $L/D_0$ ratio is calculated by dividing the screw length L by the screw diameter $D_0$. Here the screw length is defined as the length from the upstream edge of the screw segment located at a position in the root portion of the screw where the first resin (A1) and the second resin with a reactive functional group (A2) are supplied (feed port), to the end of the screw. The screw of a twin screw extruder consists of screw segments, such as full flight and kneading disk, that are different in length and other dimensional features. In an extruder, the direction towards the supply port of the input materials and that towards the discharge port of the molten resin may be referred to as upstream and downstream, respectively.

When using a twin screw extruder with a $L/D_0$ ratio of 50 or more to produce said melt-kneaded product (A), the screw of the twin screw extruder preferably has two or more full flight zones and kneading zones to achieve improved kneadability and reactivity. A full flight zone comprises one or more full flights, and a kneading zone comprises one or more kneading disks.

Two or more resin pressure gauges are installed at different positions in the kneading zone, and the largest of the resin pressure values measured in the kneading zone is denoted as Pkmax (MPa). Two or more resin pressure gauges are installed at different positions in the full flight zone, and the smallest of the resin pressure values measured in the full flight zone is denoted as Pfmin (MPa). Then, it is preferable to perform the production step under conditions where the value of Pkmax is (Pfmin+0.3) or more, more preferably where the value of Pkmax is (Pfmin+0.5) or more.

The molten resin is more kneadable and reactive in a kneading zone comprising one or more kneading disks than in a full flight zone comprising one or more full flights. The kneadability and reactivity is dramatically improved when the kneading zone is filled with molten resin. The resin pressure serves as an indicator of the degree of filling with the molten resin, and the resin pressure increases as the zone is filled with the molten resin to a higher degree. In the case of using a twin screw extruder, therefore, the reaction can be accelerated effectively by increasing the resin pressure in the kneading zone in a certain range above the resin pressure in the full flight zone.

There are no specific limitations on the method to be used to increase the resin pressure in the kneading zone, but as a preferable method, a reverse screw zone that can push back the molten resin in the upstream direction or a seal ring zone that can retain the molten resin is introduced between kneading zones or on the downstream side of a kneading zone. Said reverse screw zone and said seal ring zone consist of one or more reverse screws or one or more seal rings, and they may be used in combination.

For instance, if a reverse screw zone is introduced between kneading zones or on the downstream side of a kneading zone, the reverse screw zone preferably meets the length relation $Lr/D_0=0.1$ to 10 where Lr denotes the length of the reverse screw zone, from the viewpoint of the kneadability and reactivity. The length ratio of the reverse screw zone, $Lr/D_0$, is more preferably 0.2 to 8, and still more preferably 0.3 to 6. In the case where there are two or more reverse screw zones, it is preferable that each of the reverse screw zones is in the $Lr/D_0$ range described above. Here, the length of a reverse screw zone, Lr, is defined as the distance between the perpendicular from the upstream end of the most upstream reverse screw in the reverse screw zone to the center line of the screw axis and the perpendicular from the downstream end of the most downstream reverse screw in the reverse screw zone to the center line of the screw axis.

If a twin screw extruder with a $L/D_0$ ratio of 50 or more is used to produce said melt-kneaded product (A), the extrusion rate is preferably 0.01 kg/h or more, more preferably 0.05 kg/h to 1 kg/h, still more preferably 0.08 to 0.5 kg/h, and most preferably 0.1 to 0.3 kg/h, per rpm of the screw. Here, the extrusion rate is defined as the weight (kg) of the melt-kneaded product discharged from extruder in a 1 hour period.

The preferable numeral range given above for the extrusion rate of a twin screw extruder is based on the extrusion rate of a twin screw extruder with a screw diameter of 41 mm. If the actual screw diameter is largely different from this, such as in the case of using a twin screw extruder with a diameter of less than 30 mm or with a diameter of more than 50 mm, it should be assumed that the extrusion rate increases or decreases preferably according to the 2.5 power law or the 3 power law, more preferably according to the 2.5 power law, as compared with the screw diameter ratio before and after the scaling up or scaling down.

When using a twin screw extruder with a screw diameter of 20 mm, for instance, the extrusion rate of the melt-kneaded product is preferably 0.0017 kg/h or more, more preferably 0.0083 to 0.17 kg/h, still more preferably 0.013 to 0.083 kg/h, and most preferably 0.017 to 0.050 kg/h, per rpm of screw rotation assuming that the extrusion rate meets the 2.5 power law for the screw diameter ratio before and after the scaling down.

When using a twin screw extruder with a screw diameter of 100 mm, the extrusion rate of the melt-kneaded product is preferably 0.093 kg/h or more, more preferably 0.46 to 9.29 kg/h, still more preferably 0.74 to 4.65 kg/h, and most preferably 0.93 to 2.79 kg/h, per rpm of screw rotation assuming that the extrusion rate meets to the 2.5 power law for the screw diameter ratio before and after the scaling up.

There are no specific limitations on the rotating speed of the screw, but it is preferably 10 rpm or more, more preferably 15 rpm or more, and still more preferably 20 rpm or more.

The residence time in a twin screw extruder is preferably 1 to 30 minutes, more preferably 1.5 to 25 minutes. This residence time is the average time period when the material stays in the twin screw extruder after its supply to its discharge. To determine the residence time, the colorless melt-kneaded product adjusted to a steady melting-kneading state at a predetermined extrusion rate is fed with 1 g of a coloring agent along with the input materials to the root portion of the screw where the material is supplied, followed by measuring the time period from the feeding of the coloring agent until the degree of coloring of the extruded material with the coloring agent reaches a maximum as it is discharged from the outlet of the extruder.

In the case of using a twin screw extruder with a $L/D_0$ ratio of 50 or more to produce said melt-kneaded product (A), there are no specific limitations on the screw for the twin screw extruder, and the screw may be of a full intermeshing, incomplete intermeshing or non-intermeshing type. The use of a fully intermeshed screw is preferable from the viewpoint of kneadability and reactivity. With respect to the direction of screw rotation, the screw segments may rotate in the same direction or in the opposite directions, but a co-rotating type screw is preferable from the viewpoint of kneadability and reactivity. Thus, a fully intermeshing co-rotating screw is the most preferable.

With respect to the screw constitution of the twin screw extruder, full flights and/or kneading disks are used in combination, and it is preferable to use a screw constitution that can effectively produce a shearing field in the resin composition in a molten state. To this end, it is preferable as described above that the screw in the twin screw extruder used has two or more kneading zones, each composed of one or more kneading disks, arranged in the length direction. The total length of these kneading zones is preferably 5 to 50%, more preferably 10 to 40%, and still more preferably 15 to 30%, of the total screw length.

Assuming that each kneading zone in the screw in a twin screw extruder has a length Lk, it is preferable that the length of each kneading zone meets the equation $Lk/D_0=0.2$ to 10 from the viewpoint of kneadability and reactivity. The length ratio of the kneading zone, $Lk/D_0$, is more preferably 0.3 to 9 and still more preferably 0.5 to 8. Here, the length of a kneading zone, Lk, is defined as the distance between the perpendicular from the upstream end of the most upstream kneading disk in the kneading zone to the center line of the screw axis and the perpendicular from the downstream end of the most downstream kneading disk in the kneading zone to the center line of the screw axis. It is preferable that the kneading zones in a twin screw extruder are disposed at intervals over the entire length of the screw instead of being disposed unevenly at specific positions.

To remove by-product or heat degradation substance, it is preferable that a vacuum vent zone is provided to reduce the pressure to a gauge pressure of −0.07 MPa or less in the melt-kneading step, and it is more preferable to reduce the pressure to a gauge pressure of −0.08 MPa or less in the melt-kneading step. Here, the gauge pressure represents a pressure based on the atmospheric pressure which is defined as zero. As it decreases, the degree of vacuum increases and volatile components are removed more rapidly. If the gauge pressure in the vacuum vent zone is more than −0.07 MPa, that is, in the case of a low degree of vacuum, said volatile components cannot be removed sufficiently and impurities will remain in the melt-kneaded product (A), indicating that it is not preferable. Volatile components in the vacuum vent zone should be removed sufficiently so that the quantity of impurities in the melt-kneaded product will be reduced. There are no specific limitations on the number of vacuum vent zones and it is preferable to provide one or more vacuum vent zones. There are no specific limitations on the positions of the vacuum vent zones, but it is preferable to provide at least one at the position where $L/D_0=0$ to 10 short of the sampling position to allow said volatile components to be removed effectively.

It is preferable to control the maximum resin temperature at 180° C. to 330° C. during the melt-kneading step, and it is more preferable to carry out the melt-kneading step at 200° C. to 325° C. Here, the maximum resin temperature is the highest of the temperature measurements made with two or more resin thermometers equally spaced in the extruder. The reactivity between polymers will be too low if the maximum resin temperature is lower than 180° C., while the polymers will be heat-decomposed rapidly if it is higher than 330° C.

If a twin screw extruder is used, it is preferable that the melt-kneading step is performed while introducing an inert gas through the material feed port to depress heat degradation. As said inert gas, it is preferable to use nitrogen gas.

Another method available for production of said melt-kneaded product (A) is to perform the melt-kneading step while stretching the flow of said first resin (A1) and the second resin with a reactive functional group (A2). As compared with a shear flow generally used for melt-kneading, dispersion is achieved efficiently when kneading is performed in a stretched flow. In particular, in the case of an alloy involved in a reaction such as in reactive processing, the reaction progresses very efficiently.

To produce said melt-kneaded product (A) by carrying out the melt-kneading step in a stretched flow, an extruder is used preferably to carry out the melt-kneading step, and preferable examples of said extruder include single screw extruder, twin screw extruder, and tri- or higher-axial multi-axis extruder. Of these, the single screw extruder and the twin screw extruder are preferred, and the twin screw extruder is particularly preferred. There are no specific limitations on the type of screw used in the twin screw extruder, and the screw to be used may be of a full intermeshing, incomplete intermeshing or non-intermeshing type. The use of a fully intermeshed screw is preferable from the viewpoint of kneadability and reactivity. With respect to the direction of screw rotation, the screw segments may rotate in the same direction or in the opposite directions, but a co-rotating type screw is preferable from the viewpoint of kneadability and reactivity. Thus, a fully intermeshing co-rotating screw is the most preferable.

To produce a stretched flow suitable for reactive processing, the total length of the stretched flow zones preferably accounts for 5 to 60%, more preferably 10 to 55%, and still more preferably 15 to 50%, of the total length of the screw in the extruder.

Assuming that each stretched flow zone in the screw in a twin screw extruder has a length Lk and that the screw has a diameter of $D_0$, it is preferable that the ratio $Lk/D_0$ is 0.2 to 10 from the viewpoint of kneadability and reactivity. It is more preferably 0.3 to 9, still more preferably 0.5 to 8. If there are two or more stretched flow zones, it is preferable that each of the stretched flow zones is in said $Lk/D_0$ range. It is preferable that the stretched flow zones are disposed at intervals over the entire length of the screw instead of being disposed unevenly at specific positions.

With respect to the screw constitution in a stretched flow zone, it is preferable, for instance, that the screw comprises a kneading disk, which may be a twist kneading disk in which the helix angle θ, i.e. the angle between the kneading disk's apex on the disk's top side and the apex on its rear plane side, is in the range of 0°<θ<90° in the half-turn direction of the screw, that it comprises a flighted screw with a resin passage that is provided in the flight portion of said flighted screw and whose cross section decreases progressively from the top end to the rear end of the screw, or that it comprises a resin passage with a progressively decreasing cross section to allow molten resin to pass through the extruder.

The extrusion rate per rpm of the screw is preferably 0.01 kg/h or more. Here, the extrusion rate is defined as the weight (kg) of the melt-kneaded product discharged from extruder in a 1 hour period. If the extrusion rate per rpm of the screw is less than 0.01 kg/h, the extrusion rate will not be sufficiently high as compared with the rotating speed, and the residence time in the extruder will be too long. As a result, heat degradation can be caused and the degree of filling of the extruder with the resin will be extremely low, leading to the problem of insufficient kneading. There are no specific limitations on the rotating speed of the screw, but it is preferably 10 rpm or more, more preferably 50 rpm or more, and still more preferably 80 rpm or more. The extrusion rate is preferably 0.1 kg/h or more, more preferably 0.15 kg/h or more, and still more preferably 0.2 kg/h or more.

The residence time in the extruder is preferably 1 to 30 minutes, more preferably 1.5 to 28 minutes, and still more preferably 2 to 25 minutes. The residence time is the average time period when the material stays in the extruder after its supply to its discharge. To determine the residence time, the colorless resin composition adjusted to a steady melting-kneading state at a predetermined extrusion rate is fed with 1 g of a coloring agent along with the input materials to the root portion of the screw where the material is supplied, followed by measuring the time period from the feeding of the coloring agent until the degree of coloring of the extruded material with the coloring agent reaches a maximum as it is discharged from the outlet of the extruder. A residence time of less than 1 minute is not preferable because in that case, the reaction time in the extruder will be too short and the reaction will not proceed sufficiently. A residence time of more than 30 minutes is not preferable because in that case, the residence time will be too long and the resin will suffer heat degradation.

Both in the case where a twin screw extruder with a $L/D_0$ ratio of 50 or more is used to produce said melt-kneaded product (A) and in the case where melt-kneading is carried out in a stretched flow to produce said melt-kneaded product (A), the proportion of the first resin (A1) and the resin with a reactive functional group (A2) is preferably such that the component (A1) accounts for 80 to 60 wt % while the component (A2) accounts for 20 to 40 wt %, because in that case, the component (A1) and the component (A2) will form a continuous phase and a dispersal phase, respectively, and in addition, the particles of the component (A2) will contain finer particles of 1 to 100 nm of the compound produced through the reaction of the component (A1) and the component (A2), with said fine particles accounting for 20% or more of the particles of the component (A2) in terms of area proportion.

The fiber reinforced resin composition according to the invention that has rigidity and impact resistance in a good balance can be produced by blending said third resin (B) and said fibrous filler (C) with said melt-kneaded product (A) while controlling the structure of the resulting dispersal phase with high accuracy.

Other rubber compounds or various additives may be added as required to the fiber reinforced resin composition according to the invention as long as they do not impair its characteristics.

Preferable examples of said rubber compounds include, for instance, natural rubber, its modified products, polyethylene elastomers, other thermoplastic elastomers, and their modified products. Two or more of these rubber compounds may be used in combination.

Preferable examples of said various additive include crystal nucleating agent, color protection agent, antioxidant such as hindered phenol and hindered amine, mold releasing agent such as ethylene bis-stearyl amide and higher fatty acid ester, plasticizer, thermal stabilizer, lubricant, ultraviolet ray prevented agent, coloring agent, and foaming agent.

A flame retardant (E) may be added as required in the fiber reinforced resin composition. There are no specific limitations on the flame retardant, but examples include, for instance, halogen based flame retardant containing bromine or chlorine as a functional group, phosphorous flame retardant, metal hydroxide such as aluminum hydroxide and magnesium hydroxide, boric acid zinc, antimony trioxide, antimony pentoxide, melamine, melamine cyanurate, and silicone based flame retardant. Examples of said phosphorous flame retardant include phosphoric acid ester compounds such as red phosphorus, trimethyl phosphate, triphenyl phosphate, resorcinol bis(di-2,6-xylyl) phosphate, and resorcinol bis-diphosphate; phosphoric salts such as ammonium polyphosphate and polymelamine phosphate; metallic phosphinates such as aluminum phosphinate and magnesium phosphinate; and phosphazene compounds such as phenyl phosphonitrilate. The use of a halogen based flame retardant or phosphorous flame retardant is preferable because of their high fire retardance. In particular, it is more preferable to use a flame retardant selected from the group of red phosphorus, phosphoric acid ester compound, metallic phosphinate, and phosphazene compound from the viewpoint of safety and environmental load, and the use of a metallic phosphinate is particularly preferable. These flame retardants may be used singly or as a combination of two or more thereof.

When using these flame retardants, their content is preferably 5 to 50 parts by weight, more preferably 15 to 40 parts by weight, per 100 parts by weight of the fiber reinforced resin composition. If the content is less than 5 parts by weight, it will be impossible to achieve a sufficiently high fire retardance. A content of more than 50 parts by weight is not preferable because in that case, the rigidity will decrease.

These rubber compounds, various additives, and flame retardants may be added at any appropriate stage of the process of producing the fiber reinforced resin composition. In the case where a fiber reinforced resin composition is produced with a twin screw extruder, for instance, they may be added when the resin ingredients are combined, may be added through a side feed opening etc. during the melt-kneading step of the resin, may be added after the melt-kneading step of the resin, or may be added first to one of the resin ingredients that constitute the fiber reinforced resin composition, followed by melt-kneading and subsequently addition the remaining resin ingredients.

The fiber reinforced resin composition according to the invention is produced by mixing said melt-kneaded product (A), third resin (B), and fibrous filler (C). There are no specific limitations on the method to be used to mix the melt-kneaded product (A), third resin (B), and fibrous filler (C), and preferable examples of said method include:

Method (1): The melt-kneaded product (A), third resin (B) and fibrous filler (C) are melt-kneaded simultaneously;

Method (2: The fibrous filler (C) is mixed with either the melt-kneaded product (A) or the third resin (B), and then the resulting composition is mixed with the component (A) or (B) that is not contained in said composition is added, followed by feeding in the molding machine and melt-kneading in the molding machine; and Method (3): The melt-kneaded product (A) and the third resin (B) are melt-kneaded, and then the resulting composition is mixed with the fibrous filler (C).

The method (1) is economically advantageous because the components (A), (B), and (C) can be melt-kneaded at once. The method (2) is advantageous in terms of flexibility during the molding step because the content of the components (A) or (B) can be controlled easily. The method (3) is advantageous in terms of dynamical characteristics of the resulting moldings because the component (C) will not suffer significant damage during the production step.

There are no specific limitations on the melt-kneading method, and the extruder, for instance, may be a single screw extruder, twin screw extruder, tri- or higher-axial multi-axis extruder, or biaxial/uniaxial composite type extruder. Of these, the single screw extruder and the twin screw extruder are preferred, and the twin screw extruder is particularly preferred. There are no specific limitations on the type of screw for the twin screw extruder, and a full intermeshing, incomplete intermeshing or non-intermeshing type screw may be used. A full intermeshing type screw is preferred from the viewpoint of kneadability. With respect to the direction of screw rotation, the screw segments may rotate in the same direction or in the opposite directions, but a co-rotating type screw is preferable from the viewpoint of kneadability. Non-extruder type melt-kneading machines such as Banbury mixer, kneader, and mixing roll may also be used.

The fiber reinforced resin composition according to the invention can be used preferably as molding material such as prepreg, resin transfer molding base material (RTM base material), sheet molding compound base material (SMC base material), pellet-like molding material, and sheet-like molding material.

If the third resin (B) is a thermosetting resin, moldings with high rigidity are obtained, and therefore, said composition may be used preferably as prepreg, RTM base material, or SMC base material. In particular, it is used highly preferably as prepreg and RTM base material from the viewpoint of the dynamical characteristics of resulting moldings.

If the component (B) is a thermoplastic resin, the composition is used preferably as pellet-like molding material or sheet-like molding material from the viewpoint of moldability.

The prepreg is a molding material composed of a fiber base impregnated with a resin composition. In the case of the invention, it is preferable to use a prepreg in which the fibrous filler (C) is in the form of a continuous reinforcement fiber bundle, and said reinforcement fiber is impregnated with a resin composition composed of the melt-kneaded product (A) and the third resin (B).

Here, preferable examples of said fibrous filler (C) used as reinforcement fiber bundle include carbon fiber and glass fiber, of which carbon fiber is more preferable. There are no specific limitations on the morphology of the fibrous filler (C), and it may be in the form of, for instance, paralleled long fiber yarn, tow, woven fabric, mat, knit fabric, and braid. Here, "long fiber" refers to a bundle of monofilaments or fibers virtually continuous over a length of 50 mm or more. For uses where high specific strength and high inelasticity are required, in particular, bundles of paralleled long fibers are most suitable, and fibers in the form of a woven fabric with a high handleability are also preferred.

Examples of the method for impregnating a reinforcement fiber bundle with a resin composition include the wet process that uses the resin composition for impregnation after decreasing its viscosity by dissolving it in a solvent such as methyl ethyl ketone and methanol and the hot melt process (dry process) that performs impregnation after heating the composition to decrease its viscosity.

In the wet process, the fibrous filler (C) is immersed in a solution of the resin composition and then pulled out, followed by evaporation of the solvent using an oven etc. In the hot melt process, the resin composition is heated for viscosity reduction and then used directly to impregnate the fibrous filler (C). The use of the hot melt process is preferable because the residual solvent in the prepreg can be removed virtually completely.

In the resin composition contained in a prepreg according to the invention, particles of the component (A2) may be uniformly dispersed in the matrix resin composed on the components (A1) and (B), or may be localized on the surface of the prepreg. If particles of the component (A2) are localized on the surface of the prepreg, the contact between the fibrous filler (C) in adjacent prepreg plates in the laminate can be prevented, leading to the formation of moldings with high rigidity.

Said hot melt process is used preferably to prepare prepreg plates of such a constitution. In a specific example, a melt-kneaded product the melt-kneaded product (A) and the third resin (B) is first spread over a piece of release paper etc. to prepare a film. The film is put on both sides or one side of the fibrous filler (C) and heated under pressure to allow the fibrous filler (C) to be impregnated with the resin composition. The fibrous filler (C) works as filter during the resin impregnation step to allow the particles of the component (A2) to be localized on the prepreg surface.

In the prepreg, the quantity of the reinforcement fiber per unit area is preferably 60 to 2,000 g/m². If the quantity of the reinforcement fiber is less than 60 g/m², a larger number of prepreg plates may have to be stacked to provide moldings with a predetermined thickness, which may require extra work. If the quantity of the reinforcement fiber is more than 2,000 g/m², on the other hand, the prepreg tends to suffer deterioration in drape properties. The content of the reinforcement fiber in the prepreg is preferably 50 to 95 wt %, more preferably 55 to 90 wt %. If the content of the reinforcement fiber is less than 50 wt %, the quantity of the resin will be too large, possibly failing to achieve a fiber reinforced composite material having the advantage of a high specific strength and specific modulus and leading to an excessively large heat generation during the curing step for molding. If the content of the reinforcement fiber is more than 95 wt %, on the other hand, resin impregnation may not be achieved sufficiently, possibly leading to a large number of voids in the resulting composite material.

To produce a molding from the prepreg, prepreg plates may be, for instance, shaped and/or stacked, and a molding is produced by heat-curing the resin while applying a pressure on the shaped or stacked plates. Here, heat and pressure may be applied as necessary by such methods as press molding, autoclave molding, bagging molding, wrapping tape molding, internal pressure molding, etc.

A molding method using a RTM base material comprises a step of placing a base material containing the fibrous filler (C) in a die and a step of injecting a resin composition containing said third resin (B) to provide a molding. Furthermore, from the viewpoint of moldability, preferred preforms are produced by stacking and shaping base material plates containing said fibrous filler (C) and fixing the shape using a binding agent, stitches, or other means.

The fibrous filler (C) to be used for said RTM base material is preferably carbon fiber or glass fiber, of which carbon fiber is more preferable. There are no specific limitations on the morphology of the fibrous filler (C), and paralleled long fiber yarn, tow, woven fabric, mat, knit fabric, and braid, for instance, have been used preferably. Here, "long fiber" refers to a bundle of monofilaments or fibers virtually continuous over a length of 50 mm or more. In particular, woven fabrics are used preferably because of their high handleability during the preforming step.

From the viewpoint of the mechanical characteristics of resulting moldings, it is preferably to include a preliminary step of fusion-bonding said melt-kneaded product (A), as a binder, on a base material that contains said fibrous filler (C).

Here, there are no specific limitations on the morphology of the binder, and it may be in the form of, for instance, particles, short fiber, paralleled continuous fiber, woven fabric, knitted fabric, nonwoven fabric, or perforated film. In particular, a binder in the form of particles is preferable because it can be dispersed uniformly in the reinforcement fiber. If a binder used in the form of particles, their volume average particle diameter is preferably in the range of 0.01 to 500 μm. The use of particles with a volume average particle diameter of less than 0.01 μm is not preferable from the viewpoint of binding of the fiber base material because in that case, they can get into gaps in the fibrous filler. The use of particles with a volume average particle diameter of larger than 500 μm is not preferable because in that case, the reinforcement fiber may be bent when plates of reinforcement fiber base material are stacked, possibly leading to a fiber reinforced composite material with a decreased strength. The metsuke (weight per unit surface area) of the particles is preferably 5 to 50 g/m² from the viewpoint of binding of the fiber base and impregnation properties of the matrix resin.

Commonly, a mold is used to inject a resin composition into preform. Usable examples of said mold include closed mold made of a rigid material and a combination of an open mold made of a rigid material with a flexible film (bag). In the latter case, reinforcement fiber base material is injected between the rigid, open mold and the flexible film. Materials used for these rigid molds include, for instance, metals (steel, aluminum, INVAR, etc.), FRP, wood, gypsum, and other various existing materials. Materials used for said flexible film include nylon, fluorine resin, and silicone resin. Commonly, when a rigid, closed mold is used, pressure is applied for mold clamping, and a matrix resin composition is injected under pressure.

In this case, a suction hole may be provided in addition to the injection hole to perform aspiration by an appropriate means such as vacuum pump. If aspiration is performed, the resin composition may be injected under atmospheric pressure without using any particular pressurizing means. When a combination of a rigid, open mold and a flexible film is used, VaRTM (vacuum-assisted RTM) is commonly performed, which uses an aspiration hole for aspiration by an appropriate means such as vacuum pump to achieve injection under atmospheric pressure.

When producing moldings from RTM base material, the volume content of the fibrous filler is preferably 45 to 65%. If the volume content of the fibrous filler is less than 45%, the fibrous filler may not show its performance sufficiently, possibly leading to a fiber reinforced composite material with a decreased strength and elastic modulus. If the volume content of the fibrous filler is more than 65%, on the other hand, the strength may be decreased as a result of abrasion between fibers in the reinforcement fiber.

Of the various forms of molding material according to the invention, pellet-like molding material is suitable particularly for producing moldings of a complicated shape by injection molding etc. while sheet-like molding material suitable particularly for producing moldings of a planar or curved shape by press molding etc.

With respect to the pellet-like molding material and sheet-like molding material, there are no specific limitations on the fiber length in the fibrous filler (C), and both continuous fiber and discontinuous fiber are preferred. Discontinuous fiber is used preferably from the viewpoint of the flowability of molding material. When used in the form of discontinuous fiber, the fibrous filler preferably has a number average fiber length of 0.1 to 50 mm, more preferably 0.2 to 30 mm. Here, the number average fiber length of a fibrous filler can be measured as follows. A portion of a molded product is cut out, and heated in air in an electric furnace at 500° C. for 1 hour for sufficient incineration and removal of the resin to separate the reinforcement fiber. At least 400 fibers are extracted randomly from the separated reinforcement fiber, and their length is measured under an optical microscope to the nearest 1 μm, followed by calculation of the number average fiber length (Ln) by the following equation.

Number average fiber length(Ln)=($\Sigma Li$)/Ntotal

Li: fiber length measured (i=1, 2, 3, . . . , n)
Ntotal: total number of fibers subjected to fiber length measurement If the fibrous filler (C) is in the form of continuous fibers, on the other hand, it is preferably because the fibrous filler (C) in the resulting moldings will have a large number average fiber length, and the moldings will have a high impact resistance.

There are no specific limitations on the production method for pellet-like molding material, and typical methods include melt-kneading the melt-kneaded product (A), third resin (B), and fibrous filler (C); using the pultrusion technique for continuous impregnation of a continuous type fibrous filler (C) in a bath of a molten resin composition composed of the melt-kneaded product (A) and third resin (B), followed by taking up the product, cooling and solidifying the resin, and cutting the product (resin impregnated type pellet method); and using the wire coating technique for coating bundles of the fibrous filler (C) with said resin composition (core-in-sheath type pellet method). It is preferable for these pellets to have a length in the range of 1 to 50 mm.

Of these pellet-like molding materials, said resin impregnated type pellets and said core-in-sheath type pellets are characterized by the fact that the fibrous filler (C) is oriented parallel to the axis direction of the molding material and also that the fibrous filler and the molding material have virtually the same length. Thus, they have been preferred because they can form moldings with high impact resistance.

Here, "being oriented parallel" refers to a state in which the axis line of the long axis of the fibrous filler and the axis line of the long axis of molding material are nearly in the same direction. The angle between the two axis lines is preferably 20° or less, more preferably 10° or less, and still more preferably 5° or less.

Furthermore, "virtually the same length" means that the molding material virtually does not contain filler fibers that are significantly shorter than the overall length of the former. Specifically, it is assumed that the molding material virtually does not contain filler fibers that are significantly shorter than the overall length of the former if filler fibers with a length 50% or less of the overall length of the molding material accounts for 30 wt % or less of the total weight of the fibrous filler. Furthermore, it is preferable that said filler fibers with a length 50% or less of the overall length of the molding material accounts for 20 wt % or less. Here, the overall length of the molding material is defined as its length in the orientation direction of the fibrous filler in the molding material. In the state where the fibrous filler and the molding material have virtually the same length, the length of the fibrous filler in the molded product can be maximized, leading to good mechanical characteristics.

Said core-in-sheath type pellets consist of said fibrous filler (C) as core and said melt-kneaded product (A) and third resin (B) as sheath. The resin composition forming the sheath will become the matrix resin in the resulting moldings.

Said melt-kneaded product (A) and third resin (B) may be melt-kneaded. Or, either of the melt-kneaded product (A) and the third resin (B) may be combined with the fibrous filler (C) to form composite pellets, and these pellets may be blended with pellets of the other of the two components (A) and (B), followed by feeding them in a molding machine to achieve melt-kneading in the molding machine.

The use of a melt-kneaded product of the components (A) and (B) is advantageous because they can be kneaded efficiently, and therefore, the resulting moldings will be small in strength variation. The use of either of the components (A) and (B) to form core-in-sheath type pellets to be blended with the other of the two before molding is advantageous because composition adjustment can be performed by changing the compounding ratio of the molding material.

The core portion of said core-in-sheath type pellets may contain, as a component (D), a thermoplastic polymer that has a weight average molecular weight of 200 to 50,000 and also has a melt viscosity lower than that of the resin composition composed of the melt-kneaded product (A) and the third resin (B). Said component (D) is a thermoplastic polymer lower in viscosity than the melt-kneaded product (A) or the resin (B) and plays the role of a so-called impregnation assistant or dispersion assistant that forms a composite structure with said fibrous filler (C) to assist the impregnation of the fibrous filler (C) with the matrix resin during the molding step and assist the dispersion of the fibrous filler (C) in the matrix.

If the weight average molecular weight of the component (D) is less than 200, it will easily evaporate when heated, possibly resulting in the formation of defects such as voids in the moldings. If the molecular weight is larger than 50,000, on the other hand, the melt viscosity will be too high as a result, and impregnation with fiber bundles will be difficult, leading to a decreased productivity of the molding material. The molecular weight of the component (D) is more preferably in the range of 200 to 14,000, still more preferably in the range of 200 to 1,000. The weight average molecular weight referred to here can be determined by gel permeation chromatography (GPC). With respect to the relation in melt viscosity, the melt viscosity of the component (D) is required only to be lower than the melt viscosity of said resin composition at the temperature of the molding step.

The melt viscosity of the component (D) is preferably 100 poise or less. It is more preferably 20 poise or less. If the melt viscosity is more than 100 poise, impregnation with the fibrous filler (C) will be difficult, leading to a decreased productivity of the molding material. The melt viscosity of said resin composition is preferably 500 poise or more. For a crystalline substance with a definite melting point, the melt viscosity referred to here is its viscosity at a temperature 30° C. above its melting point. For a crystalline substance without a definite melting point, it is the viscosity at a temperature 30° C. above the Vicat softening point. The viscosity is measured using a capillary rheometer according to the test method of JIS K7199. The measurement is determined at a shear speed of $10^3$ $s^{-1}$. The Vicat softening point is determined according to the test method of JIS K7206 and the melting point is determined by DSC.

The component (D) should account for 1 to 10 wt % of the molding material according to the invention. If the component (D) is less than 1 wt %, the fibrous filler (C) may not be impregnated sufficiently, possibly leading to a decreased productivity of the molding material. If the component (D) is more than 10 wt %, the resulting moldings can be low in impact resistance, rigidity, etc.

Figure 3:
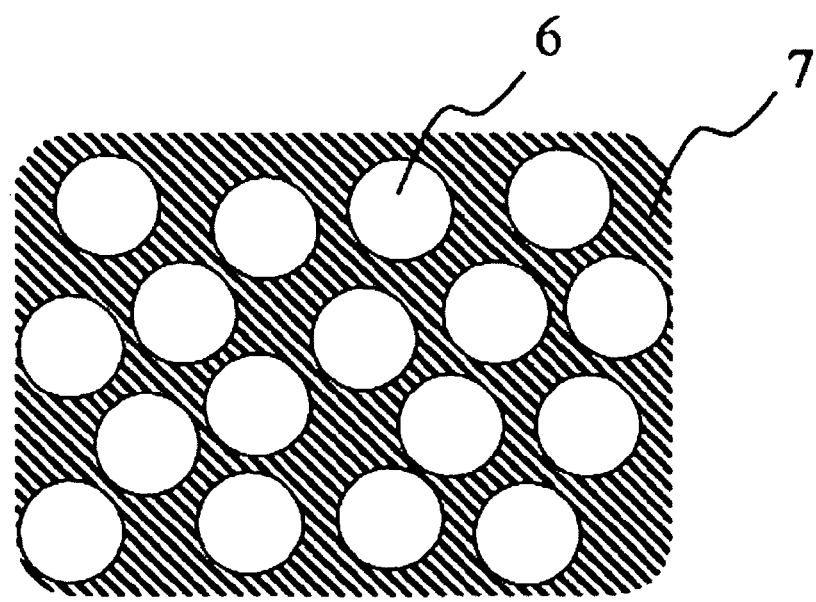
FIG. 3 is an explanatory diagram illustrating a cross section of an embodiment of a composite comprising a molding material according to the invention.
Figure 4:
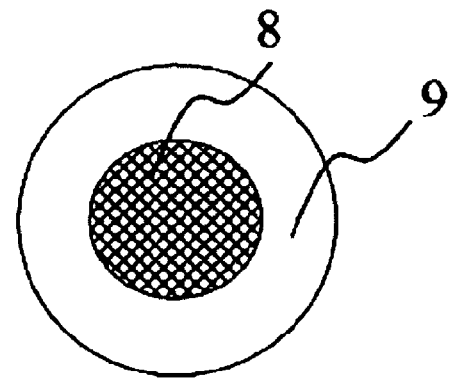
FIG. 4 is an explanatory diagram illustrating a cross section of an embodiment of a molding material according to the invention.
Figure 5:
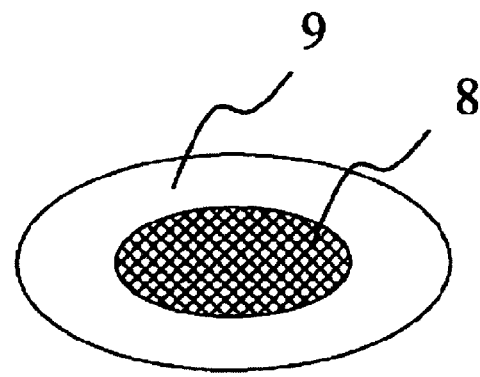
FIG. 5 is an explanatory diagram illustrating a cross section of another embodiment of a molding material according to the invention.

The fibrous filler (C) and the component (D) can together form a composite structure. This composite structure has morphological features as illustrated in FIG. 3 and consists of the component (D) filling the gaps between filaments of the fibrous filler (C) which is in the form of bundles of continuous fibers at the time of molding. Thus, the fibrous filler (C) is dispersed like islands in the sea of the component (D). Specifically, this composite structure can be produced by heat-melting the component (D) and impregnating the fibrous filler (C) with it.

Figure 6:
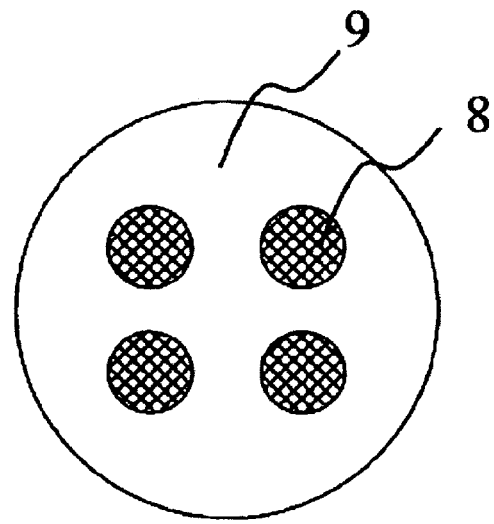
FIG. 6 is an explanatory diagram illustrating a cross section of another embodiment of a molding material according to 60 the invention.
Figure 7:
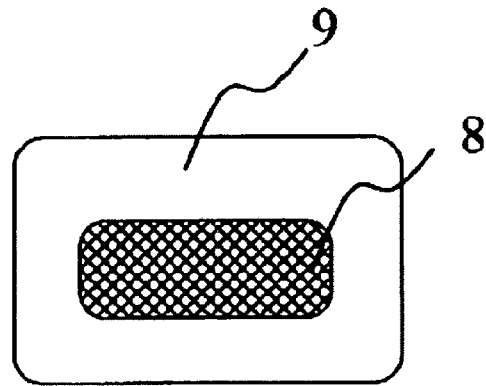
FIG. 7 is an explanatory diagram illustrating a cross section of another embodiment of a molding material according to the invention.
Figure 8:
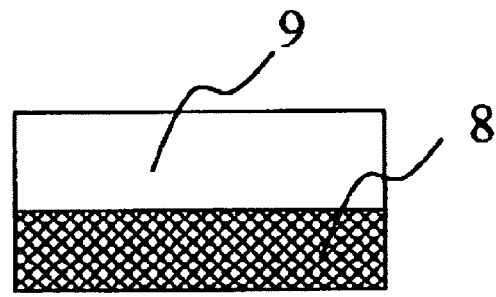
FIG. 8 is an explanatory diagram illustrating a cross section of another embodiment of a molding material according to the invention.
Figure 9:
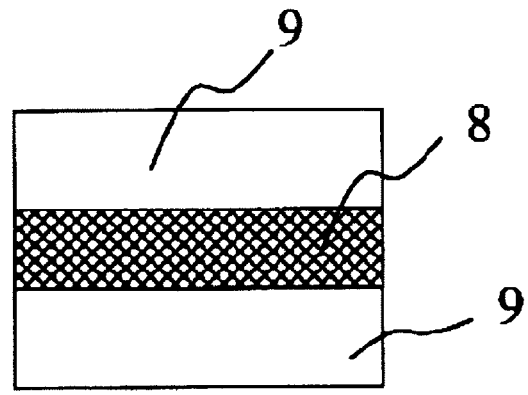
FIG. 9 is an explanatory diagram illustrating a cross section of another embodiment of a molding material according to the invention.

FIGS. 3 to 9 schematically illustrate typical cross-sectional shapes of the molding material according to the invention. The cross-sectional shape of the molding material is not limited to those given in the figures as long as the composite structure composed of the fibrous filler (C) and the component (D) is in contact with said resin composition, but it is preferable that said resin composition is disposed as if it covers the composite structure as illustrated in FIGS. 4 to 7, or it is also preferable that the composite structure and the said resin composition are disposed in a layered manner as illustrated in FIGS. 8 and 9. If two or more composite structures as illustrated in FIG. 6 are disposed to cover said resin composition, the number of the composite structures is preferably about 2 to 6.

It is preferable that the composite structure and the resin composition are adhered to each other at their boundary. It is also preferable that said resin composition enters some parts of the composite structure near the boundary to allow the structure to form compatible portions with the resin composition and also that the fibrous filler (C) is impregnated with it.

Therefore, it is preferable that said resin composition is disposed as if it covers the composite structure composed of the fibrous filler (C) and the component (D) as illustrated in FIGS. 4 to 7, or that the composite structure and the said resin composition are disposed in a layered manner as illustrated in FIGS. 8 and 9. If they are arranged in this way, said resin composition, which has a high molecular weight, covers the component (D), which can be easily destroyed, or it is disposed on a surface liable to abrasion, allowing the molding material to maintain its shape.

Here, the component (D) falls in a category different from the coupling agents and sizing agents that are commonly used for surface treatment of fibrous fillers. Specifically, coupling agents and sizing agents commonly account for a small content of about 0.05 to 10 wt % relative to the fiber to be processed, and they are intended to be applied only to the surface portion of the fiber. They are not used to impregnate the fiber bundles in advance.

In producing a molding material, it is preferable that the component (D) is added in advance to impregnate the fibrous filler (C). It is easy to heat-melt the component (D) and use it for impregnation of a bundle of continuous fibers (the fibrous filler (C)), and it is practically possible for the fiber bundle to travel at a high speed of, for instance, 10 m/min or more in the step of continuous fiber bundle impregnation, leading to a high productivity. Furthermore, the impregnation step does not require complicated equipment designed to perform operations such as opening the fibers to a large extent, rubbing the fibers by pressing them against a bar or other tools to such an extent that the fibers suffer damage, or applying a large pressure to the thermoplastic polymer. It is not necessary either to perform complicated, low-productivity operations such as diluting the thermoplastic polymer with a solvent for viscosity reduction followed by impregnation and removal of the solvent, and producing an emulsion or dispersion liquid followed by impregnation and removal of the medium.

Better effect can be achieved by improving the chemical affinity of the component (D) with the fibrous filler (C) or said resin composition.

In particular, the component (D) will be mixed and diffused in said resin composition, i.e. the matrix, in the molded product produced in the molding step. This means that if the component (D) can mix with said resin composition easily, then the component (D) can work effectively as an impregnation/dispersion assistant. More specifically, better effect can be achieved if the component (D) and said resin composition have chemical affinity, preferably compatibility, with each other. If they have chemical affinity or reactivity to a certain degree with each other, the component (D) is expected to have a practically sufficient effect as an impregnation/dispersion assistant after dispersing microscopically in said resin composition, even if they are incompatible with each other. Whether or not the component (D) and said resin composition has chemical affinity and tendency to be compatible may be estimated to some extent based on their solubility parameter. A detailed description about the solubility parameter is found in Polymer Blend (published by CMC Publishing Co., Ltd.) co-authored by Saburo Akiyama, Takashi Inoue, and Tosio Nisi. There are several known methods for determination of the solubility parameter of polymers, but no problems will take place if the same method is used for the polymers to be compared. Specifically, it is preferable to use the method proposed by Hoy (ibidem) because calculations can be made easily. Two liquids with closer solubility parameter values are expected to be more compatible. From this viewpoint, it is preferable that the absolute value of the difference in solubility parameter between the component (D) and said resin composition, $|\delta 1 - \delta 2|$ where $\delta 1$ and $\delta 2$ denote their respective solubility parameter, is less than 3.5.

Described below is the chemical composition of substances suitable as the component (D). From the viewpoint of melt viscosity, it is preferable that the component (D) comprises an aliphatic hydrocarbon. Said aliphatic hydrocarbon may have a double bond or a cyclic structure. Examples of the component (D) without a cyclic structure include butadiene, isoprene, pentadiene, and hexadiene. Examples of the component (D) comprising a cyclic structure include monocyclic type compounds such as cyclohexadiene, vinyl cyclohexene, cycloheptadiene, cyclooctadiene, and monoterpenes represented by the molecular formula of $C_{10}H_{16}$ (dipentene, limonene, terpinolene, terpinene, phellandrene); dicyclic type compounds such as 2,5-norbornadiene, tetrahydroindene, sesquiterpenes represented by the molecular formula of $C_{15}H_{24}$ (cadinene, selinene, caryophyllene, etc.); and tricyclic type compounds such as dicyclopentadiene. There are compounds that form said component (D) in the reaction system, such as pinene and camphene which form dipentene through isomerization. Two or more of these compounds acting as said component (D) or compounds that form said component (D) in the reaction system may be used in combination.

It is preferable that a compound used as the component (D) has a cyclic structure. If it has a cyclic structure, the motion of the molecule is restrained moderately and become relatively rigid. If the component (D) has such a structure, it will not result in moldings with a largely decreased elastic modulus when it is used to produce moldings composed of it dispersed in a resin composition of the melt-kneaded product (A) and the third resin (B). Particularly preferable examples of the component (D) include monoterpenes as represented by the molecular formula $C_{10}H_{16}$.

Terpene based resin is also a particularly preferable component. Examples of said terpene based resin include, for instance, terpene resin, hydrogenated terpene resin, terpene phenol resin, hydrogenated terpene phenol resin. Said terpene resin is produced by polymerizing one or more terpene monomers such as α-pinene, β-pinene, limonene, dipentene, terpinolene, terpinene, and menthadiene. Said hydrogenated terpene resin is produced by hydrogenating terpene resin and then partially reducing it. Said terpene phenol resin is produced by reacting a terpene monomer as listed above with a phenol using a catalyst. Said phenol preferably comprises 1 to 3 substituent groups selected from the group of alkyl group, halogen atom, and hydroxyl group on their benzene ring. Specific examples include cresol, xylenol, ethyl phenol, butyl phenol, t-butyl phenol, nonyl phenol, 3,4,5-trimethyl phenol, chlorophenol, bromophenol, chlorocresol, hydroquinone, resorcinol, and orcinol. Particularly preferable phenol compounds include phenol and cresol. Two or more of these phenol compounds may be used in combination.

As an example, Formula (1) given below shows a typical molecular structure of terpene based resin comprising an addition product of a monocyclic monoterpene and a phenol.
[Chemical Compound 1]

There are no specific limitations on said sheet-like molding material as long as the fibrous filler (C) is dispersed in the resin composition composed of the melt-kneaded product (A) and the third resin (B), and generally known methods may be used for its production. In a typical method, said resin composition in the form of powder, fiber, film, or nonwoven fabric is placed on a mat composed of several entangled fibers of the fibrous filler (C), followed by heating under pressure to provide molding material.

There are no specific limitations on the production method for said mat of the fibrous filler (C), and it may be produced by pushing needles through an aggregate of several fibers of the fibrous filler (C), applying an air jet to entangle them, or producing a sheet from a suspension liquid produced by dispersing the fibrous filler (C) in water.

It is preferable that said resin composition is in the form of film because the resulting molding material will suffer less voids. Generally known film molding techniques may be used to produce said resin composition in the form of film. Available methods include, for instance, the use of an extruder equipped with a T-die to extrude the material to produce a flat film, stretching of such a film uniaxially or biaxially to provide a stretched film, and the implementation of the inflation method that uses an extruder equipped with a circular die to inflate the material to produce a tubular film.

Methods available to mold the molding material according to the invention include, for instance, autoclave molding, press molding, filament winding molding, resin transfer molding, extrusion molding, injection molding, hollow molding, calendar molding, compression molding, vacuum molding, and foam molding. These may be molded into various shapes such as pellets, plate, fiber, strand, film, sheet, pipe, hollow, and box. Moldings thus produced will be high in heat resistance and impact absorbability and preferably used in the form of a thin-wall product, elongated product, and film.

Moldings thus produced may be preferably used as various products including chassis of electronic instruments such as computer, TV, video player, DVD player, camera, and audio instrument; electronic components such as connector, coil, sensor, LED lamp, socket, electrical resistor, relay case, small switch, coil bobbin, capacitor, variable capacitor case, optical pickup, oscillator, various terminal plates, transformer, plug, print substrate, tuner, speaker, microphone, headphone, small motor, magnetic head base, power module, semiconductor, liquid crystal, FDD carriage, FDD chassis, motor brush holder, parabolic antenna, and computer related parts; electric/electronic parts such as power generator, electric motor, potential transformer, current transformer, voltage regulator, rectifier, inverter, relay, electric power contact, switch, shut-off switch, knife switch, multipole rod, and electric parts cabinet; home- or office-use electric product parts such as for VTR, TV, iron, hair drier, rice cooker, microwave oven, sound device, audio device, laser disk (registered trademark), compact disc, DVD, other audio/video devices, lighting equipment, refrigerator, air conditioner, typewriter, and word processor; machine related parts such as for office computer, telephone, facsimile, copier, washing machine jig, motor, lighter, and typewriter; optical equipment or precision machine related parts such as for microscope, binocular, camera, and clock; various valves such as for alternator terminal, alternator connector, IC regulator, light dimmer potentiometer base, and exhaust gas pipe; various pipes, hoses and tubes such as for fuel related equipment, cooling equipment, braking equipment, wiper equipment, exhaust equipment, and suction equipment; and automobile/vehicle related parts such as air intake nozzle snorkel, intake manifold, fuel pump, engine cooling water joint, carburetor body, carburetor spacer, exhaust gas sensor, cooling water sensor, oil temperature sensor, brake pad wear sensor, throttle position sensor, crank shaft position sensor, air flow meter, brake pad abrasion sensor, battery peripheral components, air conditioner thermostat base, heating air flow control valve, radiator motor brush holder, water pump impeller, turbine vane, wiper motor relation parts, distributor, starter switch, starter relay, transmission wire harness, wind washer nozzle, air conditioner panel switch substrate, fuel-related electromagnetic valve coil, wire harness connector, SMJ connector, PCB connector, door grommet connector, various connectors for fuse connector etc., horn terminal, electrical equipment component insulation plate, step motor rotor, lamp socket, lamp reflector, lamp housing, brake piston, solenoid bobbin, engine oil filter, ignition equipment case, torque control lever, safe belt component, register blade, washer lever, wind regulator handle, wind regulator handle knob, passing light lever, sun visor bracket, instrument panel, air bag peripheral component, door pad, pillar, console box, various motor housing, roof rail, fender, garnish, bumper, door panel, roof panel, hood panel, trunk lid, door mirror stay, spoiler, hood louver, wheel cover, wheel cap, grill apron cover frame, lamp bezel, door handle, door edge protector, rear finisher, and wiper.

The fiber reinforced resin composition according to the invention is preferred also as building material, and used suitably for wall-, roof- or ceiling-related components, window related components, insulation related components, floor related components, aseismic base isolation/vibration control related components, and lifeline related components, for civil engineering or building construction.

The fiber reinforced resin composition according to the invention is preferred also as material for sporting goods, and used suitably for golf related goods such as golf club, shaft, grip, and golf ball; racket related sports goods such as tennis racket, badminton racket, and their string; masks for American football, baseball, and soft ball; personal protective sports goods such as chest protector, elbow pad, and knee pad; shoe related goods such as sole of sports shoes; fishing related goods such as fishing pole, fishing reel, and fishing lure; summer sports related goods such as for surfing; winter sports related goods such as for skiing and snowboarding; and other indoor and outdoor sports related goods.

EXAMPLE

The present invention will now be illustrated in greater detail below with reference to Examples. It should be understood that the invention is not construed as being limited thereto.

Materials used as the first resin (A1) in Examples and Comparative examples are as follows.

(A1-1): nylon 6 resin with a melting point of 225° C. and a relative viscosity of 2.75 in 98% sulfuric acid at a concentration of 0.01 g/ml (A1-2): nylon 6 resin with a melting point of 225° C. and a relative viscosity of 2.35 in 98% sulfuric acid at a concentration of 0.01 g/ml (A1-3): nylon 66 resin with a melting point of 265° C. and a relative viscosity of 3.60 in 98% sulfuric acid at a concentration of 0.01 g/ml (A1-4): nylon 610 resin with a melting point of 225° C. and a relative viscosity of 2.70 in 98% sulfuric acid at a concentration of 0.01 g/ml (A1-5): nylon 11 resin with a melting point of 190° C. and a relative viscosity of 2.55 in 98% sulfuric acid at a concentration of 0.01 g/ml (A1-6): nylon 12 resin with a melting point of 180° C. and a relative viscosity of 2.55 in 98% sulfuric acid at a concentration of 0.01 g/ml (A1-7): nylon 66/6T=50/50 resin with a melting point of 295° C. and a relative viscosity of 2.70 in 98% sulfuric acid at a concentration of 0.01 g/ml (A1-8): polybutylene terephthalate resin with a melting point of 225° C., an intrinsic viscosity of 0.70 in a 0.5% o-chlorophenol solution, and a carboxyl end group content of 35 eq/t (A1-9): polyethylene terephthalate resin with a melting point of 265° C., an intrinsic viscosity of 0.85 in a 0.5% o-chlorophenol solution, and a carboxyl end group content of 26 eq/t (A1-10): poly-L-lactic acid resin with a melting point of 170° C., a weight average molecular weight of 210,000 (gel permeation chromatography, 1,1,1,3,3,3-hexafluoro-2-propanol eluant, PMMA equivalent), and a D-form content of 1.2%

(A1-11): Iupiace (R) PX-100F polyphenylene oxide resin (supplied by Mitsubishi Engineering-Plastics Corporation)

(A1-12): polyphenylene sulfide resin with a melting point of 280° C., and a MFR of 500 g/30 min (315.5° C., 5 kg load)

(A1-13): polypropylene resin produced by dry-blending 100 parts by weight polypropylene resin with a melting point of 160° C., a MFR of 0.5 g/10 min (230° C., 2.16 kg load), and a density of 0.910 g/cm$^3$, 1 part by weight of maleic anhydride, and 0.1 parts by weight of a radical generation agent (Perhexa (R) 25B supplied by NOF Corporation) and melt-kneading at a cylinder temperature of 230° C.

(A1-14): polypropylene resin produced by dry-blending 100 parts by weight polypropylene resin with a melting point of 160° C., a MFR of 30 g/10 min (230° C., 2.16 kg load), and a density of 0.910 g/cm$^3$, 1 part by weight of Tamanol (R) 1010R phenol novolac (supplied by Arakawa Chemical Industries, Ltd.), and 0.4 parts by weight of a radical generation agent (Perhexa (R) D supplied by NOF Corporation) and melt-kneading at a cylinder temperature of 200° C.

(A1-15): Sumikaexcel (R) P5003P polyphenylene sulfide resin (supplied by Sumitomo Chemical Co., Ltd.)

Similarly, materials used as the second resin with a reactive functional group (A2) are as follows.

(A2-1): Bondfast (R) BF-7L glycidylmethacrylate modified polyethylene copolymer (supplied by Sumitomo Chemical Co., Ltd.)

(A2-2): Tafmer (R) MH7020 maleic anhydride modified ethylene-1-butene copolymer (supplied by Mitsui Chemicals, Inc.)

(A2-3): Himilan (R) 1706 ethylene-methacrylate-zinc methacrylate copolymer (supplied by DuPont-Mitsui Polychemicals Co., Ltd.)

(A2-4): Bondfast (R) BF-7M glycidylmethacrylate modified polyethylene copolymer (supplied by Sumitomo Chemical Co., Ltd.)

(A2-5): Modiper (R) A4200 glycidylmethacrylate modified polyethylene copolymer-g-PMMA resin (supplied by NOF Corporation)

Similarly, materials used as the third resin (B) are as follows.

(B-1): nylon 6 resin with a melting point 225° C. and a relative viscosity of 2.35 in 98% sulfuric acid at a concentration of 0.01 g/ml (B-2): nylon 6 resin with a melting point 225° C. and a relative viscosity of 2.75 in 98% sulfuric acid at a concentration of 0.01 g/ml (B-3): nylon 66 resin with a melting point of 265° C. and a relative viscosity of 3.60 in 98% sulfuric acid at a concentration of 0.01 g/ml (B-4): nylon 610 resin with a melting point of 225° C. and a relative viscosity of 2.70 in 98% sulfuric acid at a concentration of 0.01 g/ml (B-5): nylon 11 resin with a melting point of 190° C. and a relative viscosity of 2.55 in 98% sulfuric acid at a concentration of 0.01 g/ml (B-6): nylon 12 resin with a melting point of 180° C. and a relative viscosity of 2.55 in 98% sulfuric acid at a concentration of 0.01 g/ml (B-7): nylon 66/6T=50/50 resin with a melting point of 295° C. and a relative viscosity of 2.70 in 98% sulfuric acid at a concentration of 0.01 g/ml (B-8): polybutylene terephthalate resin with a melting point of 225° C., an intrinsic viscosity of 0.70 in a 0.5% o-chlorophenol solution, and a carboxyl end group content of 35 eq/t (B-9): polyethylene terephthalate resin with a melting point of 265° C., an intrinsic viscosity of 0.85 in a 0.5% o-chlorophenol solution, and a carboxyl end group content of 26 eq/t (B-10): poly-L-lactic acid resin with a melting point of 170° C., a weight average molecular weight of 210,000 (gel permeation chromatography, 1,1,1,3,3,3-hexafluoro-2-propanol eluant, PMMA equivalent), and a D-form content of 1.2%

(B-11): Iupiace (R) PX-100F polyphenylene oxide resin (supplied by Mitsubishi Engineering-Plastics Corporation)

(B-12): polyphenylene sulfide resin with a melting point of 280° C., and a MFR of 500 g/30 min (315.5° C., 5 kg load)

(B-13): polypropylene resin produced by dry-blending 100 parts by weight polypropylene resin with a melting point of 160° C., a MFR of 0.5 g/10 min (230° C., 2.16 kg load), and a density of 0.910 g/cm$^3$, 1 part by weight of maleic anhydride, and 0.1 parts by weight of a radical generation agent (Perhexa (R) 25B supplied by NOF Corporation) and melt-kneading at a cylinder temperature of 230° C.

(A1-14): polypropylene resin produced by dry-blending 100 parts by weight polypropylene resin with a melting point of 160° C., a MFR of 30 g/10 min (230° C., 2.16 kg load), and a density of 0.910 g/cm$^3$, 1 part by weight of Tamanol (R) 1010R phenol novolac (supplied by Arakawa Chemical Industries, Ltd.), and 0.4 parts by weight of a radical generation agent (Perhexa (R) D supplied by NOF Corporation) and melt-kneading at a cylinder temperature of 200° C.

(B-15): epoxy resin consisting of 100 parts by weight of jER828 liquid bisphenol A resin (supplied by Japan Epoxy Resins Co., Ltd.), 19 parts by weight of DICY-7 dicyandiamine (supplied by Japan Epoxy Resins Co., Ltd.), and DCMU99 curing accelerator (supplied by Hodogaya Chemical Co., Ltd).

Similarly, materials used as the fibrous filler (C) are as follows.

(C-1): Torayca (R) T700S carbon fiber (supplied by Toray Industries, Inc.). O/C 0.05, sizing agent, aromatic bifunctional epoxy resin. Cut to a number average fiber length of 6 mm.

(C-2): Torayca (R) T700G carbon fiber (supplied by Toray Industries, Inc.). O/C 0.20, sizing agent, aliphatic polyfunctional epoxy resin. Cut to a number average fiber length of 6 mm.

(C-3): T-249 glass fiber (supplied by Nippon Electric Glass Co., Ltd.) with a number average fiber length of 3 mm Similarly, components other than (A1), (A2), and (B) are as follows.

(D-1): YP-902 terpene phenol (supplied by Yasuhara Chemical Co., Ltd.)

(E-1): Exolit (R) OP1230 phosphinic acid aluminum (supplied by Clariant)

(F-1): Lotryl (R) 29MA03 unmodified polyethylene copolymer (hereinafter referred to unmodified PE copolymer) (supplied by Arkema K. K.)

(1) Molding of Specimens (1-1) Tensile Test and Izod Impact Test Specimens

JIS-5A dumbbell type test specimens (length 75 mm×end width 12.5 mm×thickness 2 mm) and ⅛ inch notched specimens for Izod impact test were prepared using an injection molding machine (NP7-1F) supplied by Nissei Plastic Industrial Co., Ltd. under the conditions of a molding temperature of 260° C. (280° C. in Reference examples 19 and 25, 220° C. in Reference examples 21 and 22, 310° C. in Reference example 23, 200° C. in Reference examples 26, 29, and 30, 300° C. in Reference examples 27 and 28, and 350° C. in Reference example 31), a die temperature of 80° C. (130° C. in Reference example 25 and 28), and a lower injection pressure limit of +5 kgf/cm$^2$.

(1-2) Bending Test Specimens and Charpy Impact Test Specimens

Bending test specimens (length 130 mm×width 13 mm×thickness 6.4 mm) and ⅛ inch notched specimens for Charpy impact test were prepared using an injection molding machine (J150EII-P) supplied by The Japan Steel Works, Ltd., under the conditions of a molding temperature of 260° C. (280° C. in Examples 32 and 38, 220° C. in Examples 34 and 35, 310° C. in Example 36, 200° C. in Examples 39, 42, and 74, and 300° C. in Examples 40 and 41), a die temperature of 80° C. (130° C. in Example 38 and 41), and a lower injection pressure limit of +5 kgf/cm$^2$.

For the molded products other than injection molded ones, specimens were cut out from flat samples.

(2) Morphology Observation

A 1 to 2 mm square was cut out from the through-thickness center portion of a JIS-5A dumbbell type test specimen or a bending test specimen prepared by injection molding, and dying operation was carried out using ruthenium tetroxide to dye the resin with a reactive functional group (A2). The dyed specimen was cut with an ultramicrotome at −196° C. to provide an ultrathin section with a thickness of 0.1 μm or less (about 80 nm). The specimen was observed by transmission electron microscopy.

To determine the number average particle diameter (Xn), 400 or more particles were extracted at random from the resulting picture, and the particle diameter distribution was analyzed with a Scion Image image analyzing program supplied by Scion Corporation, followed by calculation by the following equation.

$$\text{Number average particle diameter}(Xn) = \Sigma(Xi \times ni)/\Sigma ni$$

Xi: particle diameter
ni: number of particles corresponding to particle diameter (Xi)
(i=1, 2, 3, . . . , n)

The number average particle diameter of the particles of the component (A2) is calculated from a 10,000× enlarged picture, and the number average particle diameter of the finer particles contained in the particles of the component (A2) is calculated from a 35,000× enlarged picture. Analysis was carried out to determine the number average particle diameter of the particles of the component (A2), the existence/absence of finer particles of 1 to 100 nm in the particles of the component (A2), and the existence/absence of fine particles of larger than 300 nm.

The area proportion of the finer particles in the particles of the component (A2) was determined from a 35,000× enlarged picture taken by transmission electron microscopy. A Scion Image image analyzing program supplied by Scion Corporation was used to analyze the area of the component (A2) and the area of the finer particles in the particles of the component (A2), followed by calculation by the following equation.

$$Sn = Sp/(Sa2 + Sp)$$

Sn: area proportion of the finer particles occupied in the particles of the component (A2)
Sat: area occupied by the component (A2)
Sp: area occupied by the finer particles in the particles of the component (A2)

(3) Evaluation in Tensile Modulus and Tensile Rupture Elongation Based on Tensile Test A JIS-5A dumbbell type test specimen produced by injection molding was placed in Autograph AG100kNG (supplied by Shimadzu Corporation) and subjected to tensile test under the conditions of a chuck-to-chuck distance of 50 mm and a speed of 100 mm/min, 500 mm/min, or 1,000 mm/min, and the tensile modulus and tensile rupture elongation were evaluated at each speed. Here, the tensile rupture elongation was evaluated in terms of the rupture elongation based on a chuck-to-chuck distance of 50 mm.

(4) Evaluation in Bending Elastic Modulus

A specimen for bending test was placed in an Instron type universal tester (supplied by Instron Corporation) and the bending elastic modulus was evaluated according to ASTM-D790 in an atmosphere at 23° C. and 50% RH.

(5) Evaluation in Izod Impact Strength

Using ⅛ inch notched specimens for Izod impact test, Izod impact strength was evaluated according to ASTM-D256 in an atmosphere at 23° C. and 50% RH.

(6) Evaluation in Charpy Impact Strength

Evaluation in Charpy impact strength was conducted according to ASTM-D256 using a ⅛ inch notched Charpy impact test specimen or unnotched Charpy impact test specimen (flatwise) in an atmosphere at 23° C. and 50% RH.

(7) Average Fiber Length of Fibrous Filler

An appropriate portion is cut out from a ⅛ inch notched Izod impact test specimen or ⅛ inch notched Charpy impact test specimen, and heated in air at 500° C. for 30 minutes in an electric furnace so that resin would be incinerated and removed sufficiently to separate the fibrous filler. At least 400 fibers were extracted randomly from the separated fibrous filler, and their length was measured under an optical microscope to the nearest 1 μm, followed by calculation of the number average fiber length (Ln) by the following equation.

Number average fiber length(Ln)=(Σ$Li$)/Ntotal

Li: fiber length measured (i=1, 2, 3, . . . , n)
Ntotal: total number of fibers subjected to fiber length measurement (8) Fire Retardance Test Evaluation in fire retardance was conducted using an injection molded specimen (length 130 mm×width 13 mm×thickness 0.8 mm). Fire retardance was rated according to the UL94V vertical flame test.

Reference Examples 1 to 7, and 17

Input materials were mixed according to the proportions given in Tables 1 and 3 and supplied to the feed port of a twin screw extruder. The twin screw extruder used was a co-rotating full intermeshing type extruder (TEM-41SS-22/1V supplied by Toshiba Machine Co.) comprising two double-thread screws with a screw diameter of 41 mm and a $L/D_0$ ratio of 100. Melt-kneading was performed in a nitrogen flow at a cylinder temperature, screw rotation speed, and extrusion rate given in Tables 1 and 3 to allow a molten resin strand to be discharged through the discharge nozzle ($L/D_0$=100). Here, a coloring agent was fed together with the input materials, and the residence time was determined as the time period until the degree of coloring of the extruded material reached a maximum. The residence time measurements are listed in Tables 1 and 3. As a screw constitution A, seven kneading zones, were provided in such a manner that each of them started at the position of $L/D_0$=21, 27, 46, 57, 71, 79, or 93, and that each kneading zone had a length ratio $Lk/D_0$ of 1.8, 1.8, 2.3, 2.3, 2.3, 2.3, or 3.1, respectively. A reverse screw zone was provided in the downstream side of each kneading zone, and each reverse screw zone had a length ratio $Lr/D_0$ of 0.4, 0.4, 0.8, 0.8, 0.4, 0.8, or 0.4, respectively. The total length of said kneading zones accounted for 16% of the total screw length. Resin pressure gauges were installed in two or more kneading zones, and the largest of the kneading zone resin pressure readings was taken as the value of Pkmax (MPa). Resin pressure gauges were installed in two or more full flight zones, and the smallest of the full flight zone resin pressure readings was taken as the value of Pfmin (MPa). Tables 1 and 3 gives the differences between them: Pkmax (MPa)−Pfmin (MPa). Resin thermometers were installed at two or more equally spaced positions in the extruder, and the highest of their resin temperature readings is listed as maximum resin temperature in Tables 1 and 3. A vacuum vent zone was provided at the position of $L/D_0$=96, and volatile components were removed at a gauge pressure of −0.1 MPa. The molten resin strand discharged was cooled as it was passed through a cooling bath, and then it was cut by a pelletizer as it is taken up to produce a pellet-like sample of said melt-kneaded product (A).

Said sample was vacuum-dried at 80° C. for 12 hours or more and injection-molded to prepare a tensile test specimen, which was then subjected to morphology observation and evaluation in tensile modulus and tensile rupture elongation. Results of melt-kneading and those of various evaluations are given in Tables 1 and 3.

Reference Example 8

Input materials were mixed according to the proportions given in Table 1 and supplied to the feed port of a twin screw extruder. The twin screw extruder used was a co-rotating full intermeshing type twin extruder (TEX-30α supplied by The Japan Steel Works, Ltd.) comprising two double-thread screws with a screw diameter of 30 mm and a $L/D_0$ ratio of 45. Melt-kneading was performed in a nitrogen flow at a cylinder temperature, screw rotation speed, and extrusion rate given in Table 1 to allow a molten resin strand to be discharged through the discharge nozzle ($L/D_0$=45). Here, a coloring agent was fed together with the input materials, and the residence time was determined as the time period until the degree of coloring of the extruded material reached a maximum. The residence time measurements are listed in Table 1. As a screw constitution B, four kneading zones were provided in such a manner that each of them started at the position of $L/D_0$=7, 14, 24, or 33, and that each kneading zone had a length ratio $Lk/D_0$ of 3.0, 3.0, 3.0, or 3.0, respectively. A reverse screw zone was provided in the downstream side of each kneading zone, and each reverse screw zone had a length ratio $Lr/D_0$ of 0.5, 0.5, 0.5, or 0.5, respectively. The total length of said kneading zones accounted for 26% of the total screw length. A vacuum vent zone was provided at the position of $L/D_0$=38, and volatile components were removed at a gauge pressure of −0.1 MPa. The molten resin strand discharged was cooled as it was passed through a cooling bath, and then it was cut by a pelletizer as it is taken up to produce a pellet-like sample.

Said sample was vacuum-dried at 80° C. for 12 hours or more, fed again to the hopper of said extruder, and melt-kneaded in a nitrogen flow under the same conditions for the cylinder temperature, screw rotation speed, extrusion rate, screw constitution, and vent vacuum to allow a molten resin strand to be discharged from the discharge nozzle ($L/D_0$=45). The molten resin strand discharged was cooled as it was passed through a cooling bath, and then it was cut by a pelletizer as it is taken up to produce a pellet-like sample of said melt-kneaded product (A). Said sample was vacuum-dried at 80° C. for 12 hours or more and injection-molded to prepare a tensile test specimen, which was then subjected to morphology observation and evaluation in tensile modulus and tensile rupture elongation. Results of melt-kneading and those of various evaluations are given in Table 1.

Reference Examples 9 to 14, 19 to 29, 30, and 31

Input materials were mixed according to the proportions given in Tables 2, 4 and 5 and supplied to the feed port of a twin screw extruder. The twin screw extruder used was a co-rotating full intermeshing type twin extruder (TEX-30α supplied by The Japan Steel Works, Ltd.) comprising two double-thread screws with a screw diameter of 30 mm and a L/Do ratio of 45. Melt-kneading was performed in a nitrogen flow at a cylinder temperature, screw rotation speed, and extrusion rate given in Tables 2, 4 and 5 to allow a molten resin strand to be discharged through the discharge nozzle (L/D$_0$=45). Here, a coloring agent was fed together with the input materials, and the residence time was determined as the time period until the degree of coloring of the extruded material reached a maximum. The residence time measurements are listed in Tables 2, 4 and 5. As a screw constitution C, twist kneading disks with a helix angle θ, i.e. the angle between the kneading disk's apex on the disk's top side and the apex on its rear plane side, of 20° in the half-turn direction of the screw were provided at Lk/D$_0$=4.0, 4.0, or 5.0 from the positions of L/D$_0$=14, 23, or 30, respectively, to produce zones for melt-kneading in a stretched flow (stretched flow zones). A reverse screw zone was provided in the downstream side of each stretched flow zone, and each reverse screw zone had a length ratio Lr/D$_0$ of 0.5, 0.5, or 0.5, respectively. The proportion (%) of the total length of said stretched flow zones to the total screw length was found to be 29% when calculated by the following equation: (total length of stretched flow zones)/(total screw length)×100. A vacuum vent zone was provided at the position of L/D$_0$=38, and volatile components were removed at a gauge pressure of −0.1 MPa. The molten resin strand discharged was cooled as it was passed through a cooling bath, and then it was cut by a pelletizer as it is taken up to produce a pellet-like sample of said melt-kneaded product (A).

Said sample was vacuum-dried at 80° C. for 12 hours or more and injection-molded to prepare a tensile test specimen, which was then subjected to morphology observation and evaluation in tensile modulus and tensile rupture elongation. Results of melt-kneading and those of various evaluations are given in Tables 2, 4, and 5.

Reference Example 15

Input materials were mixed according to the proportions given in Table 2 and supplied to the feed port of a twin screw extruder. The twin screw extruder used was a co-rotating full intermeshing type twin extruder (TEX-30α supplied by The Japan Steel Works, Ltd.) comprising two double-thread screws with a screw diameter of 30 mm and a L/D$_0$ ratio of 35. Melt-kneading was performed in a nitrogen flow at a cylinder temperature, screw rotation speed, and extrusion rate given in Table 2 to allow a molten resin strand to be discharged through the discharge nozzle (L/D$_0$=35). Here, a coloring agent was fed together with the input materials, and the residence time was determined as the time period until the degree of coloring of the extruded material reached a maximum. The residence time measurements are listed in Table 2. As a screw constitution D, twist kneading disks with a helix angle θ, i.e. the angle between the kneading disk's apex on the disk's top side and the apex on its rear plane side, of 20° in the half-turn direction of the screw were provided at Lk/D$_0$=3.0, 4.0, or 4.0 from the positions of L/D$_0$=12, 17, or 22, respectively, to produce zones for melt-kneading in a stretched flow (stretched flow zones). A reverse screw zone was provided in the downstream side of each stretched flow zone, and each reverse screw zone had a length ratio Lr/D$_0$ of 0.5, 0.5, or 0.5, respectively. The proportion (%) of the total length of said stretched flow zones to the total screw length was found to be 31% when calculated by the following equation: (total length of stretched flow zones)/(total screw length)×100. A vacuum vent zone was provided at the position of L/D$_0$=30, and volatile components were removed at a gauge pressure of −0.1 MPa. The molten resin strand discharged was cooled as it was passed through a cooling bath, and then it was cut by a pelletizer as it is taken up to produce a pellet-like sample of said melt-kneaded product (A).

Said sample was vacuum-dried at 80° C. for 12 hours or more and injection-molded to prepare a tensile test specimen, which was then subjected to morphology observation and evaluation in tensile modulus and tensile rupture elongation. Results of melt-kneading and those of various evaluations are given in Table 2.

Reference Examples 16 and 18

Input materials were mixed according to the proportions given in Table 3 and supplied to the feed port of a twin screw extruder. The twin screw extruder used was a co-rotating full intermeshing type twin extruder (TEX-30α supplied by The Japan Steel Works, Ltd.) comprising two double-thread screws with a screw diameter of 30 mm and a L/D$_0$ ratio of 35. Melt-kneading was performed in a nitrogen flow at a cylinder temperature, screw rotation speed, and extrusion rate given in Table 3 to allow a molten resin strand to be discharged through the discharge nozzle (L/D$_0$=35). Here, a coloring agent was fed together with the input materials, and the residence time was determined as the time period until the degree of coloring of the extruded material reached a maximum. The residence time measurements are listed in Table 3. As a screw constitution E, two kneading zones were provided in such a manner that each of them started at the position of L/D$_0$=10 or 25, and that each kneading zone had a length ratio Lk/D$_0$ of 2.0 or 3.0, respectively. The total length of said kneading zones accounted for 14% of the total screw length. A vacuum vent zone was provided at the position of L/D$_0$=30, and volatile components were removed at a gauge pressure of −0.1 MPa. The molten resin strand discharged was cooled as it was passed through a cooling bath, and then it was cut by a pelletizer as it is taken up to produce a pellet-like sample of melt-kneaded product (A).

Said sample was vacuum-dried at 80° C. for 12 hours or more and injection-molded to prepare a tensile test specimen, which was then subjected to morphology observation and evaluation in tensile modulus and tensile rupture elongation. Results of melt-kneading and those of various evaluations are given in Table 3.

TABLE 1

| | | | | Reference example | | | | | | | |
|---|---|---|---|---|---|---|---|---|---|---|---|
| | | | | 1 | 2 | 3 | 4 | 5 | 6 | 7 | 8 |
| Component proportion | first resin (A1) | A1-1 | parts by weight | 70 | 70 | 75 | 60 | 40 | 70 | 70 | 70 |
| | | A1-2 | parts by weight | | | | | 30 | | | |
| | second resin with reactive functional group (A2) | A2-1 | parts by weight | 30 | 30 | 25 | 40 | 30 | 15 | | 30 |
| | | A2-2 | parts by weight | | | | | | 15 | 30 | |
| Melt-kneading | $L/D_0$ of twin screw extruder | | — | 100 | 100 | 100 | 100 | 100 | 100 | 100 | 45 |
| | screw constitution | | — | A | A | A | A | A | A | A | B |
| | existence of stretched flow zone | | — | no | no | no | no | no | no | no | no |
| | proportion of stretched flow zone | | % | — | — | — | — | — | — | — | — |
| | cylinder temperature setting | | °C. | 260 | 260 | 260 | 260 | 260 | 260 | 260 | 260 |
| | screw rotation speed | | rpm | 200 | 250 | 200 | 100 | 200 | 200 | 200 | 100 |
| | extrusion rate | | kg/h | 30 | 50 | 30 | 30 | 30 | 30 | 30 | 10 |
| | residence time | | min | 3 | 2 | 3 | 3.5 | 3 | 3 | 3 | 3.5 |
| | Pkmax-Pfmin | | MPa | 2.2 | 2.4 | 1.9 | 1.7 | 1.7 | 2.8 | 3.0 | — |
| | maximum resin temperature | | °C. | 308 | 307 | 302 | 279 | 299 | 318 | 319 | — |
| | number of times of kneading | | times | 1 | 1 | 1 | 1 | 1 | 1 | 1 | 2 |
| Morphology | continuous phase resin | | — | A1 | A1 | A1 | A1 | A1 | A1 | A1 | A1 |
| | dispersal phase resin | | — | A2 | A2 | A2 | A2 | A2 | A2 | A2 | A2 |
| | dispersal phase having particle diameter of 10 to 1,000 nm | | — | yes | yes | yes | yes | yes | yes | yes | yes |
| | existence of finer particles of 1 to 100 nm in dispersal phase | | — | yes | yes | yes | yes | yes | yes | yes | yes |
| | area proportion of finer particles of 1 to 100 nm in dispersal phase | | % | 30 | 30 | 25 | 30 | 23 | 27 | 24 | 24 |
| Test specimen performance | tensile modulus | 100 mm/min | GPa | 1.4 | 1.4 | 1.6 | 1.1 | 1.4 | 1.3 | 1.3 | 1.4 |
| | | 500 mm/min | GPa | 1.0 | 1.0 | 1.2 | 0.9 | 1.0 | 0.9 | 0.9 | 1.0 |
| | | 1000 mm/min | GPa | 0.7 | 0.6 | 1.0 | 0.6 | 0.7 | 0.7 | 0.7 | 0.8 |
| | | (1000 mm/min) − (100 mm/min) | GPa | −0.7 | −0.8 | −0.6 | −0.5 | −0.7 | −0.6 | −0.6 | −0.6 |
| | tensile rupture elongation | 100 mm/min | % | 147 | 148 | 155 | 112 | 145 | 144 | 140 | 146 |
| | | 500 mm/min | % | 173 | 177 | 172 | 123 | 175 | 162 | 160 | 162 |
| | | 1000 mm/min | % | 187 | 197 | 192 | 149 | 181 | 182 | 177 | 172 |
| | | (1000 mm/min) − (100 mm/min) | % | 40 | 49 | 37 | 37 | 36 | 38 | 37 | 26 |

TABLE 2

| | | | | Reference example | | | | | | |
|---|---|---|---|---|---|---|---|---|---|---|
| | | | | 9 | 10 | 11 | 12 | 13 | 14 | 15 |
| Component proportion | first resin (A1) | A1-1 | parts by weight | 70 | 75 | 60 | 40 | 70 | 70 | 70 |
| | | A1-2 | parts by weight | | | | 30 | | | |
| | second resin with reactive functional group (A2) | A2-1 | parts by weight | 30 | 25 | 40 | 30 | 15 | | 30 |
| | | A2-2 | parts by weight | | | | | 15 | 30 | |
| Melt-kneading | $L/D_0$ of twin screw extruder | | — | 45 | 45 | 45 | 45 | 45 | 45 | 35 |
| | screw constitution | | — | C | C | C | C | C | C | D |
| | existence of stretched flow zone | | — | yes | yes | yes | yes | yes | yes | yes |
| | proportion of stretched flow zone | | % | 29 | 29 | 29 | 29 | 29 | 29 | 31 |
| | cylinder temperature setting | | °C. | 260 | 260 | 260 | 260 | 260 | 260 | 260 |
| | screw rotation speed | | rpm | 300 | 300 | 200 | 300 | 300 | 300 | 400 |
| | extrusion rate | | kg/h | 20 | 20 | 20 | 20 | 20 | 20 | 20 |
| | residence time | | min | 1.8 | 1.8 | 1.8 | 1.8 | 1.8 | 1.8 | 1.4 |
| | Pkmax-Pfmin | | MPa | — | — | — | — | — | — | — |
| | maximum resin temperature | | °C. | — | — | — | — | — | — | — |
| | number of times of kneading | | times | 1 | 1 | 1 | 1 | 1 | 1 | 1 |
| Morphology | continuous phase resin | | — | A1 | A1 | A1 | A1 | A1 | A1 | A1 |
| | dispersal phase resin | | — | A2 | A2 | A2 | A2 | A2 | A2 | A2 |
| | dispersal phase having particle diameter of 10 to 1,000 nm | | — | yes | yes | yes | yes | yes | yes | yes |
| | existence of finer particles of 1 to 100 nm in dispersal phase | | — | yes | yes | yes | yes | yes | yes | yes |
| | area proportion of finer particles of 1 to 100 nm in dispersal phase | | % | 27 | 23 | 26 | 22 | 24 | 23 | 25 |
| Test specimen performance | tensile modulus | 100 mm/min | GPa | 1.5 | 1.8 | 1.2 | 1.4 | 1.3 | 1.4 | 1.4 |
| | | 500 mm/min | GPa | 0.9 | 1.4 | 1.0 | 1.3 | 1.2 | 1.2 | 1.3 |
| | | 1000 mm/min | GPa | 0.8 | 1.1 | 0.8 | 1.0 | 1.2 | 1.0 | 1.0 |
| | | (1000 mm/min) − (100 mm/min) | GPa | −0.7 | −0.6 | −0.4 | −0.4 | −0.2 | −0.4 | −0.4 |
| | tensile rupture elongation | 100 mm/min | % | 130 | 158 | 108 | 163 | 113 | 145 | 148 |
| | | 500 mm/min | % | 156 | 168 | 118 | 175 | 124 | 152 | 152 |
| | | 1000 mm/min | % | 181 | 170 | 124 | 183 | 127 | 174 | 177 |
| | | (1000 mm/min) − (100 mm/min) | % | 51 | 12 | 16 | 20 | 14 | 29 | 29 |

TABLE 3

|  |  |  | | Reference example | | |
|---|---|---|---|---|---|---|
|  |  |  |  | 16 | 17 | 18 |
| Component proportion | first resin (A1) | A1-1 | parts by weight | 70 | 70 | 60 |
|  |  | A2-1 | parts by weight | 30 |  |  |
|  | second resin with reactive functional group (A2) | A2-3 | parts by weight |  |  | 40 |
|  |  | F-1 | parts by weight |  | 30 |  |
| Melt-kneading | L/D$_0$ of twin screw extruder |  | — | 35 | 100 | 35 |
|  | screw constitution |  | — | E | A | E |
|  | existence of stretched flow zone |  | — | no | no | no |
|  | proportion of stretched flow zone |  | % | — | — | — |
|  | cylinder temperature setting |  | °C. | 260 | 260 | 260 |
|  | screw rotation speed |  | rpm | 100 | 100 | 100 |
|  | extrusion rate |  | kg/h | 20 | 10 | 20 |
|  | residence time |  | min | 0.5 | 8 | 0.5 |
|  | Pkmax-Pfmin |  | MPa | 0.2 | 0.8 | 0.2 |
|  | maximum resin temperature |  | °C. | 262 | 278 | 262 |
|  | number of times of kneading |  | times | 1 | 1 | 1 |
| Morphology | continuous phase resin |  | — | A1 | A1 | A1 |
|  | dispersal phase resin |  | — | A2 | F | A2 |
|  | dispersal phase having particle diameter of 10 to 1,000 nm |  | — | no | yes | no |
|  | existence of finer particles of 1 to 100 nm in dispersal phase |  | — | no | no | no |
|  | area proportion of finer particles of 1 to 100 nm in dispersal phase |  | % | — | — | — |
| Test specimen performance | tensile modulus | 100 mm/min | GPa | 1.6 | 1.4 | 1.6 |
|  |  | 500 mm/min | GPa | 1.7 | 1.6 | 1.7 |
|  |  | 1000 mm/min | GPa | 1.8 | 1.7 | 1.8 |
|  |  | (1000 mm/min) − (100 mm/min) | GPa | 0.2 | 0.3 | 0.2 |
|  | tensile rupture elongation | 100 mm/min | % | 128 | 30 | 104 |
|  |  | 500 mm/min | % | 121 | 28 | 68 |
|  |  | 1000 mm/min | % | 115 | 25 | 36 |
|  |  | (1000 mm/min) − (100 mm/min) | % | −13 | −5 | −68 |

TABLE 4

|  |  |  |  | Reference example | | | | | |
|---|---|---|---|---|---|---|---|---|---|
|  |  |  |  | 19 | 20 | 21 | 22 | 23 | 24 |
| Component proportion | first resin (A1) | A1-3 | parts by weight | 70 |  |  |  |  |  |
|  |  | A1-4 | parts by weight |  | 70 |  |  |  |  |
|  |  | A1-5 | parts by weight |  |  | 70 |  |  |  |
|  |  | A1-6 | parts by weight |  |  |  | 70 |  |  |
|  |  | A1-7 | parts by weight |  |  |  |  | 70 |  |
|  |  | A1-8 | parts by weight |  |  |  |  |  | 75 |
|  |  | A1-9 | parts by weight |  |  |  |  |  |  |
|  |  | A1-10 | parts by weight |  |  |  |  |  |  |
|  |  | A1-11 | parts by weight |  |  |  |  |  |  |
|  |  | A1-12 | parts by weight |  |  |  |  |  |  |
|  |  | A1-13 | parts by weight |  |  |  |  |  |  |
|  | second resin with reactive functional group (A2) | A2-1 | parts by weight |  | 30 | 30 | 30 | 30 |  |
|  |  | A2-4 | parts by weight | 30 |  |  |  |  |  |
|  |  | A2-5 | parts by weight |  |  |  |  |  | 25 |
| Melt-kneading | L/D$_0$ of twin screw extruder |  | — | 45 | 45 | 45 | 45 | 45 | 45 |
|  | screw constitution |  | — | C | C | C | C | C | C |
|  | existence of stretched flow zone |  | — | yes | yes | yes | yes | yes | yes |
|  | proportion of stretched flow zone |  | % | 29 | 29 | 29 | 29 | 29 | 29 |
|  | cylinder temperature setting |  | °C. | 280 | 260 | 220 | 220 | 305 | 260 |
|  | screw rotation speed |  | rpm | 300 | 300 | 300 | 300 | 300 | 300 |
|  | extrusion rate |  | kg/h | 20 | 20 | 20 | 20 | 20 | 20 |
|  | residence time |  | min | 1.8 | 1.8 | 1.8 | 1.8 | 1.8 | 1.8 |
|  | Pkmax-Pfmin |  | MPa | — | — | — | — | — | — |
|  | maximum resin temperature |  | °C. | — | — | — | — | — | — |
|  | number of times of kneading |  | times | 1 | 1 | 1 | 1 | 1 | 1 |
| Morphology | continuous phase resin |  | — | A1 | A1 | A1 | A1 | A1 | A1 |
|  | dispersal phase resin |  | — | A2 | A2 | A2 | A2 | A2 | A2 |
|  | dispersal phase having particle diameter of 10 to 1,000 nm |  | — | yes | yes | yes | yes | yes | yes |
|  | existence of finer particles of 1 to 100 nm in dispersal phase |  | — | yes | yes | yes | yes | yes | yes |
|  | area proportion of finer particles of 1 to 100 nm in dispersal phase |  | % | 26 | 25 | 24 | 24 | 24 | 23 |
| Test specimen performance | tensile modulus | 100 mm/min | GPa | 1.4 | 1.3 | 0.9 | 0.8 | 1.3 | 1.3 |
|  |  | 500 mm/min | GPa | 1.2 | 1.0 | 0.7 | 0.6 | 1.2 | 1.2 |
|  |  | 1000 mm/min | GPa | 0.8 | 0.8 | 0.5 | 0.5 | 0.9 | 1.0 |
|  |  | (1000 mm/min) − (100 mm/min) | GPa | −0.6 | −0.5 | −0.4 | −0.3 | −0.4 | −0.3 |
|  | tensile rupture elongation | 100 mm/min | % | 130 | 160 | 110 | 123 | 112 | 90 |
|  |  | 500 mm/min | % | 146 | 180 | 120 | 135 | 118 | 95 |

TABLE 4-continued

|  |  |  |  |  |  |  |  |  |
|---|---|---|---|---|---|---|---|---|
| | 1000 mm/min | % | 159 | 182 | 125 | 140 | 124 | 104 |
| | (1000 mm/min) − (100 mm/min) | % | 29 | 22 | 15 | 17 | 12 | 14 |

| | | | | Reference example | | | | |
|---|---|---|---|---|---|---|---|---|
| | | | | 25 | 26 | 27 | 28 | 29 |
| Component proportion | first resin (A1) | A1-3 | parts by weight | | | | | |
| | | A1-4 | parts by weight | | | | | |
| | | A1-5 | parts by weight | | | | | |
| | | A1-6 | parts by weight | | | | | |
| | | A1-7 | parts by weight | | | | | |
| | | A1-8 | parts by weight | | | | | |
| | | A1-9 | parts by weight | 75 | | | | |
| | | A1-10 | parts by weight | | 70 | | | |
| | | A1-11 | parts by weight | | | 70 | | |
| | | A1-12 | parts by weight | | | | 75 | |
| | | A1-13 | parts by weight | | | | | 70 |
| | second resin with reactive functional group (A2) | A2-1 | parts by weight | | 30 | 30 | | 30 |
| | | A2-4 | parts by weight | 25 | | | 25 | |
| | | A2-5 | parts by weight | | | | | |
| Melt-kneading | L/$D_0$ of twin screw extruder | | — | 45 | 45 | 45 | 45 | 45 |
| | screw constitution | | — | C | C | C | C | C |
| | existence of stretched flow zone | | — | yes | yes | yes | yes | yes |
| | proportion of stretched flow zone | | % | 29 | 29 | 29 | 29 | 29 |
| | cylinder temperature setting | | °C. | 280 | 190 | 290 | 300 | 190 |
| | screw rotation speed | | rpm | 300 | 300 | 300 | 300 | 300 |
| | extrusion rate | | kg/h | 20 | 20 | 20 | 20 | 20 |
| | residence time | | min | 1.8 | 1.8 | 1.8 | 1.8 | 1.8 |
| | Pkmax-Pfmin | | MPa | — | — | — | — | — |
| | maximum resin temperature | | °C. | — | — | — | — | — |
| | number of times of kneading | | times | 1 | 1 | 1 | 1 | 1 |
| Morphology | continuous phase resin | | — | A1 | A1 | A1 | A1 | A1 |
| | dispersal phase resin | | — | A2 | A2 | A2 | A2 | A2 |
| | dispersal phase having particle diameter of 10 to 1,000 nm | | — | yes | yes | yes | yes | yes |
| | existence of finer particles of 1 to 100 nm in dispersal phase | | — | yes | yes | yes | yes | yes |
| | area proportion of finer particles of 1 to 100 nm in dispersal phase | | % | 23 | 22 | 24 | 26 | 24 |
| Test specimen performance | tensile modulus | 100 mm/min | GPa | 1.0 | 1.7 | 1.4 | 1.4 | 0.9 |
| | | 500 mm/min | GPa | 0.7 | 1.6 | 1.3 | 1.2 | 0.8 |
| | | 1000 mm/min | GPa | 0.6 | 1.4 | 1.1 | 0.9 | 0.7 |
| | | (1000 mm/min) − (100 mm/min) | GPa | −0.4 | −0.3 | −0.3 | −0.5 | −0.2 |
| | tensile rupture elongation | 100 mm/min | % | 100 | 60 | 63 | 122 | 101 |
| | | 500 mm/min | % | 120 | 72 | 70 | 137 | 113 |
| | | 1000 mm/min | % | 121 | 75 | 80 | 147 | 120 |
| | | (1000 mm/min) − (100 mm/min) | % | 21 | 15 | 17 | 25 | 19 |

TABLE 5

| | | | | Reference example | |
|---|---|---|---|---|---|
| | | | | 30 | 31 |
| Component proportion | first resin (A1) | A1-14 | parts by weight | 70 | |
| | | A1-15 | parts by weight | | 70 |
| | second resin with reactive functional group (A2) | A2-1 | parts by weight | 30 | 30 |
| Melt-kneading | L/$D_0$ of twin screw extruder | | — | 45 | 45 |
| | screw constitution | | — | C | C |
| | existence of stretched flow zone | | — | yes | yes |
| | proportion of stretched flow zone | | % | 29 | 29 |
| | cylinder temperature setting | | °C. | 220 | 350 |
| | screw rotation speed | | rpm | 300 | 300 |
| | extrusion rate | | kg/h | 20 | 20 |
| | residence time | | min | 1.8 | 1.8 |
| | Pkmax − Pfmin | | MPa | — | — |
| | maximum resin temperature | | °C. | — | — |
| | number of times of kneading | | times | 1 | 1 |
| Morphology | continuous phase resin | | — | A1 | A1 |
| | dispersal phase resin | | — | A2 | A2 |
| | dispersal phase having particle diameter of 10 to 1,000 nm | | — | yes | yes |
| | existence of finer particles of 1 to 100 nm in dispersal phase | | — | yes | yes |
| | area proportion of finer particles of 1 to 100 nm in dispersal phase | % | | 24 | 24 |

TABLE 5-continued

| | | | | Reference example | |
|---|---|---|---|---|---|
| | | | | 30 | 31 |
| Test specimen performance | tensile modulus | 100 mm/min | GPa | 1.0 | 1.0 |
| | | 500 mm/min | GPa | 0.9 | 0.9 |
| | | 1000 mm/min | GPa | 0.8 | 0.8 |
| | | (1000 mm/min) − (100 mm/min) | GPa | −0.2 | −0.2 |
| | tensile rupture elongation | 100 mm/min | % | 128 | 128 |
| | | 500 mm/min | % | 137 | 137 |
| | | 1000 mm/min | % | 145 | 145 |
| | | (1000 mm/min) − (100 mm/min) | % | 17 | 17 |

In Reference examples 1 to 15 and 19 to 31, the melt-kneading step of the first resin (A1) and the second resin with a reactive functional group (A2) serves to control the number average particle diameter of the particles of the second resin (A2) in the range of 10 to 1,000 nm. Furthermore, the particles of the second resin (A2) can contain finer particles of 1 to 100 nm of the compound resulting from the reaction of the first resin (A1) and the second resin (A2), and the area of the finer particles can account for 20% or more of that of the particles of the second resin (A2). It is seen from results of the tensile test that the tensile modulus decreases and the tensile rupture elongation increases with an increasing tension speed.

In Reference examples 16 and 18, the number average particle diameter of the particles of the second resin (A2) is not controlled in the range of 10 to 1,000 nm, and the particles of the second resin (A2) do not contain finer particles. In the tensile test, the tensile modulus increases and the tensile rupture elongation decreases with an increasing tension speed.

Reference example 17 uses a resin without a reactive functional group (F). Because the dispersal phase (F) does not contain a reactive functional group, the tensile modulus increases and the tensile rupture elongation decreases with an increasing tension speed in the tensile test even of the number average particle diameter is controlled in the range of 10 to 1,000 nm. Furthermore, said dispersal phase (F) did not contain finer particles.

Examples 1 to 28, 32 to 45, and 74, and Comparative Examples 1, 4 to 23, and 31

Input materials were mixed according to the proportions given in Tables 6, 7, and 10 to 14 and supplied to the feed port of a twin screw extruder. The twin screw extruder used was a co-rotating full intermeshing type twin extruder (TEX-30α supplied by The Japan Steel Works, Ltd.) comprising two double-thread screws with a screw diameter of 30 mm and a L/D0 ratio of 35. Melt-kneading was performed in a nitrogen flow at a cylinder temperature, screw rotation speed, and extrusion rate given in Tables 6, 7, and 10 to 14 to allow a molten resin strand to be discharged through the discharge nozzle (L/D0=35). Here, a coloring agent was fed together with the input materials, and the residence time was determined as the time period until the degree of coloring of the extruded material reached a maximum. The residence, time measurements are listed in Tables 6, 7, and 10 to 14. As a screw constitution F, three kneading zones were provided in such a manner that each of them started at the position of L/D0=7, 16, or 25, and that each kneading zone had a length ratio Lk/D0 of 3.0, 3.0, or 3.0, respectively. A reverse screw zone was provided in the downstream side of each kneading zone, and each reverse screw zone had a length ratio Lr/D0 of 0.5, 0.5, or 0.5, respectively. The total length of said kneading zones accounted for 26% of the total screw length. A vacuum vent zone was provided at the position of L/D0=30, and volatile components were removed at a gauge pressure of −0.1 MPa. The molten resin strand discharged was cooled as it was passed through a cooling bath, and then it was cut by a pelletizer as it is taken up to produce a pellet-like sample of a fiber reinforced resin composition.

Said sample was vacuum-dried at 80° C. for 12 hours or more and injection-molded to prepare specimens for bending test and Charpy impact test, which were then subjected to morphology observation and evaluation in bending elastic modulus and Charpy impact strength. Results of melt-kneading and those of various evaluations are given in Tables 6, 7, and 10 to 14.

Comparative Example 2

Input materials were mixed according to the proportions given in Table 12 and supplied to the feed port of a twin screw extruder. The twin screw extruder used was a co-rotating full intermeshing type twin extruder (TEM-41SS-22/1V supplied by Toshiba Machine Co.) comprising two double-thread screws with a screw diameter of 41 mm and a L/D0 ratio of 100. Melt-kneading was performed in a nitrogen flow at a cylinder temperature, screw rotation speed, and extrusion rate given in Table 12 to allow a molten resin strand to be discharged through the discharge nozzle (L/D0=100). Here, a coloring agent was fed together with the input materials, and the residence time was determined as the time period until the degree of coloring of the extruded material reached a maximum. The residence time measurements are listed in Table 12. Said screw constitution A was used as in Comparative example 1. Resin pressure gauges were installed in two or more kneading zones, and the largest of the kneading zone resin pressure readings was taken as the value of Pkmax (MPa). Resin pressure gauges were installed in two or more full flight zones, and the smallest of the full flight zone resin pressure readings was taken as the value of Pfmin (MPa). The values of the former minus the latter are given in Table 12. Resin thermometers were installed at two or more equally spaced positions in the extruder, and the highest of their resin temperature readings is listed as maximum resin temperature in Table 12. A vacuum vent zone was provided at the position of L/D0=96, and volatile components were removed at a gauge pressure of −0.1 MPa. The molten resin strand discharged was cooled as it was passed through a cooling bath, and then it was cut by a pelletizer as it is taken up to produce a pellet-like sample of a fiber reinforced resin composition.

Said sample was vacuum-dried at 80° C. for 12 hours or more and injection-molded to prepare specimens for bending test and Charpy impact test, which were then subjected to morphology observation and evaluation in bending elastic modulus and Charpy impact strength. Results of melt-kneading and those of various evaluations are given in Table 12.

Comparative Example 3

Input materials were mixed according to the proportions given in Table 12 and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 45. Melt-kneading was performed in a nitrogen flow at a cylinder temperature, screw rotation speed, and extrusion rate given in Table 12 to allow a molten resin strand to be discharged through the discharge nozzle (L/D0=45). Here, a coloring agent was fed together with the input materials, and the residence time was determined as the time period until the degree of coloring of the extruded material reached a maximum. The residence time measurements are listed in Table 12. The screw constitution C, which has stretched flow zones, was used as in Comparative example 19. A vacuum vent zone was provided at the position of L/D0=38, and volatile components were removed at a gauge pressure of −0.1 MPa. The molten resin strand discharged was cooled as it was passed through a cooling bath, and then it was cut by a pelletizer as it is taken up to produce a pellet-like sample of a fiber reinforced resin composition.

Said sample was vacuum-dried at 80° C. for 12 hours or more and injection-molded to prepare specimens for bending test and Charpy impact test, which were then subjected to morphology observation and evaluation in bending elastic modulus and Charpy impact strength. Results of melt-kneading and those of various evaluations are given in Table 12.

Example 29

The component (A) and the component (B) given in Table 8 were mixed and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 35. Melt-kneading was performed in a nitrogen flow at a cylinder temperature, screw rotation speed, and extrusion rate given in Table 8 to allow a molten resin strand to be discharged through the discharge nozzle (L/D0=35). Here, a coloring agent was fed together with the input materials, and the residence time was determined as the time period until the degree of coloring of the extruded material reached a maximum. The residence time measurements are listed in Table 8. The screw constitution F was used as in Example 1. A vacuum vent zone was provided at the position of L/D0=30, and volatile components were removed at a gauge pressure of −0.1 MPa. The molten resin strand discharged was cooled as it was passed through a cooling bath, and then it was cut by a pelletizer as it is taken up to produce a resin composition. This resin composition and the component (C) given in Table 8 were melt-kneaded under the same conditions as for the above mentioned components (A) and (B) to provide a pellet-like sample of a fiber reinforced resin composition.

Said sample was vacuum-dried at 80° C. for 12 hours or more and injection-molded to prepare specimens for bending test and Charpy impact test, which were then subjected to morphology observation and evaluation in bending elastic modulus and Charpy impact strength. Results of melt-kneading and those of various evaluations are given in Table 8.

Example 30

The component (A) and the component (C) given in Table 9 were mixed and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 35. Melt-kneading was performed in a nitrogen flow at a cylinder temperature, screw rotation speed, and extrusion rate given in Table 9 to allow a molten resin strand to be discharged through the discharge nozzle (L/D0=35). Here, a coloring agent was fed together with the input materials, and the residence time was determined as the time period until the degree of coloring of the extruded material reached a maximum. The residence time measurements are listed in Table 9. The screw constitution F was used as in Example 1. A vacuum vent zone was provided at the position of L/D0=30, and volatile components were removed at a gauge pressure of −0.1 MPa. The molten resin strand discharged was cooled as it was passed through a cooling bath, and then it was cut by a pelletizer as it is taken up to produce a resin composition. This resin composition and the component (B) given in Table 9 were mixed, fed to the hopper of a J150EII-P injection molding machine supplied by The Japan Steel Works, Ltd., and molded under the conditions of a molding temperature of 260° C., mold temperature of 80° C., injection pressure lower limit of +5 kgf/cm2 to provide a bending test specimen and a ⅛ inch notched Charpy impact test specimen. Results of morphology observation and those of evaluation in bending elastic modulus and Charpy impact strength are listed in Table 9.

Example 31

The component (B) and the component (C) given in Table 9 were mixed and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 35. Melt-kneading was performed in a nitrogen flow at a cylinder temperature, screw rotation speed, and extrusion rate given in Table 9 to allow a molten resin strand to be discharged through the discharge nozzle (L/D0=35). Here, a coloring agent was fed together with the input materials, and the residence time was determined as the time period until the degree of coloring of the extruded material reached a maximum. The residence time measurements are listed in Table 9. The screw constitution F was used as in Example 1. A vacuum vent zone was provided at the position of L/D0=30, and volatile components were removed at a gauge pressure of −0.1 MPa. The molten resin strand discharged was cooled as it was passed through a cooling bath, and then it was cut by a pelletizer as it is taken up to produce a resin composition. This resin composition and the component (A) given in Table 9 were mixed, fed to the hopper of a J150EII-P injection molding machine supplied by The Japan Steel Works, Ltd., and molded under the conditions of a molding temperature of 260° C., mold temperature of 80° C., injection pressure lower limit of +5 kgf/cm2 to provide a bending test specimen and a ⅛ inch notched Charpy impact test specimen. Results of morphology observation and those of evaluation in bending elastic modulus and Charpy impact strength are listed in Table 9.

TABLE 6

| | | | | Example | | | | | | |
|---|---|---|---|---|---|---|---|---|---|---|
| | | | | 1 | 2 | 3 | 4 | 5 | 6 | 7 |
| Component proportion | melt-kneaded product (A) | Reference example 1 | parts by weight | 10 | | | | | | |
| | | Reference example 2 | parts by weight | | 5 | 10 | 30 | | | |
| | | Reference example 3 | parts by weight | | | | | 10 | | |
| | | Reference example 4 | parts by weight | | | | | | 10 | |
| | | Reference example 5 | parts by weight | | | | | | | 10 |
| | | Reference example 6 | parts by weight | | | | | | | |
| | | Reference example 7 | parts by weight | | | | | | | |
| | | Reference example 8 | parts by weight | | | | | | | |
| | third resin (B) | B-1 | parts by weight | 90 | 95 | 90 | 70 | 90 | 90 | 90 |
| | fibrous filler (C) | C-1 | parts by weight | 20 | 20 | 20 | 20 | 20 | 20 | 20 |
| | | C-2 | parts by weight | | | | | | | |
| Composition | | (A1) + (B) | parts by weight | 97 | 98.5 | 97 | 91 | 97.5 | 96 | 97 |
| | | (A2) | parts by weight | 3 | 1.5 | 3 | 9 | 2.5 | 4 | 3 |
| | | kneading method | | (A) + (B) + (C) extruded | | | | | | |
| Extruder conditions for melt-kneading | | $L/D_0$ of twin screw extruder | — | 35 | 35 | 35 | 35 | 35 | 35 | 35 |
| | | screw constitution | — | F | F | F | F | F | F | F |
| | | existence of stretched flow zone | — | no | no | no | no | no | no | no |
| | | cylinder temperature setting | °C. | 260 | 260 | 260 | 260 | 260 | 260 | 260 |
| | | screw rotation speed | rpm | 300 | 300 | 300 | 300 | 300 | 300 | 300 |
| | | extrusion rate | kg/h | 20 | 20 | 20 | 20 | 20 | 20 | 20 |
| | | residence time | min | 1.4 | 1.4 | 1.4 | 1.4 | 1.4 | 1.4 | 1.4 |
| | | number of times of kneading | times | 1 | 1 | 1 | 1 | 1 | 1 | 1 |
| Morphology | | continuous phase resin | — | A1, B | A1, B | A1, B | A1, B | A1, B | A1, B | A1, B |
| | | dispersal phase resin | — | A2 | A2 | A2 | A2 | A2 | A2 | A2 |
| | | dispersal phase having particle diameter of 10 to 1,000 nm | — | yes | yes | yes | yes | yes | yes | yes |
| | | existence of finer particles of 1 to 100 nm in dispersal phase | — | yes | yes | yes | yes | yes | yes | yes |
| | | area proportion of finer particles of 1 to 100 nm in dispersal phase | % | 30 | 30 | 30 | 30 | 25 | 30 | 23 |
| | | existence of finer particles of more than 300 nm | — | no | no | no | no | no | no | no |
| | | Number average fiber length of reinforcement fiber | mm | 0.2 | 0.2 | 0.2 | 0.2 | 0.2 | 0.2 | 0.2 |
| Test specimen performance | | bending elastic modulus | GPa | 12.1 | 12.4 | 12.1 | 11.0 | 12.2 | 11.6 | 12.0 |
| | | bending elastic modulus/bending elastic modulus in Comparative example[1] | | 1.00 | 1.02 | 1.00 | 0.91 | 1.01 | 0.96 | 0.99 |
| | | Charpy impact strength (notched) | kJ/m² | 16.2 | 13.2 | 16.2 | 24.6 | 15.9 | 18.9 | 15.7 |
| | | Charpy impact strength/Charpy impact strength in Comparative example[2] | | 1.80 | 1.47 | 1.80 | 2.73 | 1.77 | 2.10 | 1.75 |

| | | | | Example | | | | | |
|---|---|---|---|---|---|---|---|---|---|
| | | | | 8 | 9 | 10 | 11 | 12 | 13 |
| Component proportion | melt-kneaded product (A) | Reference example 1 | parts by weight | | | | | | |
| | | Reference example 2 | parts by weight | | | | 10 | 10 | 10 |
| | | Reference example 3 | parts by weight | | | | | | |
| | | Reference example 4 | parts by weight | | | | | | |
| | | Reference example 5 | parts by weight | | | | | | |
| | | Reference example 6 | parts by weight | 10 | | | | | |
| | | Reference example 7 | parts by weight | | 10 | | | | |
| | | Reference example 8 | parts by weight | | | 10 | | | |
| | third resin (B) | B-1 | parts by weight | 90 | 90 | 90 | 90 | 90 | 90 |
| | fibrous filler (C) | C-1 | parts by weight | 20 | 20 | 20 | 10 | 30 | |
| | | C-2 | parts by weight | | | | | | 20 |
| Composition | | (A1) + (B) | parts by weight | 97 | 97 | 97 | 97 | 97 | 97 |
| | | (A2) | parts by weight | 3 | 3 | 3 | 3 | 3 | 3 |
| | | kneading method | | (A) + (B) + (C) extruded | | | | | |
| Extruder conditions for melt-kneading | | $L/D_0$ of twin screw extruder | — | 35 | 35 | 35 | 35 | 35 | 35 |
| | | screw constitution | — | F | F | F | F | F | F |
| | | existence of stretched flow zone | — | no | no | no | no | no | no |
| | | cylinder temperature setting | °C. | 260 | 260 | 260 | 260 | 260 | 260 |
| | | screw rotation speed | rpm | 300 | 300 | 300 | 300 | 300 | 300 |
| | | extrusion rate | kg/h | 20 | 20 | 20 | 20 | 20 | 20 |
| | | residence time | min | 1.4 | 1.4 | 1.4 | 1.4 | 1.4 | 1.4 |
| | | number of times of kneading | times | 1 | 1 | 1 | 1 | 1 | 1 |
| Morphology | | continuous phase resin | — | A1, B | A1, B | A1, B | A1, B | A1, B | A1, B |
| | | dispersal phase resin | — | A2 | A2 | A2 | A2 | A2 | A2 |
| | | dispersal phase having particle diameter of 10 to 1,000 nm | — | yes | yes | yes | yes | yes | yes |
| | | existence of finer particles of 1 to 100 nm in dispersal phase | — | yes | yes | yes | yes | yes | yes |
| | | area proportion of finer particles of 1 to 100 nm in dispersal phase | % | 27 | 24 | 24 | 30 | 30 | 30 |
| | | existence of finer particles of more than 300 nm | — | no | no | no | no | no | no |

TABLE 6-continued

|  |  |  |  |  |  |  |  |  |
|---|---|---|---|---|---|---|---|---|
| | Number average fiber length of reinforcement fiber | mm | 0.2 | 0.2 | 0.2 | 0.2 | 0.2 | 0.2 |
| Test specimen performance | bending elastic modulus | GPa | 11.9 | 11.7 | 12.0 | 9.1 | 16.2 | 13.2 |
| | bending elastic modulus/bending elastic modulus in Comparative example[1] | | 0.98 | 0.97 | 0.99 | 1.01 | 1.01 | 1.01 |
| | Charpy impact strength (notched) | kJ/m$^2$ | 16.5 | 16.6 | 15.7 | 9.0 | 18.8 | 25.7 |
| | Charpy impact strength/Charpy impact strength in Comparative example[2] | | 1.84 | 1.85 | 1.74 | 1.76 | 1.33 | 1.31 |

Notes

[1] and [2] The ratios given for Examples 1 to 10, Example 11, Example 12, and Example 13 show comparisons with Comparative example 8, Comparative example 7, Comparative example 10, and Comparative example 9, respectively.

TABLE 7

| | | | | Example | | | | | | | |
|---|---|---|---|---|---|---|---|---|---|---|---|
| | | | | 14 | 15 | 16 | 17 | 18 | 19 | 20 | 21 |
| Component proportion | melt-kneaded product (A) | Reference example 9 | parts by weight | 5 | 10 | 30 | 10 | | | | |
| | | Reference example 10 | parts by weight | | | | | 10 | | | |
| | | Reference example 11 | parts by weight | | | | | | 10 | | |
| | | Reference example 12 | parts by weight | | | | | | | 10 | |
| | | Reference example 13 | parts by weight | | | | | | | | 10 |
| | | Reference example 14 | parts by weight | | | | | | | | |
| | | Reference example 15 | parts by weight | | | | | | | | |
| | third resin (B) | B-1 | parts by weight | 95 | 90 | 70 | | 90 | 90 | 90 | 90 |
| | | B-2 | parts by weight | | | | 90 | | | | |
| | fibrous filler (C) | C-1 | parts by weight | 20 | 20 | 20 | 20 | 20 | 20 | 20 | 20 |
| | | C-2 | parts by weight | | | | | | | | |
| | | C-3 | parts by weight | | | | | | | | |
| Composition | | (A1) + (B) | parts by weight | 98.5 | 97 | 91 | 97 | 97.5 | 96 | 97 | 97 |
| | | (A2) | parts by weight | 1.5 | 3 | 9 | 3 | 2.5 | 4 | 3 | 3 |
| | kneading method | | | (A) + (B) + (C) extruded | | | | | | | |
| Extruder conditions for melt-kneading | L/D$_0$ of twin screw extruder | | — | 35 | 35 | 35 | 35 | 35 | 35 | 35 | 35 |
| | screw constitution | | — | F | F | F | F | F | F | F | F |
| | existence of stretched flow zone | | — | no | no | no | no | no | no | no | no |
| | cylinder temperature setting | | °C. | 260 | 260 | 260 | 260 | 260 | 260 | 260 | 260 |
| | screw rotation speed | | rpm | 300 | 300 | 300 | 300 | 300 | 300 | 300 | 300 |
| | extrusion rate | | kg/h | 20 | 20 | 20 | 20 | 20 | 20 | 20 | 20 |
| | residence time | | min | 1.4 | 1.4 | 1.4 | 1.4 | 1.4 | 1.4 | 1.4 | 1.4 |
| | number of times of kneading | | times | 1 | 1 | 1 | 1 | 1 | 1 | 1 | 1 |
| Morphology | continuous phase resin | | — | A1, B | A1, B | A1, B | A1, B | A1, B | A1, B | A1, B | A1, B |
| | dispersal phase resin | | — | A2 | A2 | A2 | A2 | A2 | A2 | A2 | A2 |
| | dispersal phase having particle diameter of 10 to 1,000 nm | | — | yes | yes | yes | yes | yes | yes | yes | yes |
| | existence of finer particles of 1 to 100 nm in dispersal phase | | — | yes | yes | yes | yes | yes | yes | yes | yes |
| | area proportion of finer particles of 1 to 100 nm in dispersal phase | | % | 27 | 27 | 30 | 27 | 30 | 25 | 31 | 23 |
| | existence of finer particles of more than 300 nm | | — | no | no | no | no | no | no | no | no |
| | Number average fiber length of reinforcement fiber | | mm | 0.2 | 0.2 | 0.2 | 0.2 | 0.2 | 0.2 | 0.2 | 0.2 |
| Test specimen performance | bending elastic modulus | | GPa | 16.1 | 13.4 | 16.0 | 24.8 | 15.7 | 18.8 | 15.7 | 16.5 |
| | bending elastic modulus/bending elastic modulus in Comparative example[1] | | | 1.33 | 1.11 | 1.32 | 2.05 | 1.30 | 1.55 | 1.30 | 1.36 |
| | Charpy impact strength (notched) | | kJ/m$^2$ | 13.4 | 16.3 | 25.1 | 19.3 | 15.9 | 18.7 | 15.9 | 16.6 |
| | Charpy impact strength/Charpy impact strength in Comparative example[2] | | | 1.49 | 1.81 | 2.79 | 2.15 | 1.77 | 2.08 | 1.77 | 1.84 |

| | | | | Example | | | | | | |
|---|---|---|---|---|---|---|---|---|---|---|
| | | | | 22 | 23 | 24 | 25 | 26 | 27 | 28 |
| Component proportion | melt-kneaded product (A) | Reference example 9 | parts by weight | | | 10 | 10 | 10 | 10 | 30 |
| | | Reference example 10 | parts by weight | | | | | | | |
| | | Reference example 11 | parts by weight | | | | | | | |

TABLE 7-continued

| | | | | | | | | | | | |
|---|---|---|---|---|---|---|---|---|---|---|---|
| | | Reference example 12 | parts by weight | | | | | | | | |
| | | Reference example 13 | parts by weight | | | | | | | | |
| | | Reference example 14 | parts by weight | 10 | | | | | | | |
| | | Reference example 15 | parts by weight | | 10 | | | | | | |
| | third resin (B) | B-1 | parts by weight | 90 | 90 | 90 | 90 | 90 | 90 | 70 | |
| | | B-2 | parts by weight | | | | | | | | |
| | fibrous filler (C) | C-1 | parts by weight | 20 | 20 | 10 | 30 | | | | |
| | | C-2 | parts by weight | | | | | 20 | | | |
| | | C-3 | parts by weight | | | | | | 43 | 43 | |
| Composition | | (A1) + (B) | parts by weight | 97 | 97 | 97 | 97 | 97 | 97 | 97 | |
| | | (A2) | parts by weight | 3 | 3 | 3 | 3 | 3 | 3 | 3 | |
| | | kneading method | | (A) + (B) + (C) extruded | | | | | | | |
| Extruder conditions for melt-kneading | | L/D$_0$ of twin screw extruder | — | 35 | 35 | 35 | 35 | 35 | 35 | 35 | |
| | | screw constitution | — | F | F | F | F | F | F | F | |
| | | existence of stretched flow zone | — | no | no | no | no | no | no | no | |
| | | cylinder temperature setting | ° C. | 260 | 260 | 260 | 260 | 260 | 260 | 260 | |
| | | screw rotation speed | rpm | 300 | 300 | 300 | 300 | 300 | 300 | 300 | |
| | | extrusion rate | kg/h | 20 | 20 | 20 | 20 | 20 | 20 | 20 | |
| | | residence time | min | 1.4 | 1.4 | 1.4 | 1.4 | 1.4 | 1.4 | 1.4 | |
| | | number of times of kneading | times | 1 | 1 | 1 | 1 | 1 | 1 | 1 | |
| Morphology | | continuous phase resin | — | A1, B | A1, B | A1, B | A1, B | A1, B | A1, B | A1, B | |
| | | dispersal phase resin | — | A2 | A2 | A2 | A2 | A2 | A2 | A2 | |
| | | dispersal phase having particle diameter of 10 to 1,000 nm | — | yes | yes | yes | yes | yes | yes | yes | |
| | | existence of finer particles of 1 to 100 nm in dispersal phase | — | yes | yes | yes | yes | yes | yes | yes | |
| | | area proportion of finer particles of 1 to 100 nm in dispersal phase | % | 31 | 27 | 27 | 27 | 27 | 27 | 30 | |
| | | existence of finer particles of more than 300 nm | — | no | no | no | no | no | no | no | |
| | | Number average fiber length of reinforcement fiber | mm | 0.2 | 0.2 | 0.2 | 0.2 | 0.2 | 0.3 | 0.3 | |
| Test specimen performance | | bending elastic modulus | GPa | 16.6 | 15.8 | 9.0 | 18.8 | 25.7 | 8.1 | 7.8 | |
| | | bending elastic modulus/bending elastic modulus in Comparative example[1] | | 1.38 | 1.30 | 1.00 | 1.18 | 1.96 | 0.99 | 0.95 | |
| | | Charpy impact strength (notched) | kJ/m$^2$ | 17.0 | 16.1 | 9.1 | 19.1 | 26.1 | 14.4 | 20.8 | |
| | | Charpy impact strength/Charpy impact strength in Comparative example[2] | | 1.89 | 1.79 | 1.79 | 1.35 | 1.33 | 1.22 | 1.76 | |

Notes
[1] and [2] The ratios given for Example 14 to 23, Example 24, Example 25, Example 26, and Examples 27 and 28 show comparisons with Comparative example 8, Comparative example 7, Comparative example 10, Comparative example 9, and Comparative example 23, respectively.

TABLE 8

| | | | | | Example 29 |
|---|---|---|---|---|---|
| Component proportion | melt-kneaded product (A) | Reference example 9 | | parts by weight | 10 |
| | third resin (B) | B-1 | | parts by weight | 90 |
| | fibrous filler (C) | C-1 | | parts by weight | 20 |
| composition | (A1) + (B) | | | parts by weight | 97 |
| | (A2) | | | parts by weight | 3 |
| kneading method | | | | | ((A) + (B) extruded) + (C) extruded |
| Extruder conditions for melt-kneading of (A) and (B) | L/D$_0$ of twin screw extruder | | — | | 35 |
| | screw constitution | | — | | F |
| | existence of stretched flow zone | | — | | no |
| | cylinder temperature setting | | ° C. | | 260 |
| | screw rotation speed | | rpm | | 300 |
| | extrusion rate | | kg/h | | 20 |
| | residence time | | min | | 1.4 |
| | number of times of kneading | | times | | 1 |
| Extruder conditions for melt-kneading of melt-kneaded product and (C) | L/D$_0$ of twin screw extruder | | — | | 35 |
| | screw constitution | | — | | F |
| | existence of stretched flow zone | | — | | no |
| | cylinder temperature setting | | ° C. | | 260 |
| | screw rotation speed | | rpm | | 300 |
| | extrusion rate | | kg/h | | 20 |
| | residence time | | min | | 1.4 |
| | number of times of kneading | | times | | 1 |

TABLE 8-continued

|  |  |  | Example 29 |
|---|---|---|---|
| Morphology | continuous phase resin | — | A1, B |
|  | dispersal phase resin | — | A2 |
|  | dispersal phase having particle diameter of 10 to 1,000 nm | — | yes |
|  | existence of finer particles of 1 to 100 nm in dispersal phase | — | yes |
|  | area proportion of finer particles of 1 to 100 nm in dispersal phase | % | 27 |
|  | existence of finer particles of more than 300 nm | — | no |
| Number average fiber length of reinforcement fiber |  | mm | 0.2 |
| Test specimen performance | bending elastic modulus | GPa | 12.0 |
|  | bending elastic modulus/bending elastic modulus in Comparative example[1] |  | 0.99 |
|  | Charpy impact strength (notched) | kJ/m$^2$ | 16.2 |
|  | Charpy impact strength/Charpy impact strength in Comparative example[2] |  | 18.1 |

Notes
[1] and [2] The ratios given for Example 29 show comparisons with Comparative example 8.

TABLE 9

|  |  |  |  | Example 30 | Example 31 |
|---|---|---|---|---|---|
| Component proportion | melt-kneaded product (A) | Reference example 9 | parts by weight | 10 | 10 |
|  | third resin (B) | B-1 | parts by weight | 90 | 90 |
|  | fibrous filler (C) | C-1 | parts by weight | 20 | 20 |
| composition | (A1) + (B) |  | parts by weight | 97 | 97 |
|  | (A2) |  | parts by weight | 3 | 3 |
|  |  | kneading method |  | ((A) + (C) extruded) + (B) injection | (A) + ((B) + (C) extruded) injection |
| Extruder conditions for melt-kneading of (A) and (C) | L/D$_0$ of twin screw extruder |  | — | 35 | — |
|  | screw constitution |  | — | F | — |
|  | existence of stretched flow zone |  | — | no | — |
|  | cylinder temperature setting |  | ° C. | 260 | — |
|  | screw rotation speed |  | rpm | 300 | — |
|  | extrusion rate |  | kg/h | 20 | — |
|  | residence time |  | min | 1.4 | — |
|  | number of times of kneading |  | times | 1 | — |
| Melt-kneading of (B) and (C) with extruder | L/D$_0$ of twin screw extruder |  | — | — | 35 |
|  | screw constitution |  | — | — | F |
|  | existence of stretched flow zone |  | — | — | no |
|  | cylinder temperature setting |  | ° C. | — | 260 |
|  | screw rotation speed |  | rpm | — | 300 |
|  | extrusion rate |  | kg/h | — | 20 |
|  | residence time |  | min | — | 1.4 |
|  | number of times of kneading |  | times | — | 1 |
| Morphology | continuous phase resin |  | — | A1, B | A1, B |
|  | dispersal phase resin |  | — | A2 | A2 |
|  | dispersal phase having particle diameter of 10 to 1,000 nm |  | — | yes | yes |
|  | existence of finer particles of 1 to 100 nm in dispersal phase |  | — | yes | yes |
|  | area proportion of finer particles of 1 to 100 nm in dispersal phase |  | % | 27 | 27 |
|  | existence of finer particles of more than 300 nm |  | — | no | no |
| Number average fiber length of reinforcement fiber |  |  | mm | 0.2 | 0.2 |
| Test specimen performance | bending elastic modulus |  | GPa | 12.0 | 12.0 |
|  | bending elastic modulus/bending elastic modulus in Comparative example[1] |  |  | 0.99 | 0.99 |
|  | Charpy impact strength (notched) |  | kJ/m$^2$ | 16.2 | 16.2 |
|  | Charpy impact strength/Charpy impact strength in Comparative example[2] |  |  | 1.81 | 1.81 |

Notes
[1] and [2] The ratios given for Examples 30 and 31 show comparisons with Comparative example 8.

TABLE 10

| | | | | Example | | | | | | |
|---|---|---|---|---|---|---|---|---|---|---|
| | | | | 32 | 33 | 34 | 35 | 36 | 37 | 38 |
| Component proportion | melt-kneaded product (A) | Reference example 19 | parts by weight | 10 | | | | | | |
| | | Reference example 20 | parts by weight | | 10 | | | | | |
| | | Reference example 21 | parts by weight | | | 10 | | | | |
| | | Reference example 22 | parts by weight | | | | 10 | | | |
| | | Reference example 23 | parts by weight | | | | | 10 | | |
| | | Reference example 24 | parts by weight | | | | | | 10 | |
| | | Reference example 25 | parts by weight | | | | | | | 10 |
| | third resin (B) | B-3 | parts by weight | 90 | | | | | | |
| | | B-4 | parts by weight | | 90 | | | | | |
| | | B-5 | parts by weight | | | 90 | | | | |
| | | B-6 | parts by weight | | | | 90 | | | |
| | | B-7 | parts by weight | | | | | 90 | | |
| | | B-8 | parts by weight | | | | | | 90 | |
| | | B-9 | parts by weight | | | | | | | 90 |
| | fibrous filler (C) | C-1 | parts by weight | 20 | 20 | 20 | 20 | 20 | 20 | 20 |
| Composition | (A1) + (B) | | parts by weight | 97 | 97 | 97 | 97 | 97 | 97 | 97 |
| | (A2) | | parts by weight | 3 | 3 | 3 | 3 | 3 | 3 | 3 |
| | kneading method | | | (A) + (B) + (C) extruded | | | | | | |
| Extruder conditions for melt-kneading | $L/D_0$ of twin screw extruder | | — | 35 | 35 | 35 | 35 | 35 | 35 | 35 |
| | screw constitution | | — | F | F | F | F | F | F | F |
| | existence of stretched flow zone | | — | no | no | no | no | no | no | no |
| | cylinder temperature setting | | °C. | 280 | 260 | 220 | 220 | 305 | 260 | 280 |
| | screw rotation speed | | rpm | 300 | 300 | 300 | 300 | 300 | 300 | 300 |
| | extrusion rate | | kg/h | 20 | 20 | 20 | 20 | 20 | 20 | 20 |
| | residence time | | min | 1.4 | 1.4 | 1.4 | 1.4 | 1.4 | 1.4 | 1.4 |
| | number of times of kneading | | times | 1 | 1 | 1 | 1 | 1 | 1 | 1 |
| Morphology | continuous phase resin | | — | A1, B | A1, B | A1, B | A1, B | A1, B | A1, B | A1, B |
| | dispersal phase resin | | — | A2 | A2 | A2 | A2 | A2 | A2 | A2 |
| | dispersal phase having particle diameter of 10 to 1,000 nm | | — | yes | yes | yes | yes | yes | yes | yes |
| | existence of finer particles of 1 to 100 nm in dispersal phase | | — | yes | yes | yes | yes | yes | yes | yes |
| | area proportion of finer particles of 1 to 100 nm in dispersal phase | | % | 26 | 25 | 24 | 24 | 24 | 23 | 23 |
| | existence of finer particles of more than 300 nm | | — | no | no | no | no | no | no | no |
| | Number average fiber length of reinforcement fiber | | mm | 0.2 | 0.2 | 0.2 | 0.2 | 0.2 | 0.2 | 0.2 |
| Test specimen performance | bending elastic modulus | | GPa | 12.2 | 10.5 | 9.6 | 9.5 | 12.2 | 13.2 | 13.0 |
| | bending elastic modulus/bending elastic modulus in Comparative example[1] | | | 1.00 | 0.99 | 0.99 | 1.00 | 1.00 | 0.99 | 0.99 |
| | Charpy impact strength (notched) | | $kJ/m^2$ | 22.3 | 18.3 | 20.0 | 21.9 | 16.0 | 15.7 | 13.2 |
| | Charpy impact strength/Charpy impact strength in Comparative example[2] | | | 18.1 | 1.56 | 1.49 | 1.40 | 1.48 | 1.45 | 1.79 |

Notes
[1] and [2] The ratios given for Examples 32 to 38 show comparisons with Comparative examples 12 to 18, respectively.

TABLE 11

| | | | | Example | | | | | | |
|---|---|---|---|---|---|---|---|---|---|---|
| | | | | 39 | 40 | 41 | 42 | 43 | 44 | 45 |
| Component proportion | melt-kneaded product (A) | Reference example 9 | parts by weight | | | | | 10 | 10 | 10 |
| | | Reference example 26 | parts by weight | 10 | | | | | | |
| | | Reference example 27 | parts by weight | | 10 | | | | | |
| | | Reference example 28 | parts by weight | | | 10 | | | | |
| | | Reference example 29 | parts by weight | | | | 10 | | | |
| | third resin (B) | B-3 | parts by weight | | | | | 90 | | |
| | | B-8 | parts by weight | | | | | | 90 | |
| | | B-10 | parts by weight | 90 | | | | | | |
| | | B-11 | parts by weight | | 90 | | | | | |
| | | B-12 | parts by weight | | | 90 | | | | 90 |
| | | B-13 | parts by weight | | | | 90 | | | |
| | fibrous filler (C) | C-1 | parts by weight | 20 | 20 | 20 | 20 | 20 | 20 | 20 |
| | | C-2 | parts by weight | | | | | | | |
| Composition | (A1) + (B) | | parts by weight | 97 | 97 | 97 | 97 | 97 | 97 | 97 |
| | (A2) | | parts by weight | 3 | 3 | 3 | 3 | 3 | 3 | 3 |
| | kneading method | | | | | | | | | |
| Extruder conditions for melt-kneading | $L/D_0$ of twin screw extruder | | — | 35 | 35 | 35 | 35 | 35 | 35 | 35 |
| | screw constitution | | — | F | F | F | F | F | F | F |
| | existence of stretched flow zone | | — | no | no | no | no | no | no | no |
| | cylinder temperature setting | | °C. | 190 | 290 | 300 | 190 | 280 | 260 | 300 |
| | screw rotation speed | | rpm | 300 | 300 | 300 | 300 | 300 | 300 | 300 |
| | extrusion rate | | kg/h | 20 | 20 | 20 | 20 | 20 | 20 | 20 |
| | residence time | | min | 1.4 | 1.4 | 1.4 | 1.4 | 1.4 | 1.4 | 1.4 |
| | number of times of kneading | | times | 1 | 1 | 1 | 1 | 1 | 1 | 1 |
| Morphology | continuous phase resin | | — | A1, B | A1, B | A1, B | A1, B | A1, B | A1, B | A1, B |
| | dispersal phase resin | | — | A2 | A2 | A2 | A2 | A2 | A2 | A2 |
| | dispersal phase having particle diameter of 10 to 1,000 nm | | — | yes | yes | yes | yes | yes | yes | yes |
| | existence of finer particles of 1 to 100 nm in dispersal phase | | — | yes | yes | yes | yes | yes | yes | yes |
| | area proportion of finer particles of 1 to 100 nm in dispersal phase | | % | 22 | 24 | 26 | 24 | 27 | 27 | 27 |
| | existence of finer particles of more than 300 nm | | — | no | no | no | no | no | no | no |
| | Number average fiber length of reinforcement fiber | | mm | 0.2 | 0.2 | 0.2 | 0.2 | 0.2 | 0.2 | 0.2 |
| Test specimen performance | bending elastic modulus | | GPa | 13.7 | 13.1 | 13.9 | 8.9 | 12.4 | 12.8 | 13.5 |
| | bending elastic modulus/bending elastic modulus in Comparative example[1] | | | 0.99 | 0.99 | 1.00 | 0.98 | 1.01 | 0.96 | 0.97 |
| | Charpy impact strength (notched) | | kJ/m² | 11.7 | 14.9 | 15.2 | 15.2 | 20.8 | 14.5 | 13.4 |
| | Charpy impact strength/Charpy impact strength in Comparative example[2] | | | 2.16 | 1.52 | 1.77 | 1.55 | 1.46 | 1.69 | 1.56 |

Notes

[1] and [2] The ratios given for Examples 39 to 42 show comparisons with Comparative examples 19 to 22, respectively.

The ratios given for Example 43 show comparisons with Comparative example 12.

The ratios given for Example 44 show comparisons with Comparative example 17.

The ratios given for Example 45 show comparisons with Comparative example 21.

TABLE 12

| | | | Comparative example | | | | | | | | | | | |
|---|---|---|---|---|---|---|---|---|---|---|---|---|---|---|
| | | | | 1 | 2 | 3 | 4 | 5 | 6 | 7 | 8 | 9 | 10 | 11 | 12 |
| Component proportion | first resin (A1) | A1-1 | parts by weight | 7 | 7 | 7 | | | | | | | | | |
| | second resin with reactive functional group (A2) | A2-1 | parts by weight | 3 | 3 | 3 | | | | | | | | | |
| | melt-kneaded product (A) | Reference example 16 | parts by weight | | | | 10 | | | | | | | | |
| | | Reference example 17 | parts by weight | | | | | 10 | | | | | | | |
| | | Reference example 18 | parts by weight | | | | | | 10 | | | | | | |
| | third resin (B) | B-1 | parts by weight | 90 | 90 | 90 | 90 | 90 | 90 | 100 | 100 | 100 | 100 | | |
| | | B-2 | parts by weight | | | | | | | | | | | 100 | |
| | | B-3 | parts by weight | | | | | | | | | | | | 100 |
| | fibrous filler (C) | C-1 | parts by weight | 20 | 20 | 20 | 20 | 20 | 20 | 10 | 20 | 20 | 30 | 20 | 20 |
| | | C-2 | parts by weight | | | | | | | | | | | | |
| Composition | (A1) + (B) | | parts by weight | 97 | 97 | 97 | 97 | 97 | 96 | 100 | 100 | 100 | 100 | 100 | 100 |
| | (A2) or (F) | | parts by weight | 3 | 3 | 3 | 3 | 3 | 4 | 0 | 0 | 0 | 0 | 0 | 0 |
| | kneading method | | | (A1)+(A2)+(B)+(C) extruded | extruded | (A1)+(A2)+(B)+(C) | (A)+(B)+(C) extruded | | | — | | | — | | |
| Melt-kneading with extruder | L/D₀ of twin screw extruder | | — | 35 | 100 | 45 | 35 | 35 | 35 | 35 | 35 | 35 | 35 | 35 | 35 |
| | screw constitution | | — | F | A | C | F | F | F | F | F | F | F | F | F |
| | existence of stretched flow zone | | — | no | no | yes | no | no | no | no | no | no | no | no | no |
| | proportion of stretched flow zone | | % | — | — | 29 | — | — | — | — | — | — | — | — | — |
| | cylinder temperature setting | | °C. | 260 | 260 | 260 | 260 | 260 | 260 | 260 | 260 | 260 | 260 | 260 | 280 |
| | screw rotation speed | | rpm | 300 | 250 | 300 | 300 | 300 | 300 | 200 | 200 | 200 | 200 | 200 | 200 |
| | extrusion rate | | kg/h | 20 | 50 | 20 | 20 | 20 | 20 | 20 | 20 | 20 | 20 | 20 | 20 |
| | residence time | | min | 1.4 | 2 | 1.8 | 1.4 | 1.4 | 1.4 | 1.4 | 1.4 | 1.4 | 1.4 | 1.4 | 1.4 |
| | Pkmax−Pkmin | | MPa | — | 0.4 | — | — | — | — | — | — | — | — | — | — |
| | maximum resin temperature | | °C. | — | 290 | — | — | — | — | — | — | — | — | — | — |
| | number of times of kneading | | times | 1 | 1 | 1 | 1 | 1 | 1 | 1 | 1 | 1 | 1 | 1 | 1 |
| Morphology | continuous phase resin | | — | A1, B | A1, B | A1, B | A1, B | A1, B | A1, B | B | B | B | B | B | B |
| | dispersal phase resin | | — | A2 | A2 | A2 | A2 | F | A2 | — | — | — | — | — | — |
| | dispersal phase having particle diameter of 10 to 1,000 nm | | — | no | no | no | no | yes | no | — | — | — | — | — | — |
| | existence of finer particles of 1 to 100 nm in dispersal phase | | — | no | yes | yes | no | no | no | — | — | — | — | — | — |
| | area proportion of finer particles of 1 to 100 nm in dispersal phase | | % | — | 10 | 9 | — | — | — | — | — | — | — | — | — |
| | existence of finer particles of more than 300 nm | | — | — | — | — | — | — | — | — | — | — | — | — | — |
| Test specimen properties | Number average fiber length of reinforcement fiber | | mm | 0.2 | 0.2 | 0.2 | 0.2 | 0.2 | 0.2 | 0.2 | 0.2 | 0.2 | 0.2 | 0.2 | 0.2 |
| | bending elastic modulus | | GPa | 10.8 | 10.8 | 10.8 | 10.7 | 10.5 | 10.6 | 9.0 | 12.1 | 13.1 | 16.0 | 11.9 | 12.2 |
| | bending elastic modulus/bending elastic modulus in Comparative example 8 | | — | 0.89 | 0.89 | 0.89 | 0.88 | 0.87 | 0.88 | — | — | — | — | — | — |
| | Charpy impact strength | | kJ/m² | 16.1 | 16.3 | 16.3 | 16.6 | 10.8 | 12.2 | 5.1 | 9.0 | 19.6 | 14.1 | 13.5 | 14.3 |
| | Charpy impact strength/Charpy impact strength in Comparative example 8 | | — | 1.79 | 1.81 | 1.81 | 1.85 | 1.20 | 1.36 | — | — | — | — | — | — |

TABLE 13

| | | | | Comparative example | | | | | | | | | | |
|---|---|---|---|---|---|---|---|---|---|---|---|---|---|---|
| | | | | 13 | 14 | 15 | 16 | 17 | 18 | 19 | 20 | 21 | 22 | 23 |
| Component proportion | first resin (A1) | A1-1 | parts by weight | | | | | | | | | | | |
| | second resin with reactive functional group (A2) | A2-1 | parts by weight | | | | | | | | | | | |
| | third resin (B) | B-1 | parts by weight | | | | | | | | | | | 100 |
| | | B-4 | parts by weight | 100 | | | | | | | | | | |
| | | B-5 | parts by weight | | 100 | | | | | | | | | |
| | | B-6 | parts by weight | | | 100 | | | | | | | | |
| | | B-7 | parts by weight | | | | 100 | | | | | | | |
| | | B-8 | parts by weight | | | | | 100 | | | | | | |
| | | B-9 | parts by weight | | | | | | 100 | | | | | |
| | | B-10 | parts by weight | | | | | | | 100 | | | | |
| | | B-11 | parts by weight | | | | | | | | 100 | | | |
| | | B-12 | parts by weight | | | | | | | | | 100 | | |
| | | B-13 | parts by weight | | | | | | | | | | 100 | |
| | fibrous filler (C) | C-1 | parts by weight | 20 | 20 | 20 | 20 | 20 | 20 | 20 | 20 | 20 | 20 | |
| | | C-3 | parts by weight | | | | | | | | | | | 43 |
| Composition | (A1) + (B) | | parts by weight | 100 | 100 | 100 | 100 | 100 | 100 | 100 | 100 | 100 | 100 | 100 |
| | (A2) or (F) | | parts by weight | 0 | 0 | 0 | 0 | 0 | 0 | 0 | 0 | 0 | 0 | 0 |
| | kneading method | | | — | | | | | | | | | | |
| Melt-kneading with extruder | $L/D_0$ of twin screw extruder | | — | 35 | 35 | 35 | 35 | 35 | 35 | 35 | 35 | 35 | 35 | 35 |
| | screw constitution | | — | F | F | F | F | F | F | F | F | F | F | F |
| | existence of stretched flow zone | | — | no | no | no | no | no | no | no | no | no | no | no |
| | proportion of stretched flow zone | | % | — | — | — | — | — | — | — | — | — | — | — |
| | cylinder temperature setting | | °C. | 260 | 220 | 220 | 305 | 260 | 280 | 190 | 290 | 300 | 190 | 280 |
| | screw rotation speed | | rpm | 200 | 200 | 200 | 200 | 200 | 200 | 200 | 200 | 200 | 200 | 200 |
| | extrusion rate | | kg/h | 20 | 20 | 20 | 20 | 20 | 20 | 20 | 20 | 20 | 20 | 20 |
| | residence time | | min | 1.4 | 1.4 | 1.4 | 1.4 | 1.4 | 1.4 | 1.4 | 1.4 | 1.4 | 1.4 | 1.4 |
| | Pkmax-Pkmin | | MPa | — | — | — | — | — | — | — | — | — | — | — |
| | maximum resin temperature | | °C. | — | — | — | — | — | — | — | — | — | — | — |
| | number of times of kneading | | times | 1 | 1 | 1 | 1 | 1 | 1 | 1 | 1 | 1 | 1 | 1 |
| Morphology | continuous phase resin | | — | B | B | B | B | B | B | B | B | B | B | B |
| | dispersal phase resin | | — | — | — | — | — | — | — | — | — | — | — | — |
| | dispersal phase having particle diameter of 10 to 1,000 nm | | — | — | — | — | — | — | — | — | — | — | — | — |
| | existence of finer particles of 1 to 100 nm in dispersal phase | | — | — | — | — | — | — | — | — | — | — | — | — |
| | area proportion of finer particles of 1 to 100 nm in dispersal phase | | % | — | — | — | — | — | — | — | — | — | — | — |
| | existence of finer particles of more than 300 nm | | — | — | — | — | — | — | — | — | — | — | — | — |
| Number average fiber length of reinforcement fiber | | | mm | 0.2 | 0.2 | 0.2 | 0.2 | 0.2 | 0.2 | 0.2 | 0.2 | 0.2 | 0.2 | 0.3 |
| Test specimen properties | bending elastic modulus | | GPa | 10.6 | 9.7 | 9.5 | 12.2 | 13.3 | 13.1 | 13.8 | 13.3 | 13.9 | 9.1 | 8.2 |
| | bending elastic modulus/bending elastic modulus in Comparative example 8 | | | — | — | — | — | — | — | — | — | — | — | — |
| | Charpy impact strength | | $kJ/m^2$ | 12.3 | 14.3 | 14.7 | 11.1 | 8.6 | 7.4 | 5.4 | 9.8 | 8.6 | 9.8 | 11.8 |
| | Charpy impact strength/Charpy impact strength in Comparative example 8 | | | — | — | — | — | — | — | — | — | — | — | — |

TABLE 14

| | | | | Example 74 | Comparative example 31 |
|---|---|---|---|---|---|
| Component proportion | melt-kneaded product (A) | Reference example 30 | parts by weight | 10 | |
| | third resin (B) | B-14 | parts by weight | 90 | 100 |
| | fibrous filler (C) | C-1 | parts by weight | 20 | 20 |
| Composition | (A1) + (B) | | parts by weight | 97 | 100 |
| | (A2) | | parts by weight | 3 | 0 |
| | kneading method | | | (A) + (B) + (C) extruded | |
| Melt-kneading with extruder | $L/D_0$ of twin screw extruder | | — | 35 | 35 |
| | screw constitution | | — | F | F |
| | existence of stretched flow zone | | — | no | no |
| | cylinder temperature setting | | °C. | 190 | 190 |
| | screw rotation speed | | rpm | 300 | 300 |
| | extrusion rate | | kg/h | 20 | 20 |
| | residence time | | min | 1.4 | 1.4 |
| | number of times of kneading | | times | 1 | 1 |

TABLE 14-continued

|  |  |  | Example 74 | Comparative example 31 |
|---|---|---|---|---|
| Morphology | continuous phase resin | — | A1, B | B |
|  | dispersal phase resin |  | A2 | — |
|  | dispersal phase having particle diameter of 10 to 1,000 nm | — | yes | — |
|  | existence of finer particles of 1 to 100 nm in dispersal phase | — | yes | no |
|  | area proportion of finer particles of 1 to 100 nm in dispersal phase | % | 24 | — |
|  | existence of finer particles of more than 300 nm | — | no | — |
| Number average fiber length of reinforcement fiber |  | mm | 0.2 | 0.2 |
| Test specimen performance | bending elastic modulus | GPa | 9.6 | 9.8 |
|  | bending elastic modulus/bending elastic modulus in Comparative example[1] |  | 0.98 | — |
|  | Charpy impact strength (notched) | kJ/m$^2$ | 14.7 | 9.8 |
|  | Charpy impact strength/Charpy impact strength in Comparative example[2] |  | 1.50 | — |

Notes
[1] and [2] The ratios given for Example 74 show comparisons with Comparative example 31.

It is seen from the results in Examples 1 to 10 and 14 to 23 that in the samples of the melt-kneaded product (A) prepared in Reference examples 1 to 15, the particles of the second resin (A2) has a number average particle diameter of 10 to 1,000 nm and also that the area occupied by the finer particles accounts for 20% or more in the particles of the second resin (A2). In the fiber reinforced resin composition produced by adding a small amount of the melt-kneaded product (A) to the third resin (B) and the fibrous filler (C), the structure of the dispersal phase can be controlled to a high degree despite the small content of the resin (A2) that forms the dispersal phase, making it possible to achieve a high impact resistance while maintaining the same level of rigidity as in the case of Comparative example 8.

It is seen from the results in Examples 11 and 24 that in the samples of the melt-kneaded product (A) prepared in Reference examples 2 and 9, the particles of the second resin (A2) has a number average particle diameter of 10 to 1,000 nm and also that the area occupied by the finer particles accounts for 20% or more in the particles of the second resin (A2). In the fiber reinforced resin composition produced by adding a small amount of the melt-kneaded product (A) to the third resin (B) and the fibrous filler (C), the structure of the dispersal phase can be controlled to a high degree despite the small content of the resin (A2) that forms the dispersal phase, making it possible to achieve a high impact resistance while maintaining the same level of rigidity as in the case of Comparative example 7.

It is seen from the results in Examples 13 and 26 that in the samples of the melt-kneaded product (A) prepared in Reference examples 2 and 9, the particles of the second resin (A2) has a number average particle diameter of 10 to 1,000 nm and also that the area occupied by the finer particles accounts for 20% or more in the particles of the second resin (A2). In the fiber reinforced resin composition produced by adding a small amount of the melt-kneaded product (A) to the third resin (B) and the fibrous filler (C), the structure of the dispersal phase can be controlled to a high degree despite the small content of the resin (A2) that forms the dispersal phase, making it possible to achieve a high impact resistance while maintaining the same level of rigidity as in the case of Comparative example 9.

It is seen from the results in Examples 12 and 25 that in the samples of the melt-kneaded product (A) prepared in Reference examples 2 and 9, the particles of the second resin (A2) has a number average particle diameter of 10 to 1,000 nm and also that the area occupied by the finer particles accounts for 20% or more in the particles of the second resin (A2). In the fiber reinforced resin composition produced by adding a small amount of the melt-kneaded product (A) to the third resin (B) and the fibrous filler (C), the structure of the dispersal phase can be controlled to a high degree despite the small content of the resin (A2) that forms the dispersal phase, making it possible to achieve a high impact resistance while maintaining the same level of rigidity as in the case of Comparative example 10.

It is seen from the results in Examples 27 and 28 that in the samples of the melt-kneaded product (A) prepared in Reference example 9, the particles of the second resin (A2) has a number average particle diameter of 10 to 1,000 nm and also that the area occupied by the finer particles accounts for 20% or more in the particles of the second resin (A2). In a fiber reinforced resin composition produced by adding a small amount of the melt-kneaded product (A) to the third resin (B) and the fibrous filler (C), the structure of the dispersal phase can be controlled to a high degree despite the small content of the resin (A2) that forms the dispersal phase, making it possible to achieve a high impact resistance while maintaining the same level of rigidity as in the case of Comparative example 21.

In Comparative examples 1 to 3, on the other hand, all components are kneaded together without carrying out, as in Example 3 etc., a step of forming said melt-kneaded product (A) containing a dispersal phase with a controlled structure, and therefore, the resulting fiber reinforced resin composition fails to have a dispersal phase with a highly controlled structure, leading to a poor balance between rigidity and impact resistance, even though the contents of the components are the same as in Example 3.

In Comparative examples 4 and 6, the samples of said melt-kneaded product (A) prepared in Reference examples 16 and 18, respectively, are added to the third resin (B) and the fibrous filler (C), and therefore, the number average particle diameter of the particles of the second resin (A2) is not controlled in range of 10 to 1,000 nm, leading to an insufficient balance between rigidity and impact resistance.

In Comparative example 5, the sample of said melt-kneaded product (A) prepared in Reference example 17 is added to the third resin (B) and the fibrous filler (C), and therefore, the resin without a reactive functional group (F) forms the dispersal phase. Since the dispersal phase (F) does not have a reactive functional group, a good balance between rigidity and impact resistance cannot be achieved even if the number average particle diameter is controlled in the range of 10 to 1,000 nm. Furthermore, the dispersal phase (F) does not contain fine particles.

It is seen from the results in Example 29 that in the case where the melt-kneaded product (A) prepared in Reference example 9 is melt-kneaded with the third resin (B) and then the resulting product is further melt-kneaded with the fibrous filler (C) to produce a fiber reinforced resin composition, the structure of the dispersal phase is highly controlled in the resulting fiber reinforced resin composition as in Example 15, leading to a good balance between rigidity and impact resistance.

It is seen from the results in Example 30 that also in the case where the melt-kneaded product (A) prepared in Reference example 9 is melt-kneaded with the fibrous filler (C) and then the resulting product is mixed with the third resin (B) and fed to an injection molding step, the structure of the dispersal phase is highly controlled in the resulting fiber reinforced resin composition as in Example 15, leading to a good balance between rigidity and impact resistance.

It is seen from the results in Example 31 that also in the case where the third resin (B) is melt-kneaded with the fibrous filler (C) and then the resulting product is mixed with a small amount of the melt-kneaded product (A) prepared in Reference example 9 and fed to an injection molding step, the structure of the dispersal phase is highly controlled in the resulting fiber reinforced resin composition as in Example 15, leading to a good balance between rigidity and impact resistance.

It is seen from the results in Examples 32 to 45, and 74 that in the samples of the melt-kneaded product (A) prepared in Reference examples 9, and 19 to 30, the number average particle diameter of the particles of the second resin (A2) is in the range of 10 to 1,000 nm and the area occupied by the finer particles accounts for 20% or more of that by the particles of the second resin (A2), regardless of the material used as the third resin (B). In a fiber reinforced resin composition produced by adding a small amount of the melt-kneaded product (A) to the third resin (B) and the fibrous filler (C), the structure of the dispersal phase can be controlled to a high degree despite the small content of the resin (A2) that forms the dispersal phase, making it possible to achieve a high impact resistance while maintaining the same level of rigidity as in the case of Comparative examples 12 to 22, and 31.

Example 46

The melt-kneaded product (A) and the third resin (B) were mixed according to the proportions given in Table 15 and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 35. Melt-kneading was performed in a nitrogen flow at a cylinder temperature, screw rotation speed, and extrusion rate given in Table 15 to allow a molten resin strand to be discharged through the discharge nozzle (L/D0=35). Here, a coloring agent was fed together with the input materials, and the residence time was determined as the time period until the degree of coloring of the extruded material reached a maximum. The residence time measurements are listed in Table 15. The screw constitution F was used as in Example 1. A vacuum vent zone was provided at the position of L/D0=30, and volatile components were removed at a gauge pressure of −0.1 MPa. The molten resin strand discharged was cooled as it was passed through a cooling bath, and then it was cut by a pelletizer as it is taken up to produce pellets of a resin composition.

To produce a molding material according to the invention, said pellets of a resin composition and a carbon fiber bundle (C) are mixed with a terpene phenol polymer (D) by the following method to form a composite structure with a component proportion ratio as given in Table 15.

On a roll heated at 130° C., the terpene phenol polymer (D) was heated to form a molten liquid film. A kiss coater was used to produce a film with a uniform thickness on the roll. A continuous carbon fiber bundle (C) was fed to travel while in contact with the this roll to adhere a certain amount of the terpene phenol polymer (D) per unit length of the carbon fiber bundle.

The carbon fiber carrying the polymer was passed alternately on and under 10 rolls that were 50 mm in diameter, heated at 180° C., equipped with bearings for free rotation, and arranged along a straight line. This operation allows the fiber bundle deeply impregnated with the polymer, leading to the formation of a continuous composite structure consisting of the carbon fiber and the terpene phenol polymer. The terpene phenol polymer (D) at 130° C. had a melt viscosity of about 10 poise at a shear speed of 103 s−1 as measured with a capillary rheometer.

This material with a continuous composite structure was passed through a coating die designed for wire coating and installed at the end of a single screw extruder with a diameter of 40 mm. Said melt-kneaded product (A) and the third resin (B) melted at 260° C., fed from the extruder into the die, and discharged to form a resin composition. Thus, the outer surface of the composite-structure material was continuously coated with said resin composition.

The resulting composite-structure material was cooled to about room temperature and cut with a strand cutter into pellets with a length of 7 mm to provide samples for injection molding. The production of molding material down to this point was carried out in a continuous step with a carbon fiber bundle take-up speed of 30 m/min. Said samples were vacuum-dried at 80° C. for 12 hours or more and injection-molded to prepare specimens for bending test and Charpy impact test, followed by morphology observation and evaluation in bending elastic modulus and Charpy impact strength. Results of various evaluations are given in Table 15.

Examples 47 to 51, 52 to 58, and 60 to 73

The same procedure as in Example 46 was carried out according to the component proportions given in Tables 15 to 18 to prepare samples for injection molding, followed by performing various evaluations. Results are given in Tables 15 to 18.

Example 59

A composite-structure material composed of a continuous carbon fiber bundle (C) and a terpene phenol polymer (D) prepared according to the same procedure as in Example 46 was passed through a coating die designed for wire coating and installed at the end of a single screw extruder with a diameter of 40 mm. Elsewhere, the resin pellets prepared in Reference example 9 and pellets of the third resin (B) were mixed and melted at 260° C. in the extruder and discharged from the die, and the resulting resin was used to continuously coat the outer surface of said composite-structure material. Except for this, the same procedure as in Example 46 was carried out to prepare samples for injection molding, followed by performing various evaluations. Results are given in Table 16.

Comparative Examples 24 to 26, and 30

The same procedures as in Example 46 was carried out using the melt-kneaded product (A), third resin (B), terpene phenol polymer (D), and continuous carbon fiber bundle (C) according to the proportions given in Table 9 to prepare samples for injection molding, followed by performing various evaluations. Results are given in Table 19.

Comparative Example 27

The component (A1), component (A2) and component (B) were mixed according to the proportions given in Table 19 and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 35. Melt-kneading was performed in a nitrogen flow at a cylinder temperature, screw rotation speed, and extrusion rate given in Table 19 to allow a molten resin strand to be discharged through the discharge nozzle (L/D0=35). Here, a coloring agent was fed together with the input materials, and the residence time was determined as the time period until the degree of coloring of the extruded material reached a maximum. The residence time measurements are listed in Table 19. The screw constitution F was used as in Example 1. A vacuum vent zone was provided at the position of L/D0=30, and volatile components were removed at a gauge pressure of −0.1 MPa. The molten resin strand discharged was cooled as it was passed through a cooling bath, and then it was cut by a pelletizer as it is taken up to produce pellets of a resin composition. The same procedure as in Example 46 was carried out using pellets of the resin composition, continuous carbon fiber bundle (C) and terpene phenol polymer (D) according to the component proportions given in Table 19 to prepare samples for injection molding, followed by performing various evaluations. Results are given in Table 19.

Comparative Example 28

A resin composition was mixed according to the proportions given in Table 19 and supplied to the feed port of a twin screw extruder. The twin screw extruder used was a co-rotating full intermeshing type twin extruder (TEM-41SS-22/1V supplied by Toshiba Machine Co.) comprising two double-thread screws with a screw diameter of 41 mm and a L/D0 ratio of 100. Melt-kneading was performed in a nitrogen flow at a cylinder temperature, screw rotation speed, and extrusion rate given in Table 19 to allow a molten resin strand to be discharged through the discharge nozzle (L/D0=100). Here, a coloring agent was fed together with the input materials, and the residence time was determined as the time period until the degree of coloring of the extruded material reached a maximum. The residence time measurements are listed in Table 19. The screw constitution A was used as in Reference example 1. Resin pressure gauges were installed in two or more kneading zones, and the largest of the kneading zone resin pressure readings was taken as the value of Pkmax (MPa). Resin pressure gauges were installed in two or more full flight zones, and the smallest of the full flight zone resin pressure readings was taken as the value of Pfmin (MPa). The values of the former minus the latter are given in Table 19. Resin thermometers were installed at two or more equally spaced positions in the extruder, and the highest of their resin temperature readings is listed as maximum resin temperature in Table 19. A vacuum vent zone was provided at the position of L/D0=96, and volatile components were removed at a gauge pressure of −0.1 MPa. The molten resin strand discharged was cooled as it was passed through a cooling bath, and then it was cut by a pelletizer as it is taken up to produce pellets of a resin composition. The same procedure as in Example 46 was carried out using pellets of the resin composition and the components (C) and (D) according to the component proportions given in Table 19 to prepare samples for injection molding, followed by performing various evaluations. Results are given in Table 19.

Comparative Example 29

Components were mixed according to the proportions given in Table 19 and supplied to the feed port of a twin screw extruder. The twin screw extruder used was a co-rotating full intermeshing type twin extruder (TEX-30α, supplied by The Japan Steel Works, Ltd.) comprising two double-thread screws with a screw diameter of 30 mm and a L/D0 ratio of 45. Melt-kneading was performed in a nitrogen flow at a cylinder temperature, screw rotation speed, and extrusion rate given in Table 19 to allow a molten resin strand to be discharged through the discharge nozzle (L/D0=45). Here, a coloring agent was fed together with the input materials, and the residence time was determined as the time period until the degree of coloring of the extruded material reached a maximum. The residence time measurements are listed in Table 19. The screw constitution C, which has stretched flow zones, was used as in Reference example 9. A vacuum vent zone was provided at the position of L/D0=38, and volatile components were removed at a gauge pressure of −0.1 MPa. The molten resin strand discharged was cooled as it was passed through a cooling bath, and then it was cut by a pelletizer as it is taken up to produce pellets of a resin composition. The same procedure as in Example 46 was carried out using pellets of said resin composition, continuous carbon fiber bundle (C) and terpene phenol polymer (D) according to the component proportions given in Table 19 to prepare samples for injection molding, followed by producing various specimens and performing their evaluations. Results are given in Table 19.

TABLE 15

|  |  |  |  | Example | | | | | |
| --- | --- | --- | --- | --- | --- | --- | --- | --- | --- |
|  |  |  |  | 46 | 47 | 48 | 49 | 50 | 51 |
| Component proportion | fibrous filler (C) | C-1 | parts by weight | 20 | 10 | 20 | 30 | 20 | 20 |
|  | thermoplasticity polymer (D) | D-1 | parts by weight | 3 | 3 | 3 | 3 | 3 | 3 |

TABLE 15-continued

| | | | | Example | | | | | |
|---|---|---|---|---|---|---|---|---|---|
| | | | | 46 | 47 | 48 | 49 | 50 | 51 |
| | melt-kneaded product (A) | Reference example 2 | parts by weight | 4 | 9 | 8 | 7 | 23 | 38 |
| | third resin (B) | B-1 | parts by weight | 73 | 78 | 69 | 60 | 54 | 39 |
| Composition | (A1) + (B) | | parts by weight | 98.5 | 97 | 97 | 97 | 91 | 85 |
| | (A2) | | parts by weight | 1.5 | 3 | 3 | 3 | 9 | 15 |
| | kneading method | | | (A) + (B) extruded | | | | | |
| Melt-kneading of (B) with melt-kneaded product in Reference example | $L/D_0$ of twin screw extruder | | — | 35 | 35 | 35 | 35 | 35 | 35 |
| | screw constitution | | — | F | F | F | F | F | F |
| | existence of stretched flow zone | | — | no | no | no | no | no | no |
| | cylinder temperature setting | | °C. | 260 | 260 | 260 | 260 | 260 | 260 |
| | screw rotation speed | | rpm | 300 | 300 | 300 | 300 | 300 | 300 |
| | extrusion rate | | kg/h | 20 | 20 | 20 | 20 | 20 | 20 |
| | residence time | | min | 1.4 | 1.4 | 1.4 | 1.4 | 1.4 | 1.4 |
| | number of times of kneading | | times | 1 | 1 | 1 | 1 | 1 | 1 |
| Morphology | basic structure | | | (I) | (I) | (I) | (I) | (I) | (I) |
| | continuous phase resin | | — | A1, B | A1, B | A1, B | A1, B | A1, B | A1, B |
| | dispersal phase resin | | — | A2 | A2 | A2 | A2 | A2 | A2 |
| | dispersal phase having particle diameter of 10 to 1,000 nm | | — | yes | yes | yes | yes | yes | yes |
| | existence of finer particles with average particle diameter of 300 nm or less (in continuous phase) | | | yes | yes | yes | yes | yes | yes |
| | (in the other continuous phase) | | | — | — | — | — | — | — |
| | (in dispersal phase) | | | yes | yes | yes | yes | yes | yes |
| | area proportion of finer particles of 1 to 100 nm in dispersal phase | | % | 30 | 30 | 30 | 30 | 30 | 30 |
| | existence of finer particles of more than 300 nm | | — | no | no | no | no | no | no |
| | Number average fiber length of reinforcement fiber | | mm | 0.5 | 0.5 | 0.5 | 0.5 | 0.5 | 0.5 |
| Test specimen performance | bending elastic modulus | | GPa | 13.3 | 10.0 | 13.4 | 17.8 | 13.0 | 12.1 |
| | Charpy impact strength (notched) | | $kJ/m^2$ | 10.8 | 10.0 | 17.7 | 21.1 | 26.1 | 31.9 |

TABLE 16

| | | | | Example | | | | | | | |
|---|---|---|---|---|---|---|---|---|---|---|---|
| | | | | 52 | 53 | 54 | 55 | 56 | 57 | 58 | 59 |
| Component proportion | fibrous filler (C) | C-1 | parts by weight | 20 | 10 | 20 | 30 | 20 | 20 | | 20 |
| | | C-2 | parts by weight | | | | | | | 20 | |
| | thermoplasticity polymer (D) | D-1 | parts by weight | 3 | 3 | 3 | 3 | 3 | 3 | 3 | 3 |
| | melt-kneaded product (A) | Reference example 9 | parts by weight | 4 | 9 | 8 | 7 | 23 | 38 | 8 | 8 |
| | third resin (B) | B-1 | parts by weight | 73 | 78 | 69 | 60 | 54 | 39 | 69 | 69 |
| Composition | (A1) + (B) | | parts by weight | 98.5 | 97 | 97 | 97 | 91 | 85 | 97 | 97 |
| | (A2) | | parts by weight | 1.5 | 3 | 3 | 3 | 9 | 15 | 3 | 3 |
| | kneading method | | | (A) + (B) extruded | | | | | | | (A) + (B) blend |
| Melt-kneading of (B) with melt-kneaded product in Reference example | $L/D_0$ of twin screw extruder | | — | 35 | 35 | 35 | 35 | 35 | 35 | 35 | — |
| | screw constitution | | — | F | F | F | F | F | F | F | — |
| | existence of stretched flow zone | | — | no | no | no | no | no | no | no | — |
| | cylinder temperature setting | | °C. | 260 | 260 | 260 | 260 | 260 | 260 | 260 | — |
| | screw rotation speed | | rpm | 300 | 300 | 300 | 300 | 300 | 300 | 300 | — |
| | extrusion rate | | kg/h | 20 | 20 | 20 | 20 | 20 | 20 | 20 | — |
| | residence time | | min | 1.4 | 1.4 | 1.4 | 1.4 | 1.4 | 1.4 | 1.4 | — |
| | number of times of kneading | | times | 1 | 1 | 1 | 1 | 1 | 1 | 1 | — |
| Morphology | basic structure | | | (I) | (I) | (I) | (I) | (I) | (I) | (I) | (I) |
| | continuous phase resin | | — | A1, B | A1, B | A1, B | A1, B | A1, B | A1, B | A1, B | A1, B |
| | dispersal phase resin | | — | A2 | A2 | A2 | A2 | A2 | A2 | A2 | A2 |
| | dispersal phase having particle diameter of 10 to 1,000 nm | | — | yes | yes | yes | yes | yes | yes | yes | yes |
| | existence of finer particles with average particle diameter of 300 nm or less (in continuous phase) | | | yes | yes | yes | yes | yes | yes | yes | yes |

TABLE 16-continued

|  |  |  | Example | | | | | | | |
|---|---|---|---|---|---|---|---|---|---|---|
|  |  |  | 52 | 53 | 54 | 55 | 56 | 57 | 58 | 59 |
|  | (in the other continuous phase) |  | — | — | — | — | — | — | — | — |
|  | (in dispersal phase) |  | yes | yes | yes | yes | yes | yes | yes | yes |
|  | area proportion of finer particles of 1 to 100 nm in dispersal phase | % | 27 | 27 | 27 | 27 | 27 | 27 | 27 | 27 |
|  | existence of finer particles of more than 300 nm | — | no | no | no | no | no | no | no | no |
| Number average fiber length of reinforcement fiber |  | mm | 0.5 | 0.5 | 0.5 | 0.5 | 0.5 | 0.5 | 0.5 | 0.5 |
| Test specimen performance | bending elastic modulus | GPa | 13.7 | 10.3 | 13.8 | 18.3 | 13.4 | 12.5 | 14.1 | 13.8 |
|  | Charpy impact strength (notched) | kJ/m² | 12.9 | 11.9 | 21.1 | 25.1 | 31.1 | 38.0 | 31.1 | 20.3 |

TABLE 17

|  |  |  |  | Example | | | | | | |
|---|---|---|---|---|---|---|---|---|---|---|
|  |  |  |  | 60 | 61 | 62 | 63 | 64 | 65 | 66 |
| Component proportion | fibrous filler (C) | C-1 | parts by weight | 20 | 20 | 20 | 20 | 20 | 20 | 20 |
|  | thermoplasticity polymer (D) | D-1 | parts by weight | 3 | 3 | 3 | 3 | 3 | 3 | 3 |
|  | melt-kneaded product (A) | Reference example 19 | parts by weight | 8 |  |  |  |  |  |  |
|  |  | Reference example 20 | parts by weight |  | 8 |  |  |  |  |  |
|  |  | Reference example 21 | parts by weight |  |  | 8 |  |  |  |  |
|  |  | Reference example 22 | parts by weight |  |  |  | 8 |  |  |  |
|  |  | Reference example 23 | parts by weight |  |  |  |  | 8 |  |  |
|  |  | Reference example 24 | parts by weight |  |  |  |  |  | 9 |  |
|  |  | Reference example 25 | parts by weight |  |  |  |  |  |  | 9 |
|  | third resin (B) | B-3 | parts by weight | 69 |  |  |  |  |  |  |
|  |  | B-4 | parts by weight |  | 69 |  |  |  |  |  |
|  |  | B-5 | parts by weight |  |  | 69 |  |  |  |  |
|  |  | B-6 | parts by weight |  |  |  | 69 |  |  |  |
|  |  | B-7 | parts by weight |  |  |  |  | 69 |  |  |
|  |  | B-8 | parts by weight |  |  |  |  |  | 68 |  |
|  |  | B-9 | parts by weight |  |  |  |  |  |  | 68 |
| Composition | (A1) + (B) |  | parts by weight | 97 | 97 | 97 | 97 | 97 | 97 | 97 |
|  | (A2) |  | parts by weight | 3 | 3 | 3 | 3 | 3 | 3 | 3 |
|  | kneading method |  |  | (A) + (B) extruded | | | | | | |
| Melt-kneading of (B) with melt-kneaded product in Reference example | L/D₀ of twin screw extruder |  | — | 35 | 35 | 35 | 35 | 35 | 35 | 35 |
|  | screw constitution |  | — | F | F | F | F | F | F | F |
|  | existence of stretched flow zone |  | — | no | no | no | no | no | no | no |
|  | cylinder temperature setting |  | °C. | 280 | 260 | 220 | 220 | 305 | 260 | 280 |
|  | screw rotation speed |  | rpm | 300 | 300 | 300 | 300 | 300 | 300 | 300 |
|  | extrusion rate |  | kg/h | 20 | 20 | 20 | 20 | 20 | 20 | 20 |
|  | residence time |  | min | 1.4 | 1.4 | 1.4 | 1.4 | 1.4 | 1.4 | 1.4 |
|  | number of times of kneading |  | times | 1 | 1 | 1 | 1 | 1 | 1 | 1 |
| Morphology | basic structure |  |  | (I) | (I) | (I) | (I) | (I) | (I) | (I) |
|  | continuous phase resin |  | — | A1, B | A1, B | A1, B | A1, B | A1, B | A1, B | A1, B |
|  | dispersal phase resin |  | — | A2 | A2 | A2 | A2 | A2 | A2 | A2 |
|  | dispersal phase having particle diameter of 10 to 1,000 nm |  | — | yes | yes | yes | yes | yes | yes | yes |
|  | existence of finer particles with average particle diameter of 300 nm or less (in continuous phase) |  |  | yes | yes | yes | yes | yes | yes | yes |
|  | (in the other continuous phase) |  |  | — | — | — | — | — | — | — |
|  | (in dispersal phase) |  |  | yes | yes | yes | yes | yes | yes | yes |
|  | area proportion of finer particles of 1 to 100 nm in dispersal phase |  | % | 26 | 25 | 24 | 24 | 24 | 23 | 23 |

TABLE 17-continued

|  |  |  | | Example | | | | | | |
|---|---|---|---|---|---|---|---|---|---|---|
|  |  |  | | 60 | 61 | 62 | 63 | 64 | 65 | 66 |
|  | existence of finer particles of more than 300 nm |  | — | no | no | no | no | no | no | no |
|  | Number average fiber length of reinforcement fiber |  | mm | 0.5 | 0.5 | 0.5 | 0.5 | 0.5 | 0.5 | 0.5 |
| Test specimen performance | bending elastic modulus | | GPa | 12.4 | 10.7 | 9.8 | 9.7 | 12.4 | 13.4 | 13.2 |
|  | Charpy impact strength (notched) | | kJ/m$^2$ | 24.3 | 20.3 | 22.0 | 23.9 | 18.0 | 17.7 | 15.2 |

TABLE 18

|  |  |  |  | Example | | | | | | |
|---|---|---|---|---|---|---|---|---|---|---|
|  |  |  |  | 67 | 68 | 69 | 70 | 71 | 72 | 73 |
| Component proportion | fibrous filler (C) | C-1 | parts by weight | 20 | 20 | 20 | 20 | 20 | 20 | 20 |
|  | thermoplasticity polymer (D) | D-1 | parts by weight | 3 | 3 | 3 | 3 | 3 | 3 | 3 |
|  | melt-kneaded product (A) | Reference example 9 | parts by weight |  |  |  |  | 8 | 8 | 8 |
|  |  | Reference example 26 | parts by weight | 8 |  |  |  |  |  |  |
|  |  | Reference example 27 | parts by weight |  | 9 |  |  |  |  |  |
|  |  | Reference example 28 | parts by weight |  |  | 9 |  |  |  |  |
|  |  | Reference example 29 | parts by weight |  |  |  | 8 |  |  |  |
|  | third resin (B) | B-3 | parts by weight |  |  |  |  | 69 |  |  |
|  |  | B-8 | parts by weight |  |  |  |  |  | 69 |  |
|  |  | B-10 | parts by weight | 69 |  |  |  |  |  |  |
|  |  | B-11 | parts by weight |  | 68 |  |  |  |  |  |
|  |  | B-12 | parts by weight |  |  | 68 |  |  |  | 69 |
|  |  | B-13 | parts by weight |  |  |  | 69 |  |  |  |
| Composition | (A1) + (B) |  | parts by weight | 97 | 97 | 97 | 97 | 97 | 97 | 97 |
|  | (A2) |  | parts by weight | 3 | 3 | 3 | 3 | 3 | 3 | 3 |
|  | kneading method |  |  | (A) + (B) extruded | | | | | | |
| Melt-kneading of (B) with melt-kneaded product in Reference example | L/D$_0$ of twin screw extruder |  | — | 35 | 35 | 35 | 35 | 35 | 35 | 35 |
|  | screw constitution |  | — | F | F | F | F | F | F | F |
|  | existence of stretched flow zone |  | — | no | no | no | no | no | no | no |
|  | cylinder temperature setting |  | ° C. | 190 | 290 | 300 | 190 | 280 | 260 | 300 |
|  | screw rotation speed |  | rpm | 300 | 300 | 300 | 300 | 300 | 300 | 300 |
|  | extrusion rate |  | kg/h | 20 | 20 | 20 | 20 | 20 | 20 | 20 |
|  | residence time |  | min | 1.4 | 1.4 | 1.4 | 1.4 | 1.4 | 1.4 | 1.4 |
|  | number of times of kneading |  | times | 1 | 1 | 1 | 1 | 1 | 1 | 1 |
| Morphology | basic structure |  |  | (I) | (I) | (I) | (I) | (I) | (I) | (I) |
|  | continuous phase resin |  | — | A1, B | A1, B | A1, B | A1, B | A1, B | A1, B | A1, B |
|  | dispersal phase resin |  | — | A2 | A2 | A2 | A2 | A2 | A2 | A2 |
|  | dispersal phase having particle diameter of 10 to 1,000 nm |  | — | yes | yes | yes | yes | yes | yes | yes |
|  | existence of finer particles with average particle diameter of 300 nm or less (in continuous phase) |  |  | yes | yes | yes | yes | yes | yes | yes |
|  | (in the other continuous phase) |  |  | — | — | — | — | — | — | — |
|  | (in dispersal phase) |  |  | yes | yes | yes | yes | yes | yes | yes |
|  | area proportion of finer particles of 1 to 100 nm in dispersal phase |  | % | 22 | 24 | 26 | 24 | 27 | 27 | 27 |
|  | existence of finer particles of more than 300 nm |  | — | no | no | no | no | no | no | no |
|  | Number average fiber length of reinforcement fiber |  | mm | 0.5 | 0.5 | 0.5 | 0.5 | 0.5 | 0.5 | 0.5 |
| Test specimen performance | bending elastic modulus |  | GPa | 13.9 | 13.3 | 14.1 | 9.1 | 12.6 | 13.0 | 13.7 |
|  | Charpy impact strength (notched) |  | kJ/m$^2$ | 13.7 | 16.9 | 17.2 | 17.2 | 22.8 | 16.5 | 15.4 |

TABLE 19

|  |  |  |  | Comparative example | | | | | | |
|---|---|---|---|---|---|---|---|---|---|---|
|  |  |  |  | 24 | 25 | 26 | 27 | 28 | 29 | 30 |
| Component proportion | fibrous filler (C) | C-1 | parts by weight | 20 | 20 | 20 | 20 | 20 | 20 | 20 |
|  | thermoplasticity polymer (D) | D-1 | parts by weight | 3 | 3 | 3 | 3 | 3 | 3 | 3 |
|  |  | Reference example 16 | parts by weight | 77 |  |  |  |  |  |  |
|  |  | Reference example 17 | parts by weight |  | 77 |  |  |  |  |  |
|  |  | Reference example 18 | parts by weight |  |  | 77 |  |  |  |  |
|  |  | A1-2 | parts by weight |  |  |  |  | 5 | 5 | 5 |
|  |  | A2-1 | parts by weight |  |  |  |  | 2 | 2 | 2 |
|  |  | B-1 |  |  |  |  | 70 | 70 | 70 | 77 |
| Composition | (A1) + (B) |  | parts by weight | 70 | 70 | 60 | 97 | 97 | 97 | 100 |
|  | (A2) or (F) |  | parts by weight | 30 | 30 | 40 | 3 | 3 | 3 | 0 |
|  | kneading method |  |  | — | — | — | (A1 + A2 + B) extruded | | | — |
| Melt-kneading | $L/D_0$ of twin screw extruder |  |  | — | — | — | 35 | 100 | 45 | — |
|  | screw constitution |  |  | — | — | — | F | A | C | — |
|  | existence of stretched flow zone |  |  | — | — | — | no | no | yes | — |
|  | proportion of stretched flow zone |  | % | — | — | — | — | — | 29 | — |
|  | cylinder temperature setting |  | °C. | — | — | — | 260 | 260 | 260 | — |
|  | screw rotation speed |  | rpm | — | — | — | 300 | 250 | 300 | — |
|  | extrusion rate |  | kg/h | — | — | — | 20 | 50 | 20 | — |
|  | residence time |  | min | — | — | — | 1.4 | 2 | 1.8 | — |
|  | extrusion rate per rpm |  | kg/h | — | — | — | 0.07 | 0.20 | 0.07 | — |
|  | Pkmax-Pfmin |  | MPa | — | — | — | — | 0.4 | — | — |
|  | maximum resin temperature |  | °C. | — | — | — | — | 290 | — | — |
|  | number of times of kneading |  | times | — | — | — | 1 | 1 | 1 | — |
| Morphology | basic structure |  |  | (I) | (I) | (I) | (I) | (I) | (I) | (I) |
|  | continuous phase resin |  | — | A1 | A1 | A1 | A1, B | A1, B | A1, B | — |
|  | dispersal phase resin |  | — | A2 | F | A2 | A2 | A2 | A2 | — |
|  | dispersal phase having particle diameter of 10 to 1,000 nm |  | — | no | yes | no | no | no | no | — |
|  | existence of finer particles with average particle diameter of 300 nm or less (in continuous phase) |  |  | no | no | no | no | yes | yes | — |
|  | (in the other continuous phase) |  |  | no | no | no | — | — | — | — |
|  | (in dispersal phase) |  |  | no | no | no | no | yes | yes | — |
|  | area proportion of finer particles of 1 to 100 nm in dispersal phase |  | % | — | — | — | — | 10 | 9 | — |
|  | existence of finer particles of more than 300 nm |  | — | — | — | — | — | no | no | — |
|  | Number average fiber length of reinforcement fiber |  | mm | 0.5 | 0.5 | 0.5 | 0.5 | 0.5 | 0.5 | 0.5 |
| Test specimen performance | bending elastic modulus |  | GPa | 6.2 | 6.1 | 6.1 | 6.2 | 6.2 | 6.2 | 11.5 |
|  | Charpy impact strength (notched) |  | kJ/m² | 56.0 | 36.4 | 41.2 | 54.4 | 54.8 | 55.0 | 8.3 |

According to Examples 46 to 51, and 52 to 58, in the samples of the melt-kneaded product (A) prepared in Reference examples 2 and 9, the particles of the second resin (A2) has a number average particle diameter of 10 to 1,000 nm and the area occupied by the finer particles accounts for 20% or more in the particles of the second resin (A2). For a molding material produced by adding a small amount of the melt-kneaded product (A) to the third resin (B), a largely increased impact resistance can be achieved while maintaining the same level of rigidity as in the case of Comparative example 30.

It is seen from results of Example 59 that a largely increased impact resistance can be achieved while maintaining the same level of rigidity as in the case of Comparative example 30 in the case where a small amount of the melt-kneaded product (A) prepared in Reference example 9 is mixed with the third resin (B) during the production of a material for injection molding.

It is seen from results of Examples 60 to 73 that molding materials that have rigidity and impact resistance in a good balance can be produced using samples of the melt-kneaded product (A) that are prepared in Reference examples 9, and 19 to 29 using different resins and that contain particles of the second resin (A2) with a number average particle diameter of 10 to 1,000 nm with the area occupied by finer particles accounting for 20% or more in the particles of the second resin (A2).

Compared with this, in Comparative examples 24 to 26 where samples of the melt-kneaded product (A) prepared in Reference examples 16 to 18 are used, a good balance between rigidity and impact resistance is not achieved because the composite structure formation step involving the third resin (B) is not included.

In Comparative examples 27 to 29, although the contents of the components in the molding materials are the same as in, for instance, Example 48, the structure of the dispersal phase is not controlled in the resulting molding materials because the component (A1), component (A2), and component (B) are combined and kneaded at once without carrying out a step for ensuring high-degree control of the structure of the dispersal phase as in said Example, leading to a poor balance between rigidity and impact resistance.

Example 75

The same procedure as in Example 46 was carried out according to the component proportions and conditions given in Table 20 to melt-knead the melt-kneaded product (A), third resin (B) and flame retardant (E). Using the resulting melt-kneaded product, terpene phenol polymer (D), and continuous carbon fiber bundle (C), the same procedure as in Example 46 was carried out to prepare samples for injection molding, followed by morphology observation and evaluations in bending elastic modulus, Charpy impact strength and fire retardance test (UL94). Results of the evaluations are given in Table 20.

TABLE 20

| | | | | Example 75 |
|---|---|---|---|---|
| Component proportion | fibrous filler (C) | C-1 | parts by weight | 20 |
| | thermoplasticity polymer (D) | D-1 | parts by weight | 3 |
| | melt-kneaded product (A) | Reference example 2 | parts by weight | 7 |
| | third resin (B) | B-1 | parts by weight | 45 |
| | flame retardant (E) | E-1 | parts by weight | 25 |
| Composition | (A1) + (B) + (E) | | parts by weight | 97 |
| | (A2) | | parts by weight | 3 |
| | kneading method | | | (A) + (B) + (E) extruded |
| Melt-kneading of (B) and (E) with melt-kneaded product in Reference example | $L/D_0$ of twin screw extruder | | — | 35 |
| | screw constitution | | — | F |
| | existence of stretched flow zone | | — | no |
| | cylinder temperature setting | | °C. | 260 |
| | screw rotation speed | | rpm | 300 |
| | extrusion rate | | kg/h | 20 |
| | residence time | | min | 1.4 |
| | number of times of kneading | | times | 1 |
| Morphology | basic structure | | | (I) |
| | continuous phase resin | | — | A1, B |
| | dispersal phase resin | | — | A2 |
| | dispersal phase having particle diameter of 10 to 1,000 nm | | — | yes |
| | existence of finer particles with average particle diameter of 300 nm or less (in continuous phase) | | | yes |
| | (in the other continuous phase) | | | — |
| | (in dispersal phase) | | | yes |
| | area proportion of finer particles of 1 to 100 nm in dispersal phase | | % | 30 |
| | existence of finer particles of more than 300 nm | | — | no |
| Number average fiber length of reinforcement fiber | | | mm | 0.5 |
| Test specimen properties | bending elastic modulus | | GPa | 15.1 |
| | Charpy impact strength | | kJ/m$^2$ | 24.0 |
| | fire retardance (UL94V) | | — | V-0 |

The sample produced in Example 75 where the flame retardant (E) is added up to a content given in Table 20 has a largely increased impact resistance and a V-0 fire retardance according to the UL94 fire retardance criteria while maintaining the same level of rigidity as in the case of Comparative example 30.

Example 76

The melt-kneaded product (A) and the third resin (B) are mixed according to the proportions given in Table 21, melt-kneaded at 260° C., and extruded from a T-die installed on an extruder to prepare a resin film. Then, a piece of nonwoven fabric produced from a fibrous filler (C) with a number average fiber length of 10 mm is sandwiched between two pieces of said resin film, and heated under pressure to ensure impregnation with the melt-kneaded product to prepare a sheet-like molding material with a fiber weight content 30%. Specimens for bending test (length 100 mm×width 15 mm×thickness 2 mm) and notched specimens for Charpy impact test (length 80 mm×width 10 mm×thickness 1.3 mm, notch depth 2.0 mm) were prepared from the resulting molding material. Evaluation results are given in Table 21.

Comparative Example 32

Except that the melt-kneaded product (A) was not used, the same procedure as in Example 76 was carried out according to the proportions given in Table 21 to prepare a sheet-like molding material, which was subjected to evaluations in various properties. Evaluation results are given in Table 21.

Example 77

The melt-kneaded product (A) and the third resin (B) were melt-kneaded according to the proportions given in Table 21. The melt-kneading was carried out by adding 13 parts by weight of the melt-kneaded product (A) to 100 parts by weight of liquid bisphenol A, kneading the mixture in a kneader at 160° C. for 30 minutes, cooling it to 80° C. while continuing the kneading operation, and adding 19 parts by weight of dicyandiamide and 2 parts by weight of DCMU. The resulting melt-kneaded product was spread over release paper using a reverse roll coater to prepare a resin film. Pieces of the fibrous filler (C) were arranged parallel to each other in a sheet-like manner, sandwiched between two pieces of said resin film, heated under pressure to impregnate the fibrous filler (C) with the melt-kneaded product to prepare a unidirectional prepreg with a weight of carbon fiber per unit area of 155 g/m² and a fiber content of 75% by weight. The resulting prepreg was heated under pressure at 130° C. to provide a cured product, from which specimens for bending test (length 100 mm×width 15 mm×thickness 2 mm) and unnotched specimens for Charpy impact test (length 100 mm×width 10 mm×thickness 3 mm, flatwise) were prepared and subjected to evaluations. Evaluation results are given in Table 21.

Comparative Example 33

Except that the melt-kneaded product (A) was not used, the same procedure as in Example 77 was carried out according to the proportions given in Table 21 to prepare a unidirectional prepreg with a weight of carbon fiber per unit area of 155 g/m² and a fiber content of 75% by weight, which was subjected to evaluations in various properties. Evaluation results are given in Table 21.

Example 78

According to the component proportions given in Table 21, frost-shattered particles (average particle diameter 90 μm) of the melt-kneaded product (A) were spread at a rate of 19 g/m² over the surfaces of pieces of the fibrous filler (C) with a metsuke (weight per unit area) of 190 g/m², which were stacked and preformed by heating under pressure in a mold. This preform was impregnated with the third resin (B) and heated at 130° C. for curing. From the resulting cured product, specimens for bending test (length 100 mm×width 25 mm×thickness 2 mm) and unnotched specimens for Charpy impact test (length 100 mm×width 10 mm×thickness 2 mm, flatwise) were prepared and subjected to evaluations. Evaluation results are given in Table 21.

Comparative Example 34

Except that the melt-kneaded product (A) was not used, the same procedure as in Example 78 was carried out according to the proportions given in Table 21 to prepare a cured product with a fiber content 50% by weight, which was subjected to evaluations in various properties. Evaluation results are given in Table 21.
[Table 21]
Samples prepared in Example 76 according to the proportions given in Table 21 had a largely increased impact resistance while maintaining the same level of rigidity as in the case of Comparative example 32. In Example 76, particles of the second resin (A2) had a number average particle diameter of 10 to 1,000 nm, and the area occupied by finer particles accounted for 20% or more in the particles of the second resin (A2). In Example 77, a prepreg was produced according to the proportions given in Table 21, and it had a largely increased impact resistance while maintaining the same level of rigidity as in the case of Comparative example 33. Furthermore, the particles of the second resin (A2) in Example 77 had a number average particle diameter of 10 to 1,000 nm, and the area occupied by finer particles accounted for 20% or more in the particles of the second resin (A2).

In Example 78, a molded product was produced according to the proportions given in Table 21, and it had a largely increased impact resistance while maintaining the same level of rigidity as in the case of Comparative example 34. Furthermore, the particles of the second resin (A2) in Example 78 had a number average particle diameter of 10 to 1,000 nm, and the area occupied by finer particles accounted for 20% or more in the particles of the second resin (A2).

[Industrial Applicability]

The present invention can provide a fiber reinforced resin composition having rigidity and impact resistance in a good balance. The molding material according to the invention can provide, while maintaining high moldability, molded products having high rigidity and impact resistance. In addition, the present invention can provide a method for easy production of said molding material and also provide molded products produced therefrom.

| [Explanation of numerals] | |
|---|---|
| 1 | continuous phase |
| 2 | dispersal phase |
| 3 | fibrous filler |
| 4 | the portion comprising the component (A2) in the dispersal phase |
| 5 | finer particles comprising the compound resulting from the reaction between the component (A1) and the component (A2) |
| 6 | monofilaments of the fibrous filler (C) |
| 7 | thermoplastic polymer (D) |
| 8 | core comprising the fibrous filler (C) and the thermoplastic polymer (D) |
| 9 | sheath comprising the melt-kneaded product (A) and the third resin (B) |

The invention claimed is:

1. A fiber reinforced resin composition comprising:
a melt-kneaded product (A) prepared by melt-kneading a first resin (A1) and a second resin with a reactive functional group (A2);
a third resin (B); and
a fibrous filler (C);
wherein the first resin (A1) is at least one resin selected from the group consisting of polyamide, polyester, polyphenylene sulfide, polyacetal, styrene based resin, polyphenylene oxide, polycarbonate, polylactic acid, polypropylene, and polyethylene, and said third resin (B) is at least one thermoplastic resin selected from the group consisting of polyamide, polyester, polyphenylene sulfide, polyacetal, styrene based resin, polyphenylene oxide, polycarbonate, polylactic acid, polypropylene, and polyethylene; and
wherein, with respect to the contents of the components, the first resin (A1), the second resin with a reactive functional group (A2), and the third resin (B) account for 0.1 to 75 wt%, 0.1 to 15 wtt, and 10 to 99.8 wt%, respectively, and form a resin composition while said fibrous filler (C) accounts for 0.1 to 300 parts by weight per 100 parts by weight of the resin composition, said first resin (A1) and said third resin (B) forming a matrix resin, said second resin (A2) being dispersed as particles in said matrix resin, and said particles having a number average particle diameter of 10 to 1,000 nm, and
wherein the particles of said component (A2) contain finer particles with a number average particle diameter of 1 to 100 nm comprising a compound resulting from the reaction of the component (A1) and the component (A2), the area occupied by said finer particles comprising the compound resulting from the reaction of components (A1) and (A2) accounting for 20% or more of that occupied by the particles of the second resin (A2).

2. A fiber reinforced resin composition according to claim 1 wherein said second resin (A2) has a glass transition temperature of 25° C. or below.

3. A fiber reinforced resin composition according to claim 1 wherein the reactive functional group in said second resin (A2) is at least one selected from the group consisting of amino group, carboxyl group, metal salts of carboxyl group, epoxy group, acid anhydride group, and oxazoline group.

4. A fiber reinforced resin composition according to claim 1 wherein said fibrous filler (C) is carbon fiber.

5. A fiber reinforced resin composition according to claim 1 further comprising a terpene based resin.

6. A fiber reinforced resin composition according to claim 1 further comprising at least one flame retardant selected from the group consisting of red phosphorus, phosphoric acid ester compound, phosphinate, and phosphazene compound.

7. A molding material comprising a fiber reinforced resin composition as claimed in claim 1.

8. A molding material according to claim 7 that is a prepreg wherein said fibrous filler (C) is in the form of continuous reinforcement fiber bundles, said reinforcement fiber bundles being impregnated with a resin composition comprising said melt-kneaded product (A) and said third resin (B).

9. A molding material according to claim 8 wherein the particles of the second resin (A2) are localized on the surface of said prepreg.

10. A molding material according to claim 7 that is in the form of pellets wherein the fibers of the fibrous filler (C) are aligned parallel to the axis of the molding material and the fibrous filler (C) has virtually the same length as that of the molding material.

11. A molding material according to claim 10 that is in the form of core-in--sheath type pellets comprising the fibrous filler (C) in the core portion and the melt-kneaded product (A) and the third resin (B) in the sheath portion, wherein said core portion further contains a thermoplastic polymer (D) having a weight average molecular weight of 200 to 50,000 and a melt viscosity lower than that of the resin composition composed of the melt-kneaded product (A) and the third resin (B).

12. A moldings production method for the production of moldings from a fiber reinforced resin composition as claimed in claim 1, comprising placing a base material containing said the fibrous filler (C) in a mold and injecting a resin composition containing said third resin (B).

13. A moldings production method according to claim 12 further comprising fusion-bonding said melt-kneaded product (A) to said base material.

* * * * *